US011875567B2

(12) United States Patent
Ricciardi

(10) Patent No.: US 11,875,567 B2
(45) Date of Patent: *Jan. 16, 2024

(54) SYSTEM AND METHOD FOR GENERATING PROBABILISTIC PLAY ANALYSES

(71) Applicant: PLAAY LLC, Briarcliff Manor, NY (US)

(72) Inventor: Christopher Ricciardi, Briarcliff Manor, NY (US)

(73) Assignee: PLAAY, LLC, Briarcliff Manor, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/383,357

(22) Filed: Jul. 22, 2021

(65) Prior Publication Data

US 2022/0319173 A1   Oct. 6, 2022

Related U.S. Application Data

(63) Continuation-in-part of application No. PCT/US2020/014644, filed on Jan. 22, 2020, and a continuation-in-part of application No. 16/254,384, filed on Jan. 22, 2019, now abandoned.

(51) Int. Cl.
  *G06V 20/40* (2022.01)
  *G06F 16/74* (2019.01)
  *G06F 16/78* (2019.01)

(52) U.S. Cl.
  CPC ............ *G06V 20/46* (2022.01); *G06F 16/743* (2019.01); *G06F 16/7867* (2019.01); *G06V 20/49* (2022.01)

(58) Field of Classification Search
  CPC .......... H04N 21/4223; H04N 21/4307; H04N 21/21805; H04N 21/8549; H04N 21/23418; H04N 21/8456; H04N 21/8547
  See application file for complete search history.

(56) References Cited

U.S. PATENT DOCUMENTS

| 9,138,652 B1* | 9/2015 | Thompson | H04N 21/237 |
| 2010/0005485 A1* | 1/2010 | Tian | G06F 16/785 |
| | | | 706/54 |
| 2014/0186004 A1* | 7/2014 | Hamer | G11B 27/32 |
| | | | 386/223 |
| 2016/0203843 A1* | 7/2016 | Beals | G11B 31/006 |
| | | | 386/230 |

* cited by examiner

*Primary Examiner* — Yassin Alata
(74) *Attorney, Agent, or Firm* — Lucian C. Chen

(57) ABSTRACT

A computer-implemented method may include receiving at least three video clips of a sporting event, where each of the video clips may (i) be simultaneously captured over at least a portion of time, and (ii) include at least one common player wearing an indicia on a jersey that is distinguishing from indicia on other players. Tracking locations of the at least one common player captured in the at least three video clips may be generated by triangulating distances of the common player(s) in the video clips. Statistical information of the common player(s) may be generated from the tracking locations. The common player(s) may be represented on a graphical display. The common player(s) may be controlled by applying at least one of the tracking locations and statistical information of the common player(s).

21 Claims, 47 Drawing Sheets

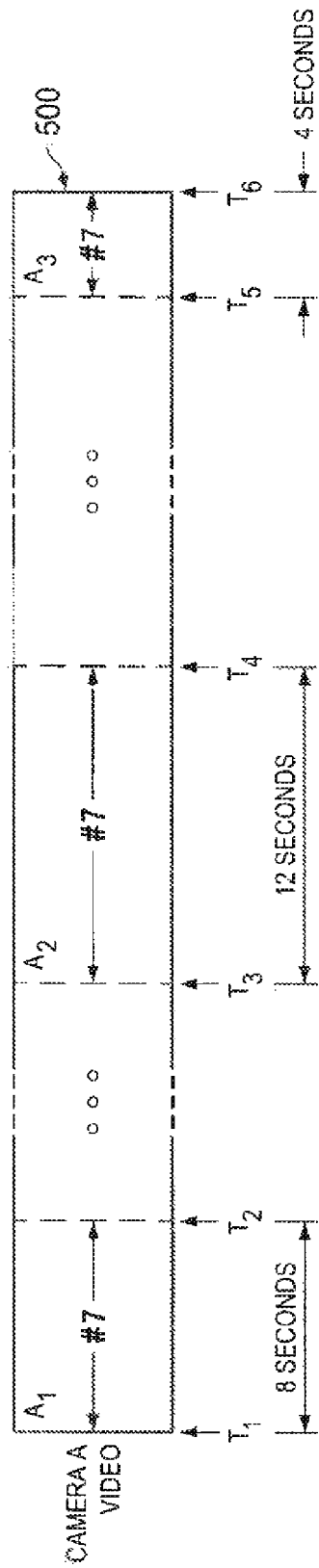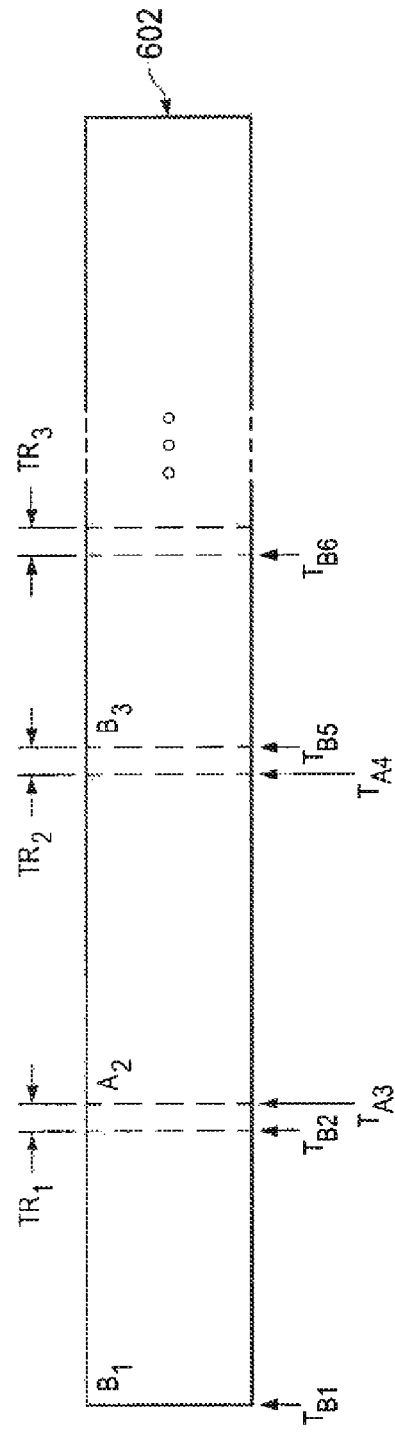

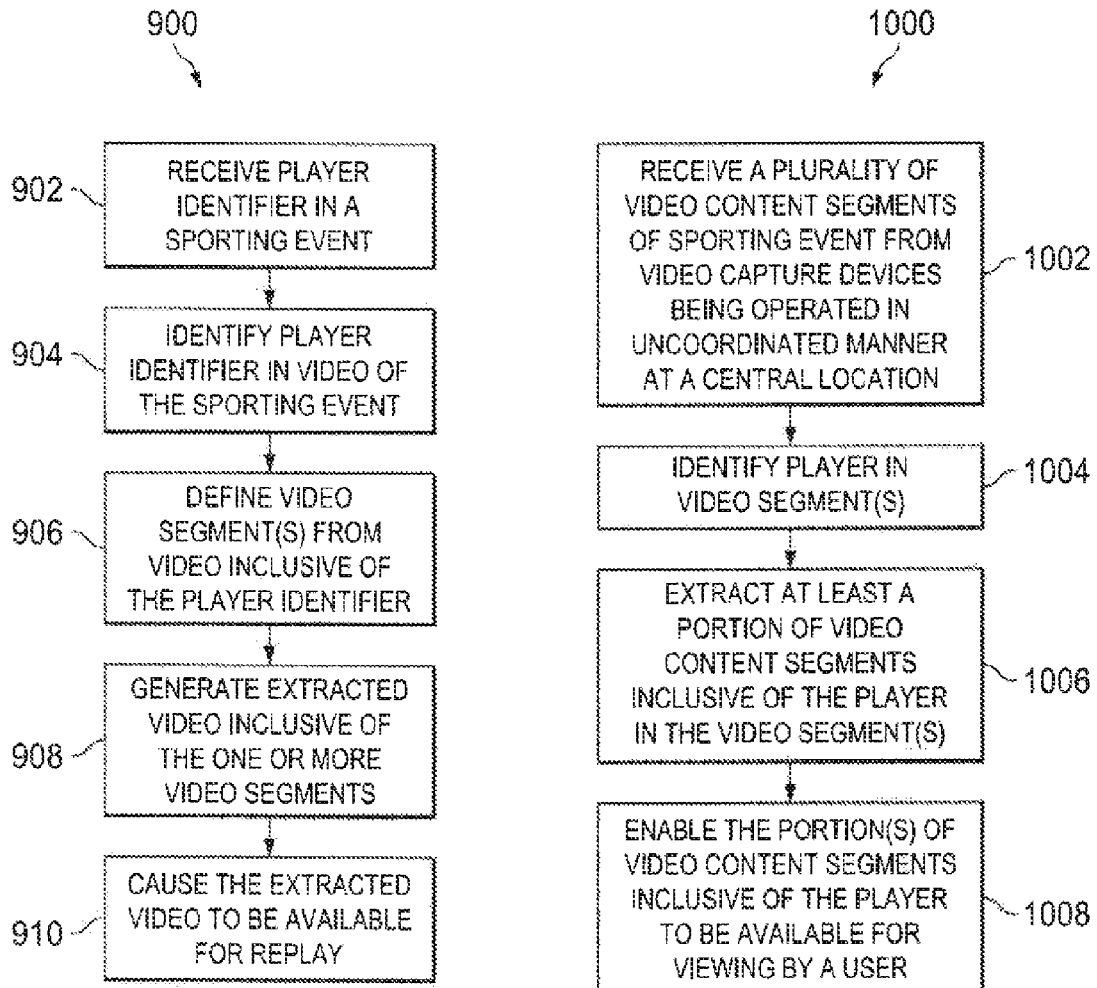

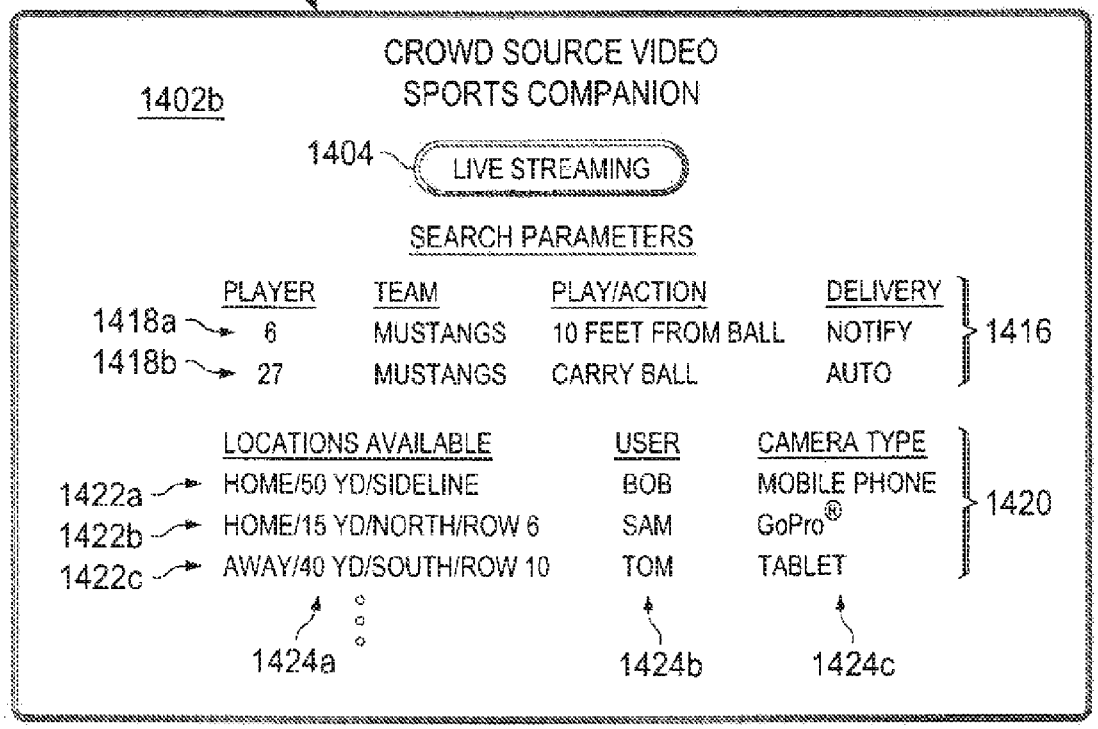
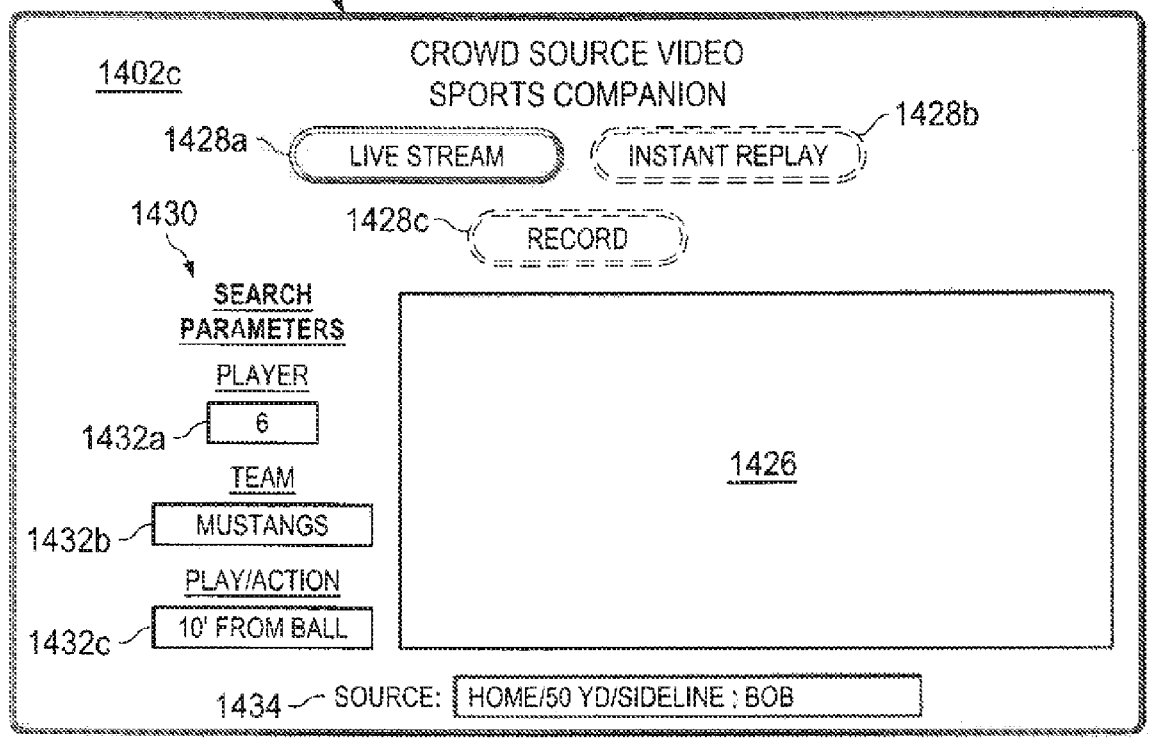

FIG. 31

SYSTEM AND METHOD FOR GENERATING PROBABILISTIC PLAY ANALYSES

RELATED APPLICATION

This application is a continuation-in-part of U.S. patent application Ser. No. 16/254,384, entitled "SYSTEM AND METHOD FOR GENERATING PROBABILISTIC PLAY ANALYSES FROM SPORTS VIDEOS", filed on Jan. 22, 2019, which is hereby incorporated by reference. This application is also a continuation-in-part of PCT International Patent Application No. PCT/US20/14644, entitled "SYSTEM AND METHOD FOR GENERATING PROBABILISTIC PLAY ANALYSES FROM SPORTS VIDEOS", filed Jan. 22, 2020, which claims priority to U.S. patent application Ser. No. 16/254,384, which are hereby incorporated by reference. U.S. patent application Ser. No. 16/254,384 is a continuation-in-part of U.S. patent application Ser. No. 15/934,822, entitled "SYSTEM AND METHOD FOR GENERATING A HIGHLIGHT REEL OF A SPORTING EVENT", filed Mar. 23, 2018, and claims priority to U.S. Provisional Application No. 62/619,115, entitled "SYSTEM AND METHOD FOR GENERATING PROBABILISTIC PLAY ANALYSES FROM SPORTS VIDEOS", filed Jan. 19, 2019, which are hereby incorporated by reference. U.S. patent application Ser. No. 15/934,822 is a continuation-in-part of U.S. patent application Ser. No. 15/444,098, entitled "SYSTEM AND METHOD FOR COMMUNICATING VIDEO OF A SPORTING EVENT", filed Feb. 27, 2017, which is a divisional of U.S. patent application Ser. No. 15/052,728, entitled "SYSTEM AND METHOD FOR CREATING A SPORTS VIDEO", filed Feb. 24, 2016, which claims priority to U.S. Provisional Application No. 62/120,127, entitled "SYSTEM AND METHOD FOR CREATING A SPORTS VIDEO", filed Feb. 24, 2015, which are hereby incorporated by reference. U.S. patent application Ser. No. 15/934,822 further claims priority to U.S. Provisional Application No. 62/475,769, entitled "SYSTEM AND METHOD FOR EDITING VIDEO OF A SPORTING EVENT", filed Feb. 23, 2017, U.S. Provisional Application No. 62/612,721, entitled "SYSTEM AND METHOD FOR GENERATING A HIGHLIGHT REEL OF A SPORTING EVENT", filed Jan. 1, 2018, and U.S. Provisional Application No. 62/612,991, entitled "SYSTEM AND METHOD FOR GENERATING A HIGHLIGHT REEL OF A SPORTING EVENT", filed Jan. 2, 2018, which are hereby incorporated by reference.

BACKGROUND

Sports has a wide range of players, levels, supporters, and fans. Players may range from beginners (e.g., 4 years old and higher) to professionals. The levels of sports teams may range from beginners through professionals. Supporters of sports teams and players may include family members, assistants, volunteers, former players, and coaches. Fans may include family members and people who like the sport, team, or team members.

Coaches and players often find reviewing practice and game video footage useful in helping players and teams improve their performance. In the case of an individual player, video footage of the individual player's actions is beneficial to view so that the individual player can see what he or she did well and not so well.

With low-funded teams (e.g., non-professional teams), video editors who can review video footage to identify specific segments related to specific players is generally not an option due to cost. Moreover, even if a video editor is willing to work at no or low cost, the amount of time needed to create video segments for specific players is not always feasible due to games being long and manually reviewing the footage to identify the specific players in specific video segments is difficult, especially when there are multiple players who enter and exit video scenes.

Beyond the obvious use of the video footage to assist players and coaches in improving skills and teamwork, families and friends of a player often like to view the player during a game without having to watch or fast forward through an entire game, but rather be able to see the player when he or she is "in action." Additionally, video scrapbooks or gifts for family, such as grandparents who live far away, are often desired, but tend to be costly due to tedious editing processes that currently exist. Moreover, for gifted athletes who want to provide video clips to prospective colleges or professional teams, or scouts of professional teams looking for gifted athletes, creation of quality video segments that meet their respective needs is a time consuming process.

For amateur sports, there is a desire to view the players from multiple angles and from unique angles (e.g., from goal viewpoint, overhead, sidelines, home team side, away team side). However, the availability of collecting such video footage is not possible for a variety of reasons, and establishing a coordinated control structure for such a video production is generally not financially possible.

Hence, there is a need for a system and process (i) to expedite identification of players on sports teams in video footage, (ii) to capture video footage of sport teams from multiple mobile recording devices, possibly disparate recording devices, and from different angles, and (iii) to synthesize and organize video footage, optionally in real-time, that is cost effective.

One of the challenges for individuals who capture video footage of sporting events in which their children (or other athletes) are involved is the difficulty in creating a highlight reel. The highlight reel is generally considered a compilation of video footage that include video clips of the individual and/or team. Heretofore, the ability to extract video clips of desired action has been difficult for a variety of reasons, including not having sufficient footage, having bad angles, missing actual highlights, having to select from many different video clips, having to identify highlights, having to select from many minutes or hours of video clips, time consumption needed, technical acumen needed, and so on. When extensive numbers of video clips are taken or a video of an entire game is recorded, someone has to review the video footage to determine when "highlights" (e.g., an interesting event, such as a touchdown or goal, in a sporting event) occurs. There is therefore a need for a system and process that simplifies the ability to identify and create highlight reels (i.e., video clips of action) of action sports, especially for team sports, for a user.

In addition to the challenges of collecting, organizing, and producing "highlights" from video captured from the sporting events, the ability to utilize the video captured for analytical or other purposes is challenging. Most videos captured from sporting events are captured discreetly, which means the videos are generally unrelated to or not synchronized with other videos that are captured at the same sporting event, especially at non-professional sporting events. As such, the video captured is generally limited to playback and other conventional video editing processes (e.g., generating clips, aggregating clips, identifying players, etc.). However, teams and players may have a desire to use the video for other purposes, such as generating strategies and planning for future games, analyzing player performance, and otherwise.

1. SUMMARY

To provide for a cost effective and expedited process to gather videos at games from multiple video recording devices, such as mobile devices with video recording capabilities (e.g., smart phone), to identify players on sports teams in video footage, character recognition functionality capable of identifying player numbers on jerseys or other items (e.g., vehicles) that are visible within video footage may be utilized to identify players and flag or otherwise identify video footage. By using character or other identifier recognition, an automated video editor to generate video footage clips with one or more specific players within video content of a video may be enabled. In one embodiment, a real-time process may be used to process the video content that is being captured. Alternatively, a post-processing process may be utilized. As a player's number may be visible and non-visible during a particular segment during which the player is still in the scene (e.g., when the player turns sideways or backwards to the camera), an algorithm to specify tracking rules or a tracking system may be used to track the player's head and/or other features so that video clips in which the player is in the video may be identified.

In capturing the video, and in one embodiment, a mobile app may be available for users who attend sporting events to download to a mobile device. The mobile app may enable video to be captured and uploaded. In using the mobile app, an actual and/or relative timestamp may be applied to video content captured by users at a sporting event, thereby enabling the video content captured by multiple users to be synchronized. By multiple users, such as family members, team staff, or otherwise, the video content may be captured at multiple angles and used for editing purposes.

In an embodiment, a system for processing video of a sporting event may include an input/output unit configured to communicate over a communications network and receive image data, a storage unit configured to store image data captured by multiple users of a single event, and a processing unit in communication with the input/output unit and storage unit. The processing unit may be configured to receive image data being captured real-time from an electronic device. The image data may be portions of complete image data of unknown length while being captured by the electronic device. The image data portions may be processed to identify at least one unique identifier associated with a player in the sporting event. Successive video segments may be stitched together. The receiving, processing, and stitching of the image data may be repeated until an end of video identifier is received. The completed stitched video may be stored in the storage unit for processing.

One embodiment of a method for processing video of a sporting event may include receiving image data being captured real-time from an electronic device. The image data may be portions of complete image data of unknown length while being captured by the electronic device. The image data portions may be processed to identify at least one unique identifier associated with a player in the sporting event. Successive video segments may be stitched together. The receiving, processing, and stitching of the image data may be repeated until an end of video identifier is received. The completed stitched video may be stored for processing.

In one embodiment, the system may enable a user to enter a particular player number and the system may identify all video frames and/or segments in which the player wearing that number and optionally color of the uniform of the player appears so that the user may step to those video frames and/or segments. If there are multiple, continuous frames in which the player wearing the number is identified, the system may record the first frame of each of the continuous frames so that the user can quickly step through each different scene. For example, in the case of football, each line-up in which a player participates may be identified. If a sport, such as soccer, is such that the player's number tends to be visible and non-visible during a play simply because of the nature of the sport, then the system may use a tracking system to identify when the player (not the player's number) is visible in a video clip, thereby identifying entire segments during which a player is part of the action. In one embodiment, an algorithm may be utilized to keep recording for a certain number of frames/seconds between identifications of a player.

In one aspect, in response to identifying a particular number on a uniform of a player, a notification may be generated and sent to one or more mobile devices participating in a group at a sporting event to alert fans of action involving one or more players. If a mobile app that operates as a social network, for example, is being used by fans at a game, then each of the fans using the app may set search criteria so that in the event of another fan at the game capturing video content with that search criteria, a notification may be sent to the fan who sent the search criteria and be able to download that video content to view the video content that matched the search criteria. In one embodiment, the search criteria may include player number, team name and/or uniform colors, action type, video capture location (e.g., home team side, visitor team side, end zone, yard line, etc.).

One embodiment of a system for processing video of a sporting event may include an input/output unit configured to communicate over a communications network and receive image data. A storage unit may be configured to store image data captured by a plurality of users of a single event. A processing unit may be in communication with the input/output unit and the storage unit. The processing unit may be configured to receive image data being captured real time from an electronic device, the image data being portions of complete image data of unknown length while being captured by the electronic device. The image data portions may be processed to identify at least one unique identifier associated with a player in the sporting event. Successive video segments may be stitched together. The receiving, processing, and stitching of the image data may be repeated until an end of video identifier is received. The completed stitched video may be stored in the storage unit for processing.

One method for creating a sports video may include receiving video of a sporting event inclusive of players with unique identifiers on their respective uniforms. At least one unique identifier of the players in the video may be identified. Video segments may be defined from the video inclusive of at least one unique identifier. Video segments inclusive of at least one unique identifier may be caused to be individually available for replay.

One method for generating video content may include receiving multiple video content segments of a sporting event from video capture devices, the video capture devices operating to crowdsourced video content. A player in one or more of the video content segments may be identified. At least a portion of video content inclusive of the player may be extracted from the one or more video content segments with the player, and be available for viewing by a user.

One method for sharing video of a sports event may include receiving, by a processing unit via a communications network, a request inclusive of at least one search parameter from a video capture device. Video content being received by a plurality of video capture devices at the sports event may be processed to identify video content from any of the video capture devices at the sports event inclusive of the at least one search parameter. Responsive to identifying video content inclusive of the at least one search parameter, video content may be communicated by the processing unit via the communications network to the video capture device.

To simplify the creating of a highlight video or highlight reel (i.e., select video clips of individual players or multiple players of a team), different types of highlight videos may be created, including a personal highlight video and a team highlight video. For a personal highlight video, a highlight video may be created that features a particular player. For a team highlight video, a highlight video may be created that includes selected or all of the players within the video (i.e., within at least one video clip that is included within an entire video). Creation of the highlight videos may be performed through use of a computer-implemented algorithm that is automated, at least to a certain extent.

In selecting the video clips, different levels of priorities may be assigned to video clips. In an embodiment, four levels of priority may be assigned to video clips based on different factors of user interaction and/or content. An algorithm may populate a highlight video for a preselected amount of time or an amount of time of the aggregated selected videos. For a team video, a highlight video may be formed in the same or similar manner as the individual highlight video, but may additionally be configured to include each of the players of the team (or a select list of players, such as only those who played or starters).

One embodiment of identifying video to set as a highlight may include automatically identifying a particular action of a referee, umpire, player, coach, fans, or anyone else. The action may be sport specific, but not an action that is part of playing a sport itself. For example, in a football game, the action may be made by the referee who moves his or her arms into a certain machine-identifiable position. For a car race, image processing may be used to identify that a flagman raised a yellow or checkered flag. In the case of a player, an identification of crossing a goal line and/or "spiking" a football may also be used as an identifying action to signify a touchdown, but such an action is not an action of playing the sport, just in the celebration of an action having been successfully completed. Still yet, if fans are captured in a video and they clap, stand in unison with cheering, or perform some other highlight associated action, then a highlight may be identified. As is further described herein, an identification of a highlight point in a video clip or segment may define a point around which a predetermined or requested buffer may be established before and after the point. As an example, in the event that the referee raises his or her hands to signify a touchdown, a buffer may be started a certain amount of time (e.g., 5 seconds) prior to the touchdown and certain amount of time, which may be the same or different than the time prior to the touchdown.

Video of sporting events may be processed to produce three-dimensional (3D) representations (e.g., X's and O's) of players captured in the video by utilizing video capture of players from at least three different cameras. In doing so, the videos from the three different angles may be synchronized utilizing relative (e.g., game time) or actual time. The representations and position tracking of the players may be used in a variety of ways, including, but not limited to (i) creating plays, (ii) recruiting/drafting players, and (iii) gaming. For example, the ability to create plays or "what-if scenarios" may be generated by coaches, for example, by selecting player and/or team tracking of opponents from a database and matching a coach's player(s) or an entire team from the database to run various scenarios against one another. A user, such as a coach, may run a scenario generator that is selectable from a coach's playbook and/or utilize statistics from multiple historical videos in which player(s) were tracked. In another example, recruiting and drafting of players may be enhanced by a user by evaluating performance from previous games, and optionally inserting those performance references into new game situations (e.g., matching offensive player against a defensive player). As another example, a user may create a gaming scenario by capturing a player, such as him or herself, and insert the player's performance into a game (e.g., virtual matchup against another player or into a game situation). A statistical analysis may be performed to produce gameplay (e.g., penalty shots in a soccer game). The statistical analysis may include analyzing and producing statistics from historical games so that the player's strengths and weaknesses may be applied to a virtual player in a video game or other use, such as those described above. Other applications of tracking in generating statistics from videos captured using 3D tracking, for example, may be utilized, as well.

One embodiment of a computer-implemented method may include receiving at least three video clips of a sporting event, where each of the video clips may (i) be simultaneously captured over at least a portion of time, and (ii) include at least one common player wearing an indicia on a jersey that is distinguishing from indicia on other players. Tracking locations of the at least one common player captured in the at least three video clips may be generated by triangulating distances of the common player(s) in the video clips. Statistical information of the common player(s) may be generated from the tracking locations. The common player(s) may be represented on a graphical display. The common player(s) may be controlled by applying at least one of the tracking locations and statistical information of the common player(s).

2. BRIEF DESCRIPTION OF THE DRAWINGS

Illustrative embodiments of the present invention are described in detail below with reference to the attached drawing figures, which are incorporated by reference herein and wherein:

FIG. 5 is an illustration of an illustrative sports video indicative of video segments that include a particular player wearing a particular player number;

FIG. 6B is an illustration of an extracted video shown to include video segments B1, A2, and B3, which were originally in videos A and B of FIG. 6A;

FIG. 9 is a flow diagram of an illustrative process for processing and creating an extracted video with particular search parameters;

FIG. 10 is a flow diagram of an illustrative process for crowdsourcing video content;

FIG. 11 is a flow diagram of an illustrative process used to create a video from video segments;

FIG. 14B is an illustration of the video recording device displaying a user interface, where the user has selectably changed the view from an "instant replay" view to a "live streaming" view by selecting the video feed type soft-button; and FIG. 14C is an illustration of the video recording device presenting user interface, where the user interface includes a video display region for video content to be displayed.

Figure 15:
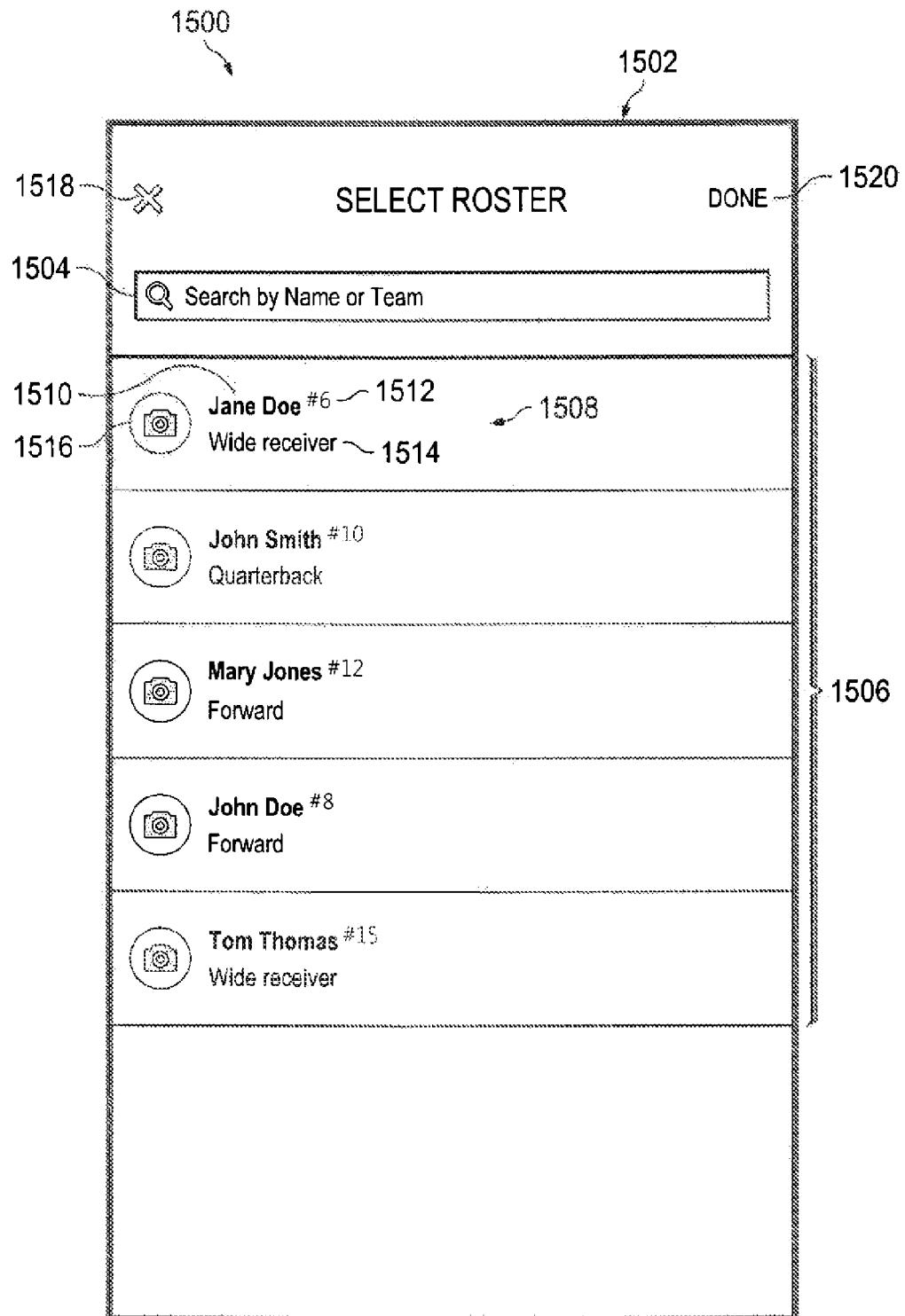
Figure 16:
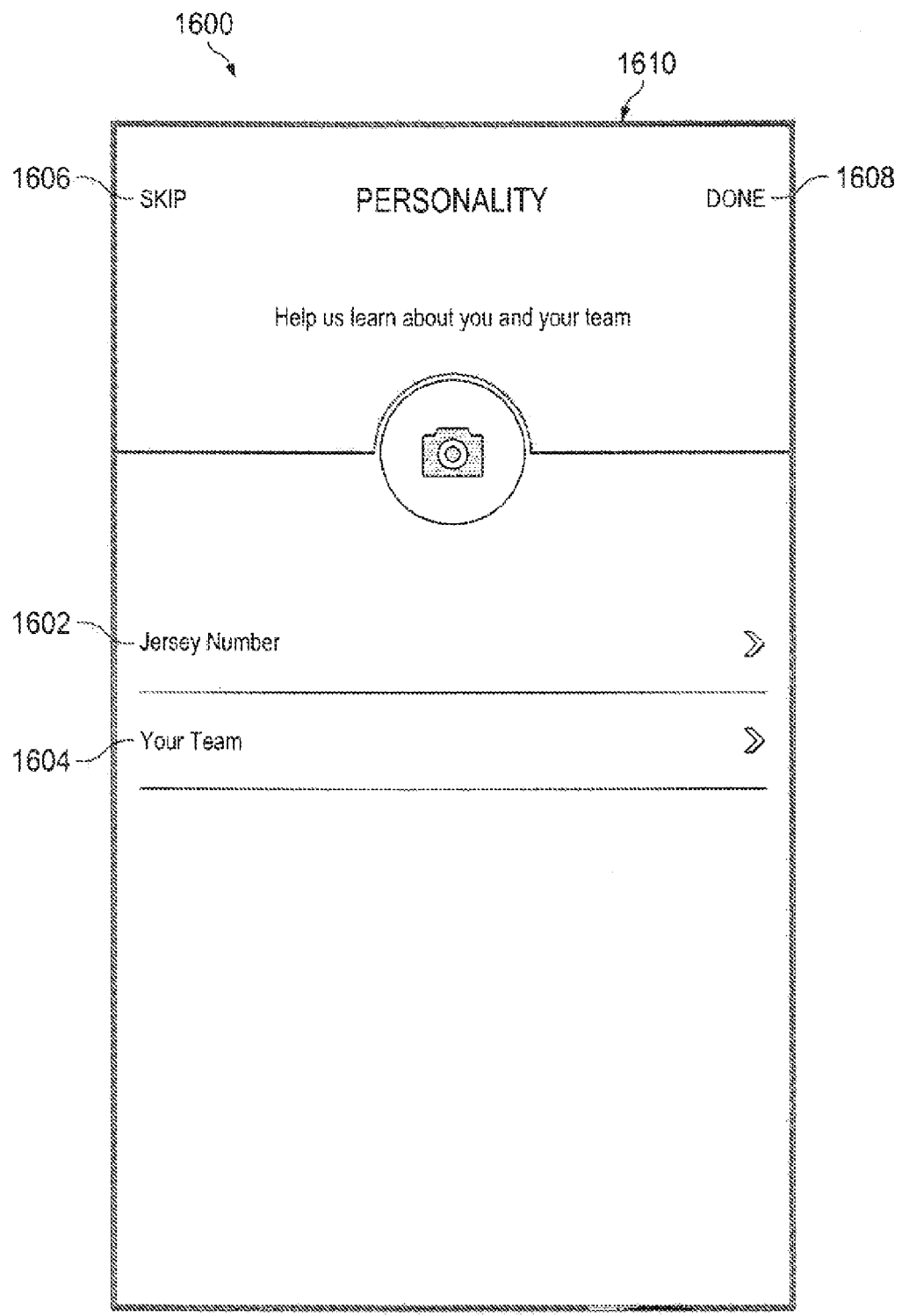
Figure 17:
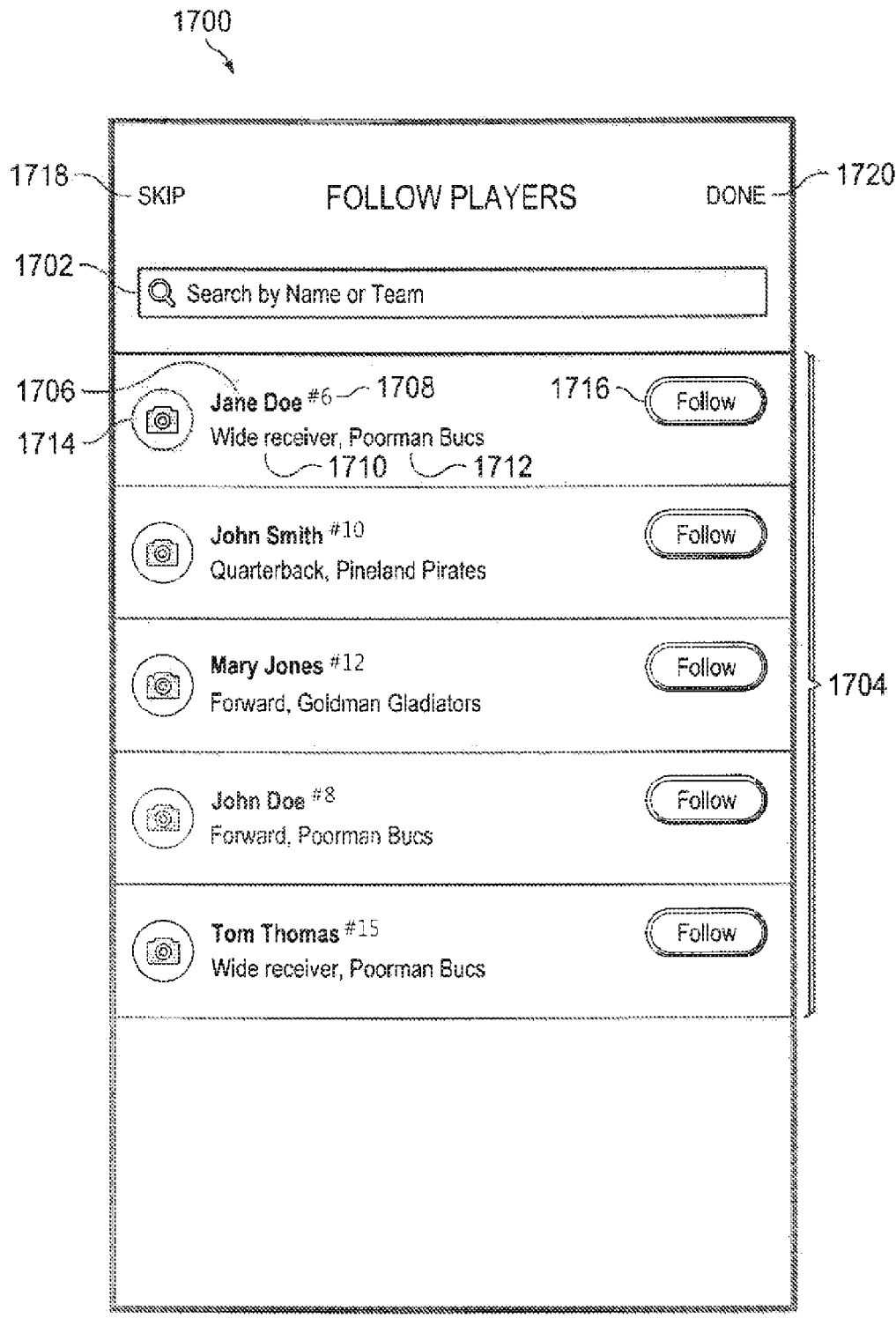
Figure 18A:
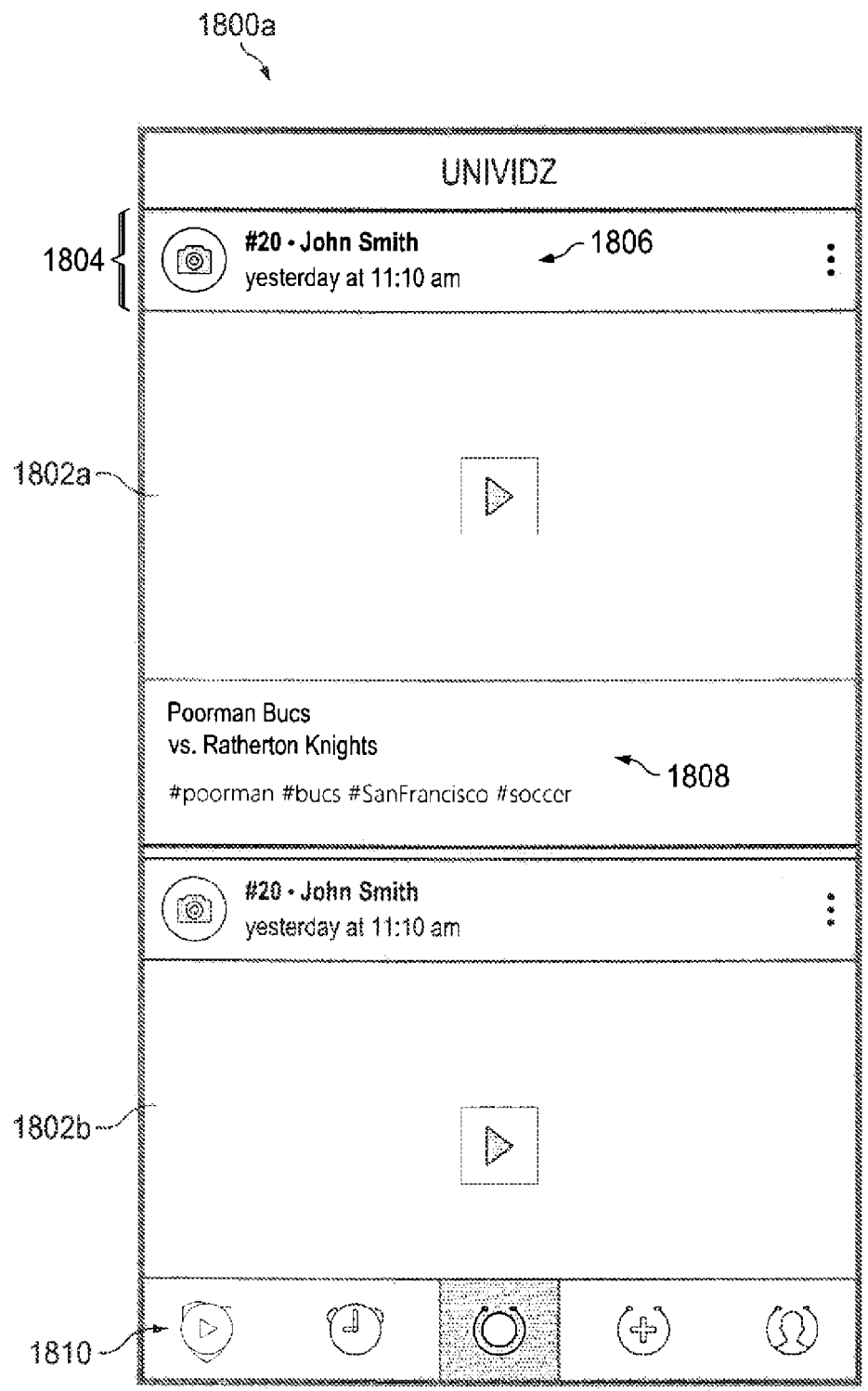
Figure 18B:
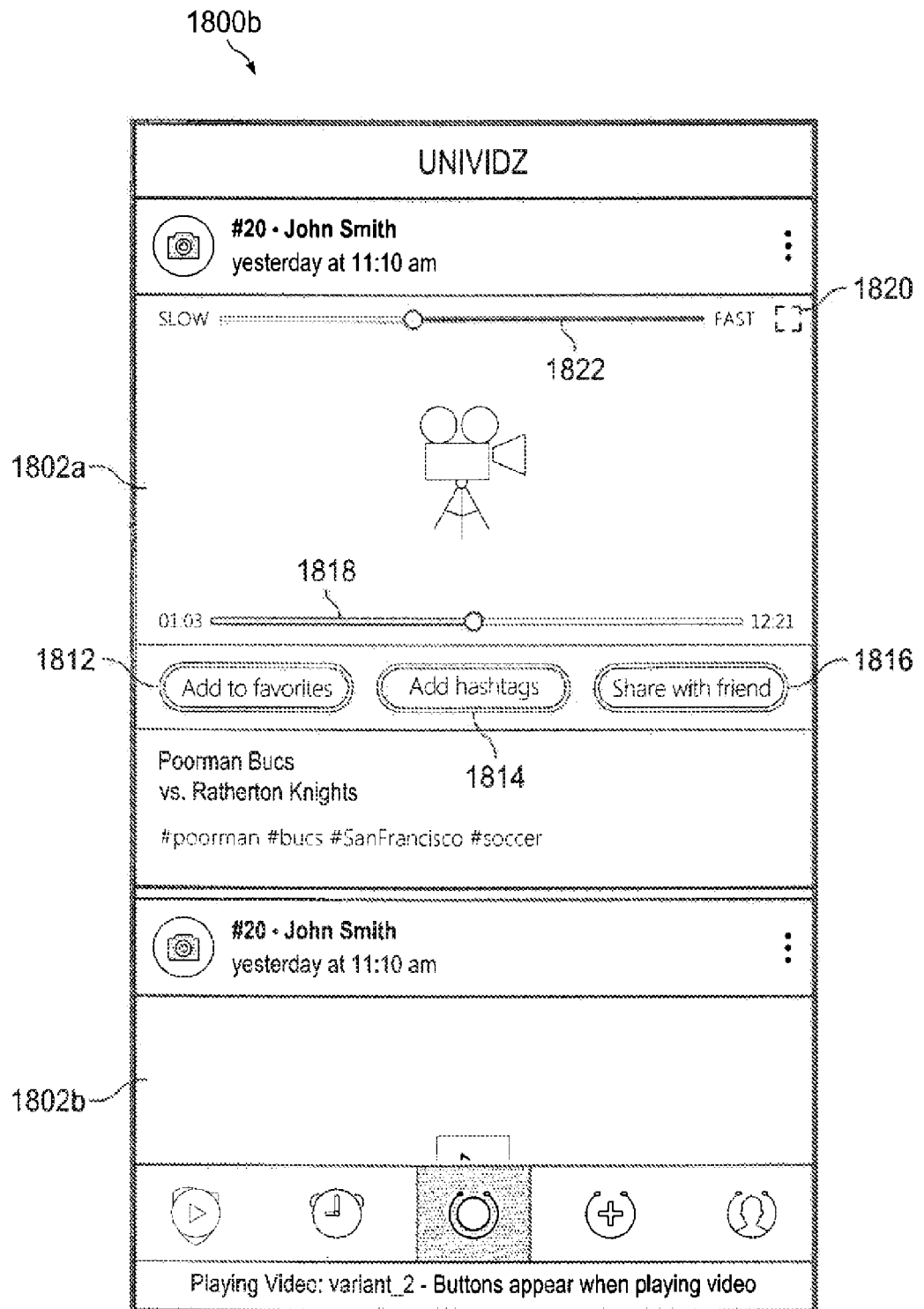
Figure 19:
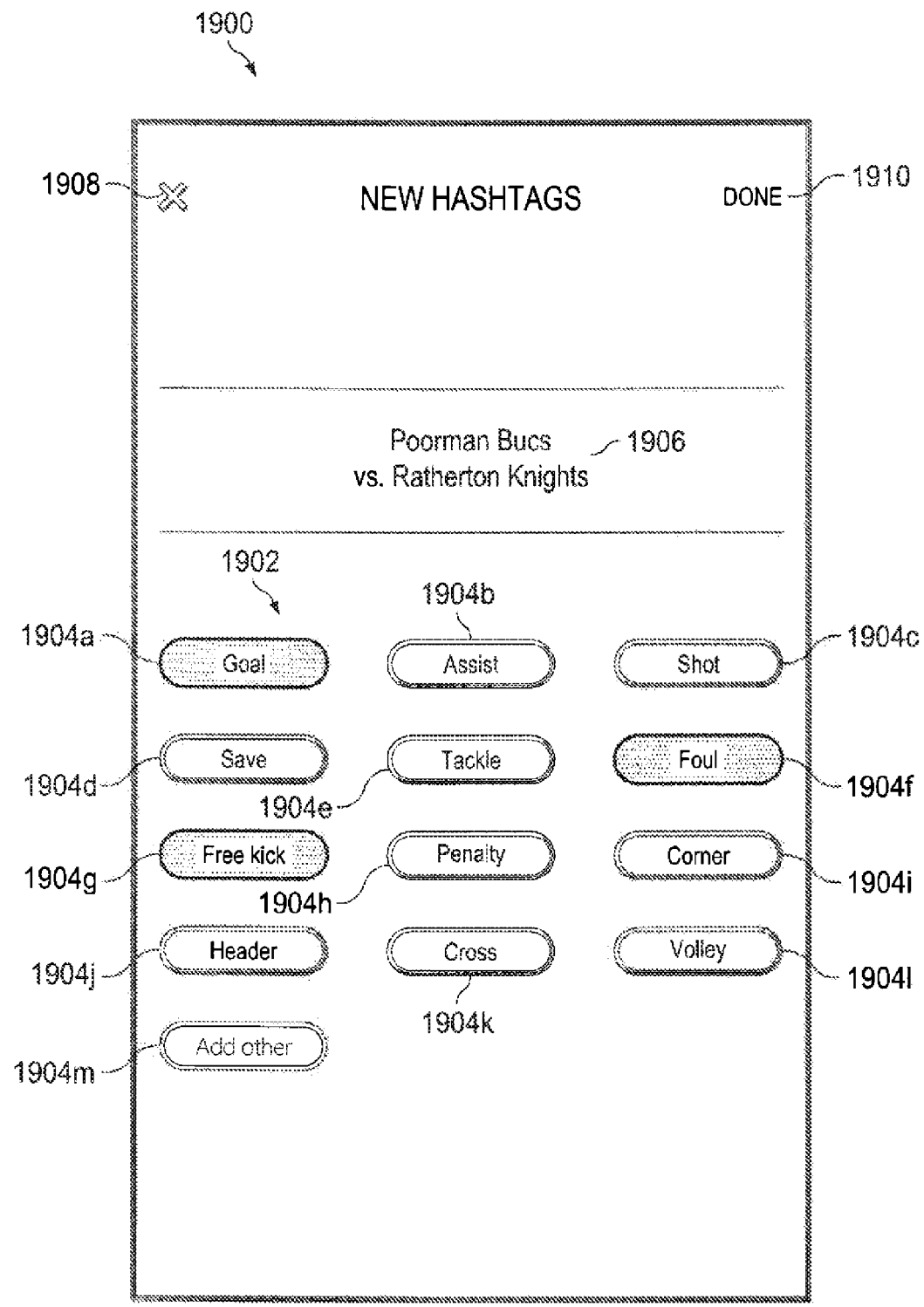
Figure 21A:
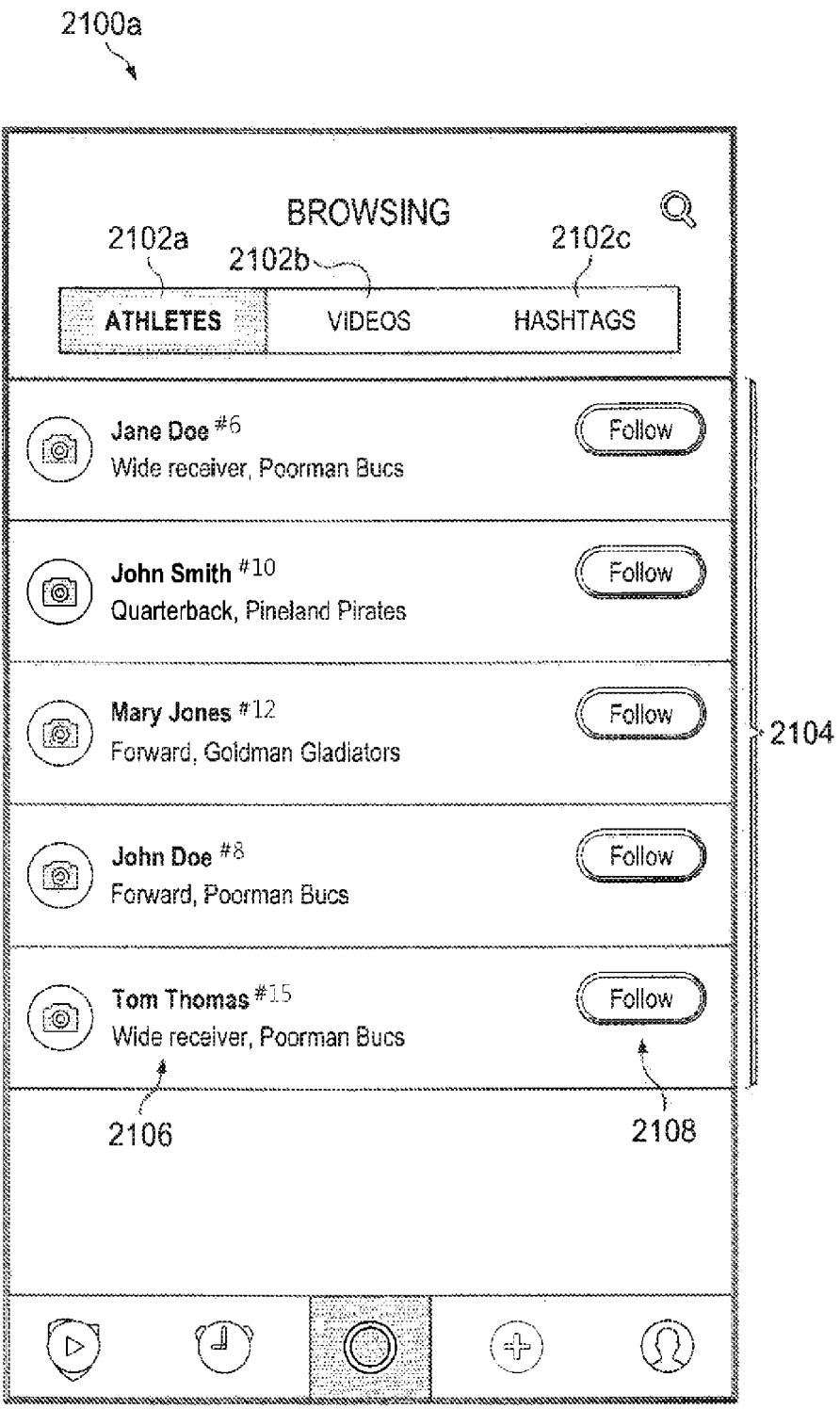
Figure 21B:
Figure 21C:
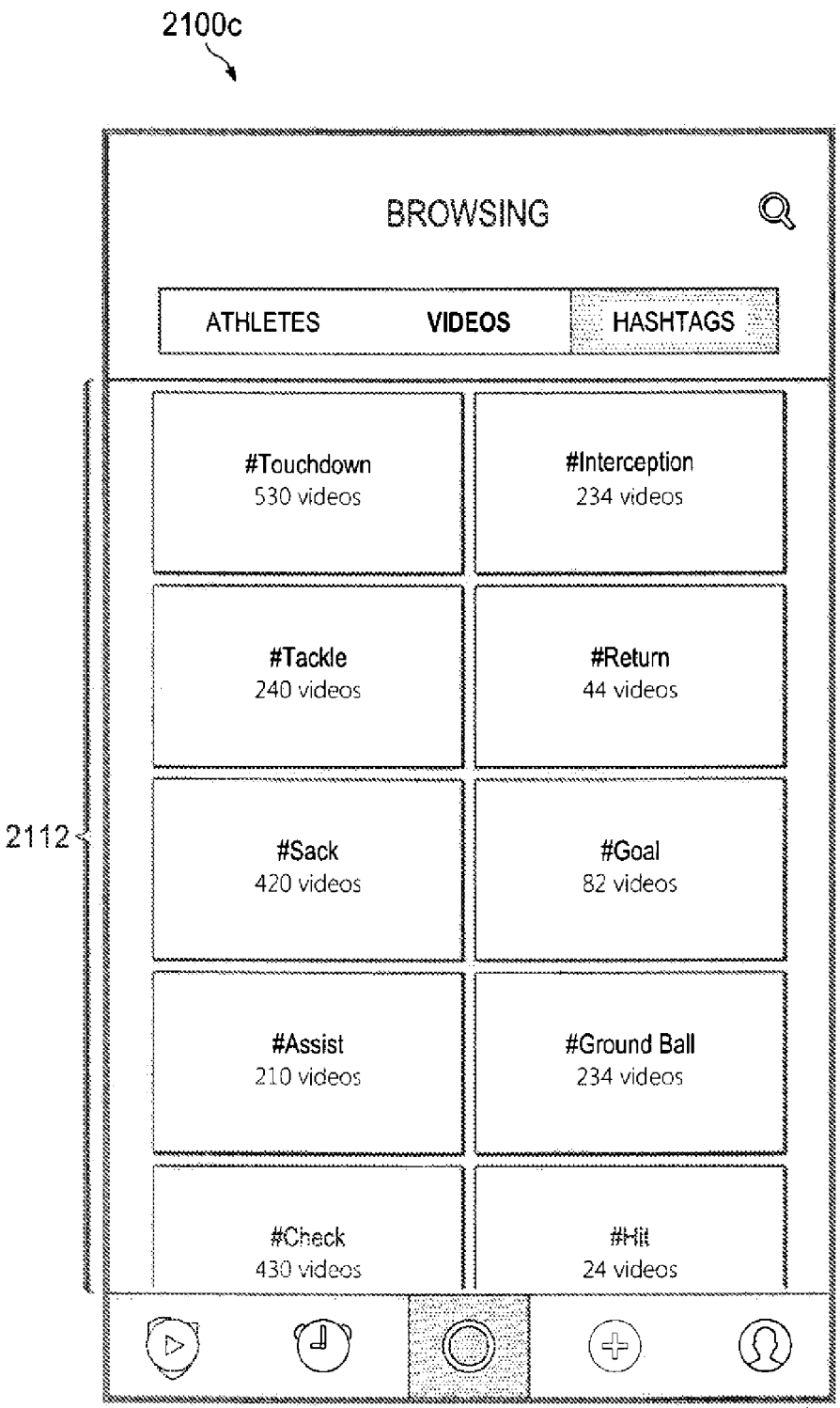
Figure 22A:
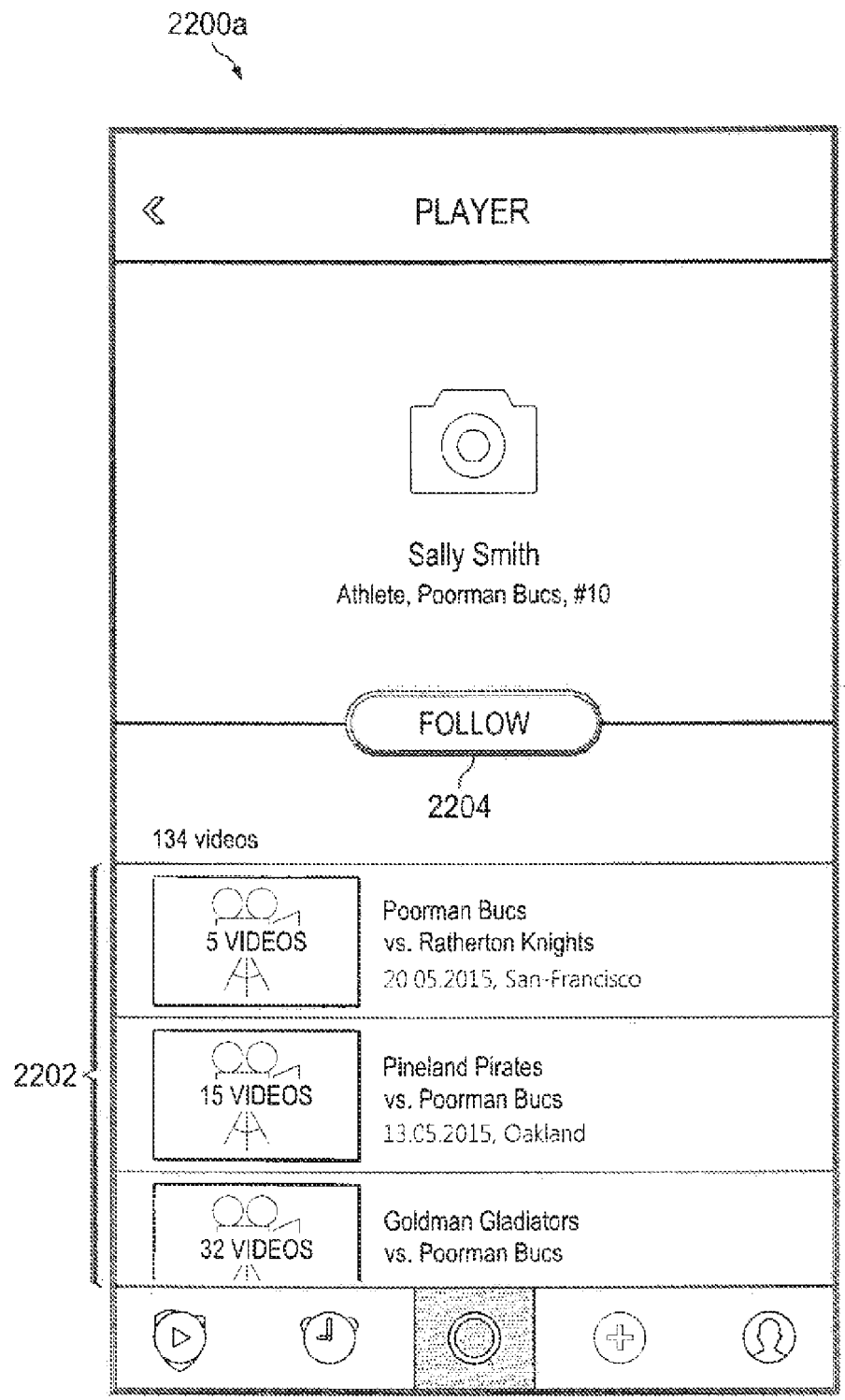
Figure 22B:
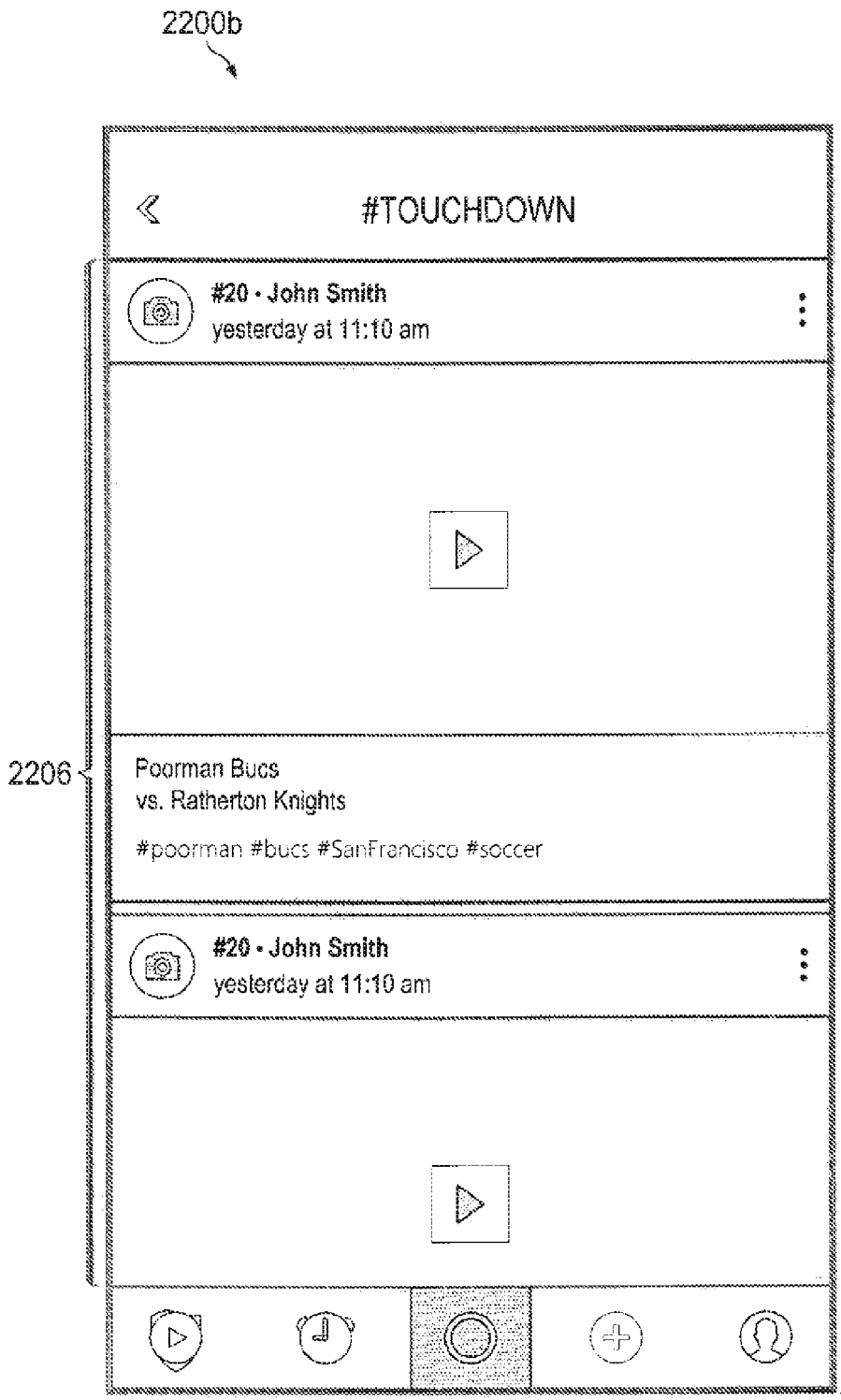
Figure 22C:
Figure 23:
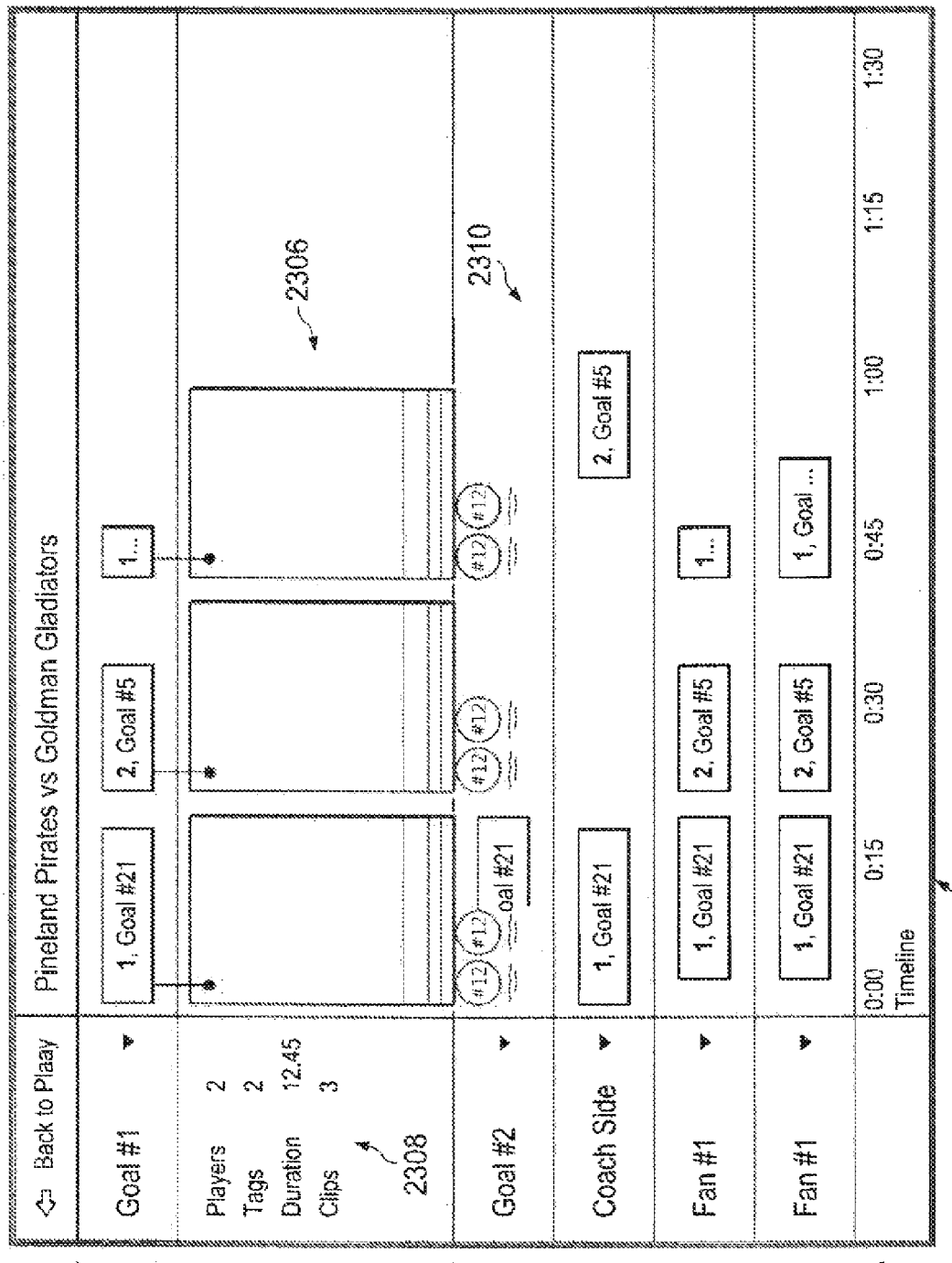
Figure 24:
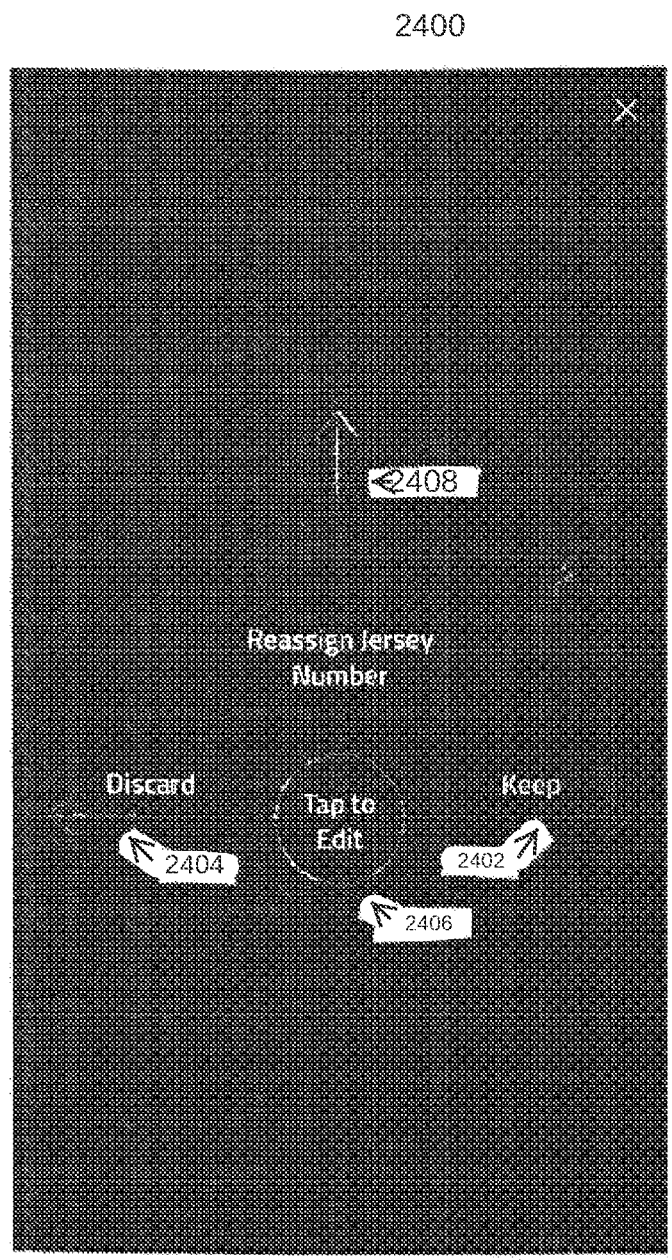
Figure 25:
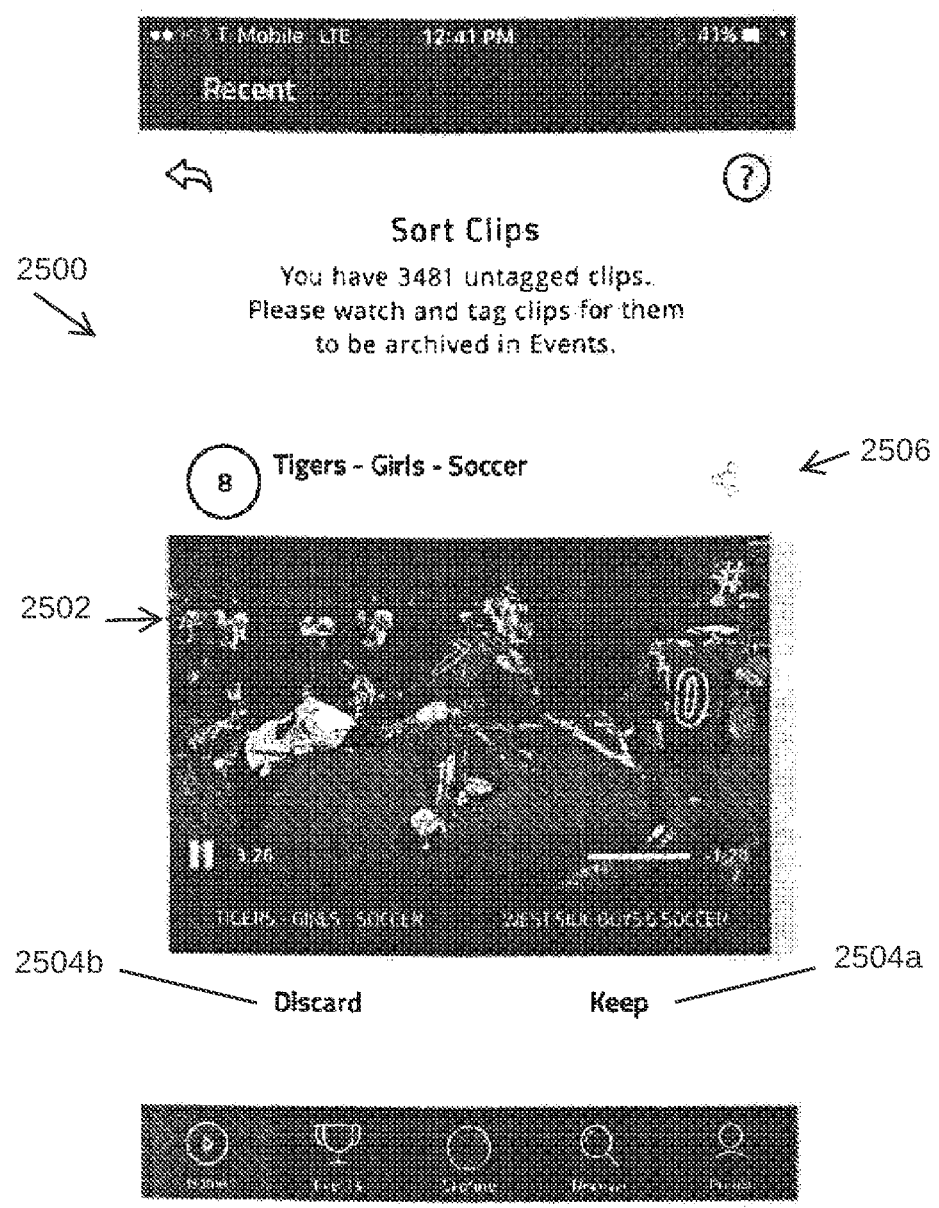
Figure 26:
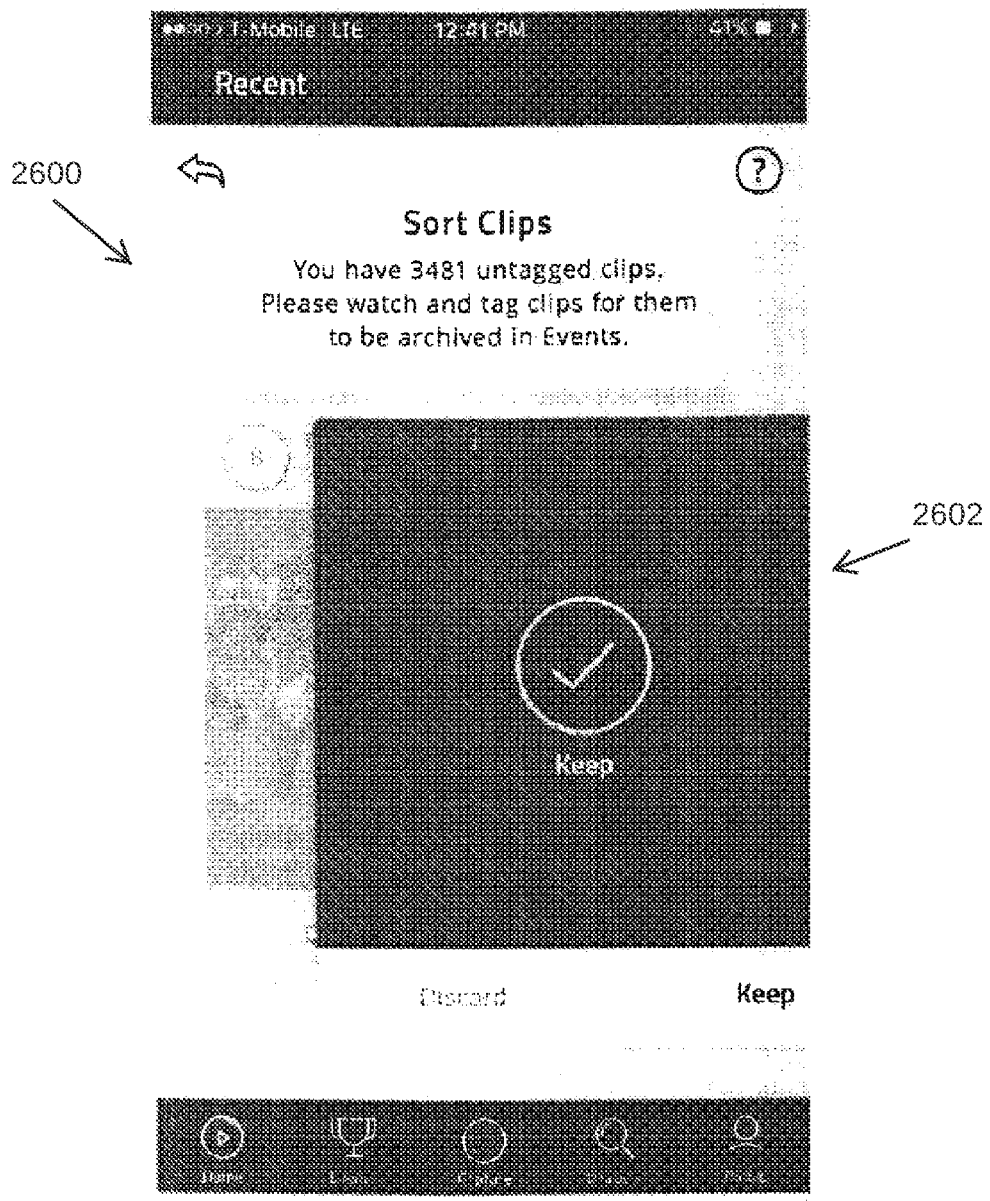
Figure 27:
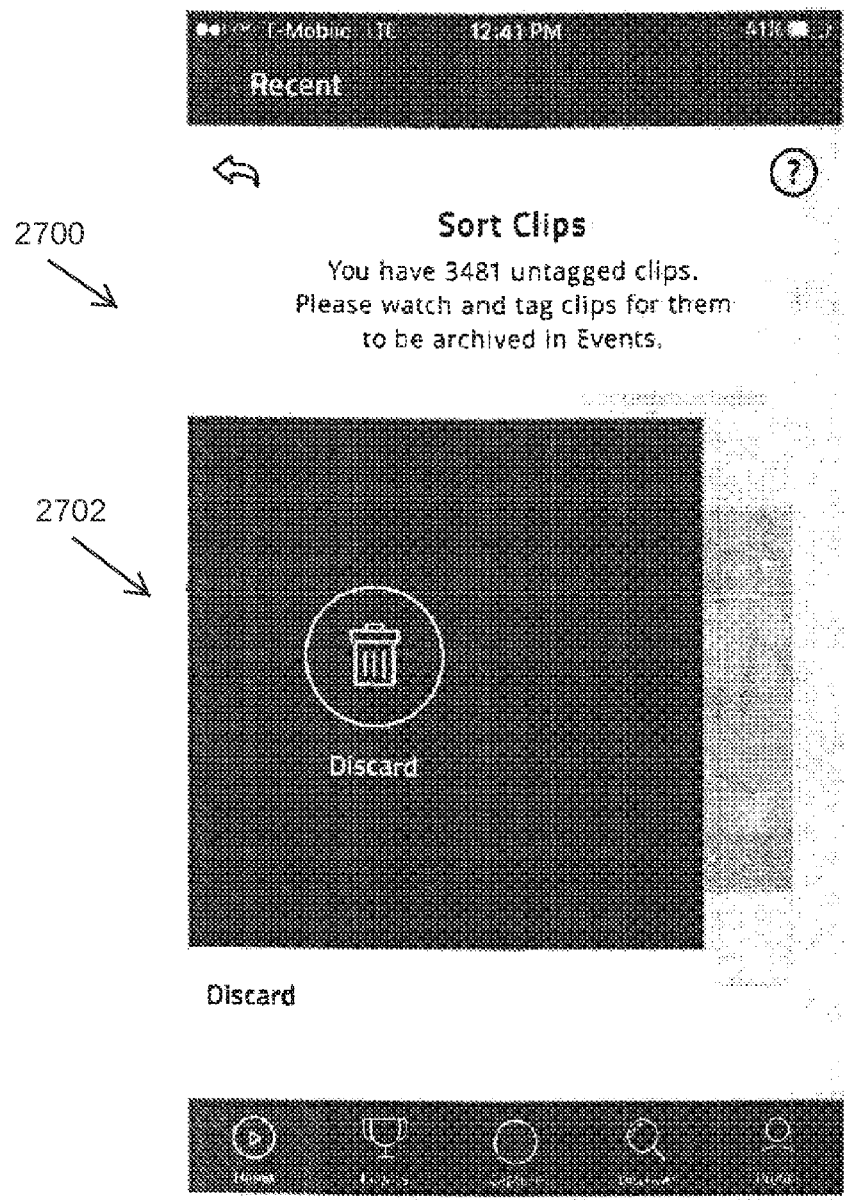
Figure 28:
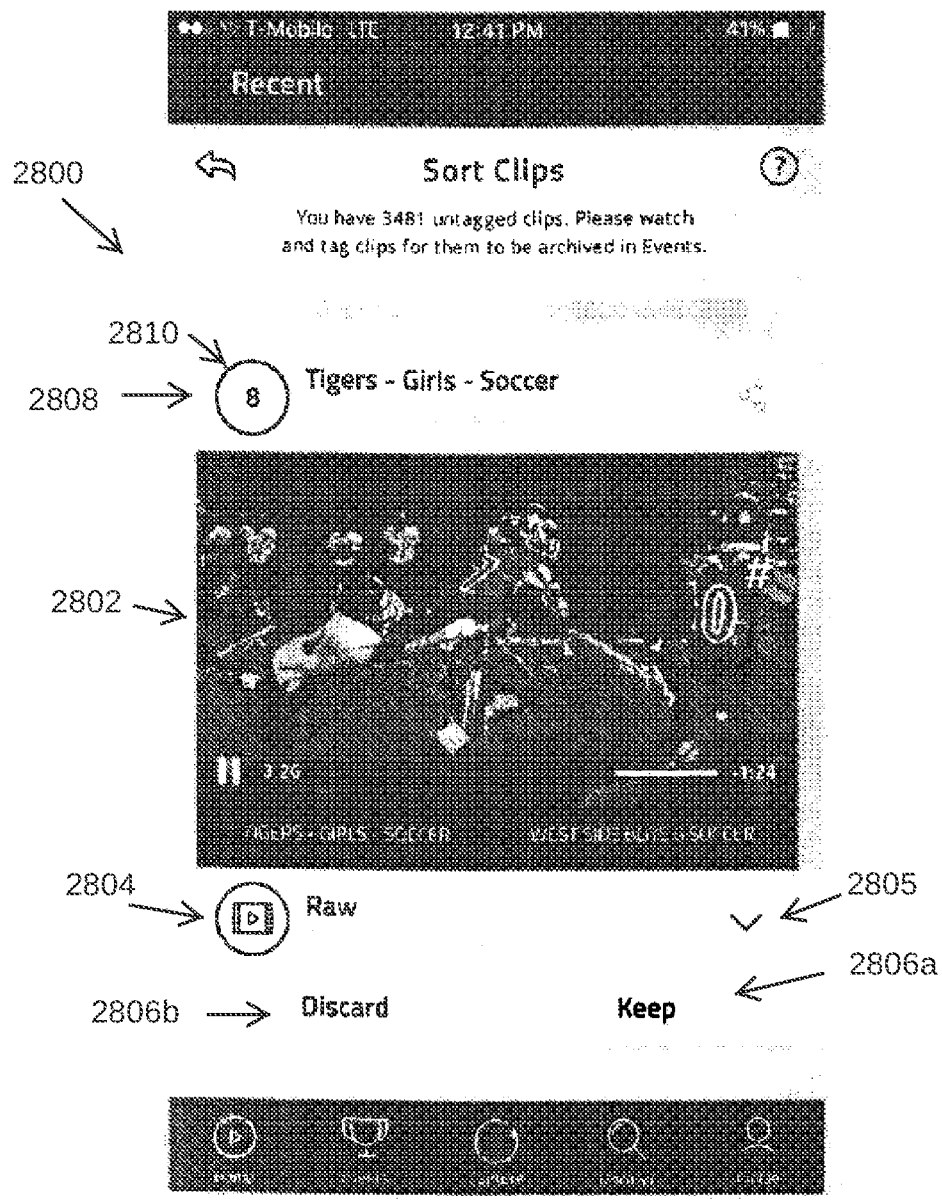
Figure 29:
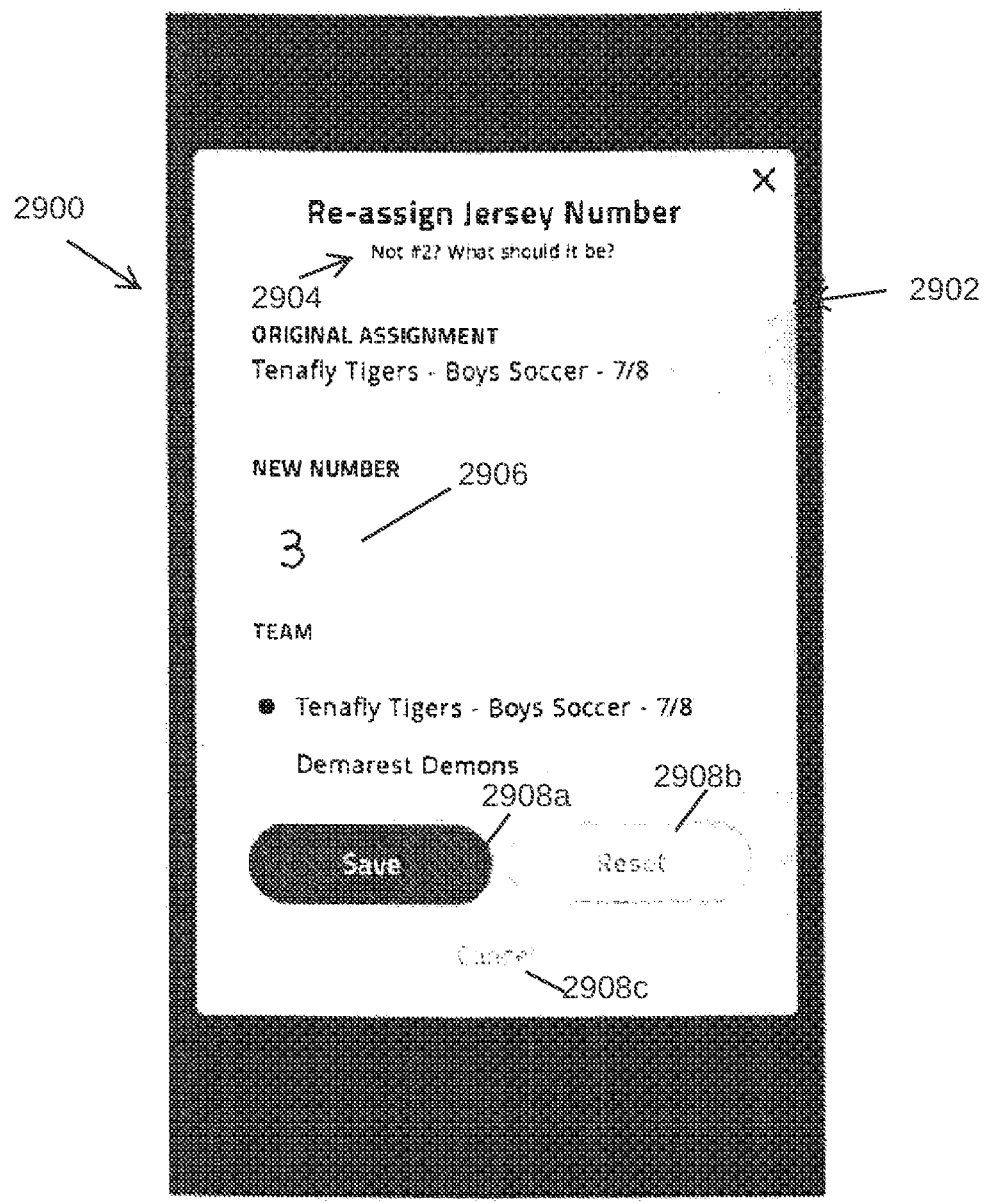
Figure 30:
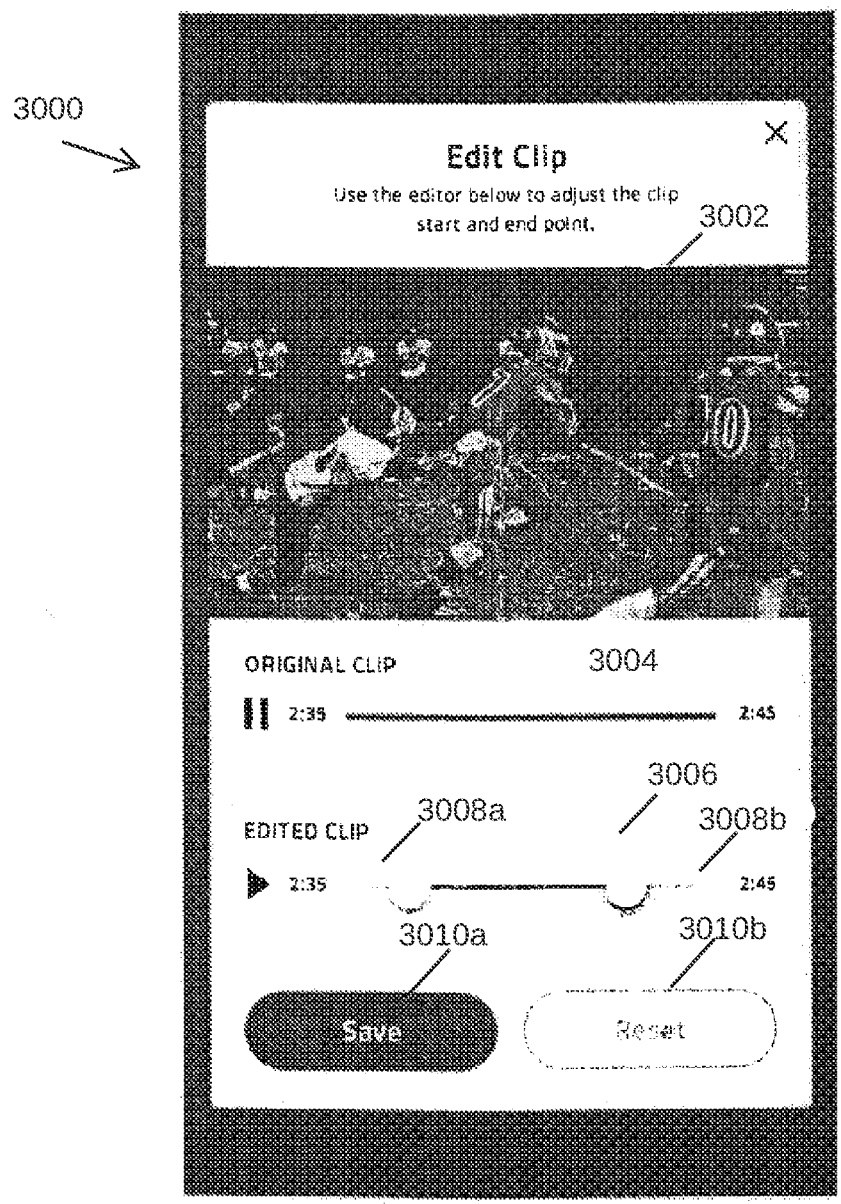
Figure 32:
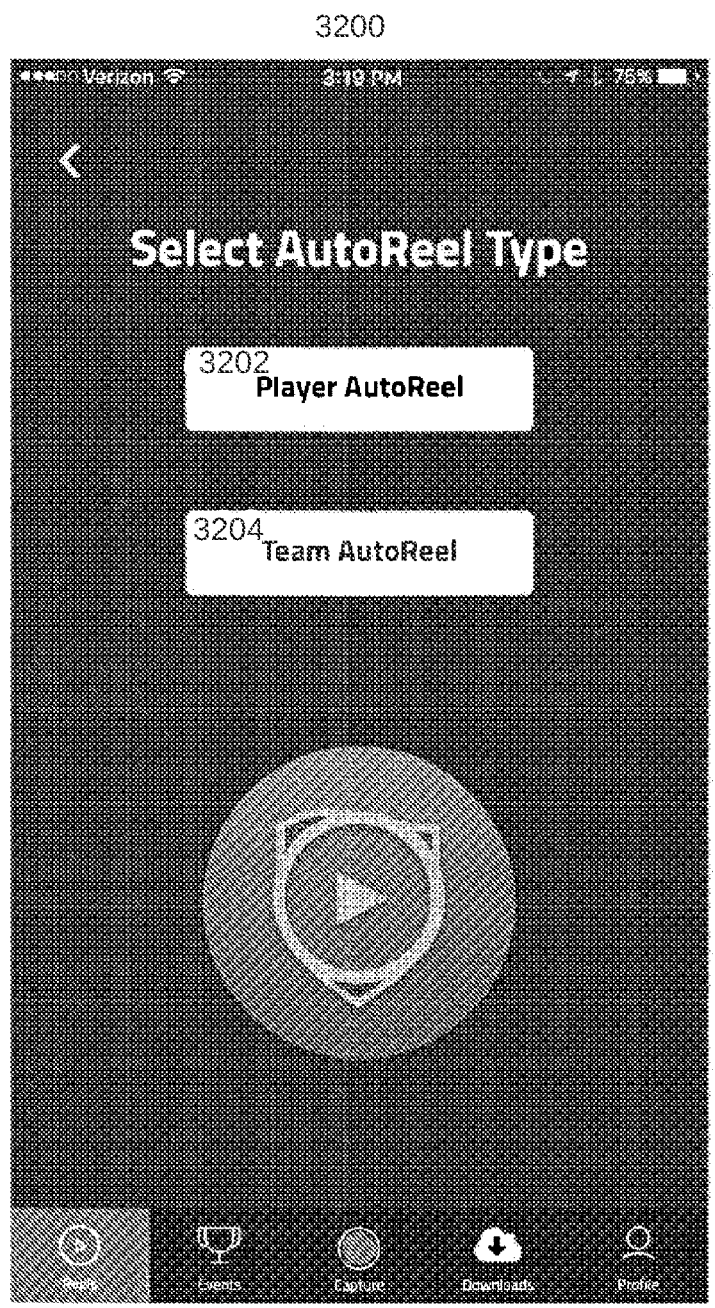

FIG. 15 is a screenshot of an illustrative user interface for a coach to sign-up and select a roster for the team;

FIG. 16 is a screenshot of an illustrative user interface for a player to sign-up and select or submit player information, including jersey number and team name via respective user interface input elements;

FIG. 17 is a screenshot of an illustrative user interface for a fan or other user to sign up and select player(s) to follow;

FIG. 18A is a screenshot of an illustrative user interface inclusive of illustrative video feeds are shown to enable a user to view one or more videos of a player captured during a sporting event;

FIG. 18B is a screenshot of an illustrative user interface inclusive of the video feeds of FIG. 18A;

FIG. 19 is a screenshot of an illustrative user interface that enables a user to assign one or more hashtags to a video segment or clip;

FIGS. 20A-20F are screen shots of an illustrative user interface is shown to enable a user to create an event, such as a soccer game;

FIGS. 21A-21C are screenshots of an illustrative user interface that may provide for a user to browse content collected at one or more events by selecting an "athletes" soft-button, "videos" soft-button, and "hashtags" soft-button;

FIGS. 22A-22C are screenshots of user interfaces that may provide for searching for videos;

FIG. 23 is a user interface that may provide for a video editing environment in which video clips taken by different users at different angles may be listed along a first axis and time of the video clips may be along a second axis;

FIG. 24 is an illustration of an illustrative user interface that provides instructions for a user to control functionality of the video editing environment;

FIG. 25 is an illustration of an illustrative user interface for enabling a user to download video clips or share the video clips on social media;

FIG. 26 is a screenshot of an illustrative user interface that may be displayed in response to the user using the user interface to keep a video clip;

FIG. 27 is a screenshot of an illustrative user interface that may be displayed in response to the user using the user interface to discard a video clip;

FIG. 28 is a screenshot of an illustrative user interface that may be displayed after capturing a video clip;

FIG. 29 is a screenshot of an illustrative user interface on which a window or page may be displayed to enable a user to reassign a jersey number to a selected video clip;

FIG. 30 is a screenshot of an illustrative user interface that enables the user to edit a video clip;

FIG. 31 is a screenshot of an illustrative user interface for viewing, editing, and selecting videos;

FIG. 32 is a user interface for selecting whether to produce a "Player AutoReel" or a "Team AutoReel;"

Figure 33:
Figure 34:
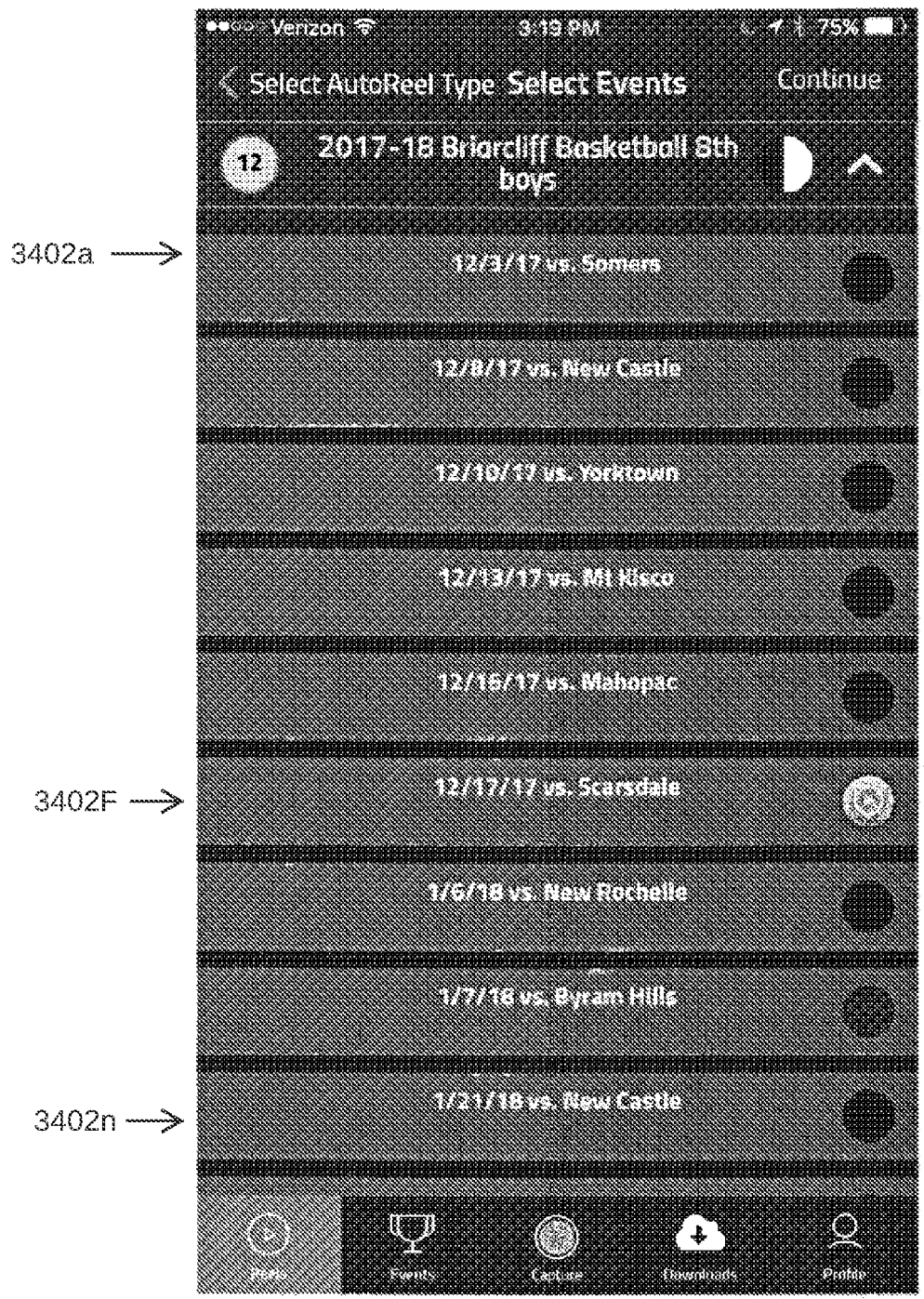
Figure 35:
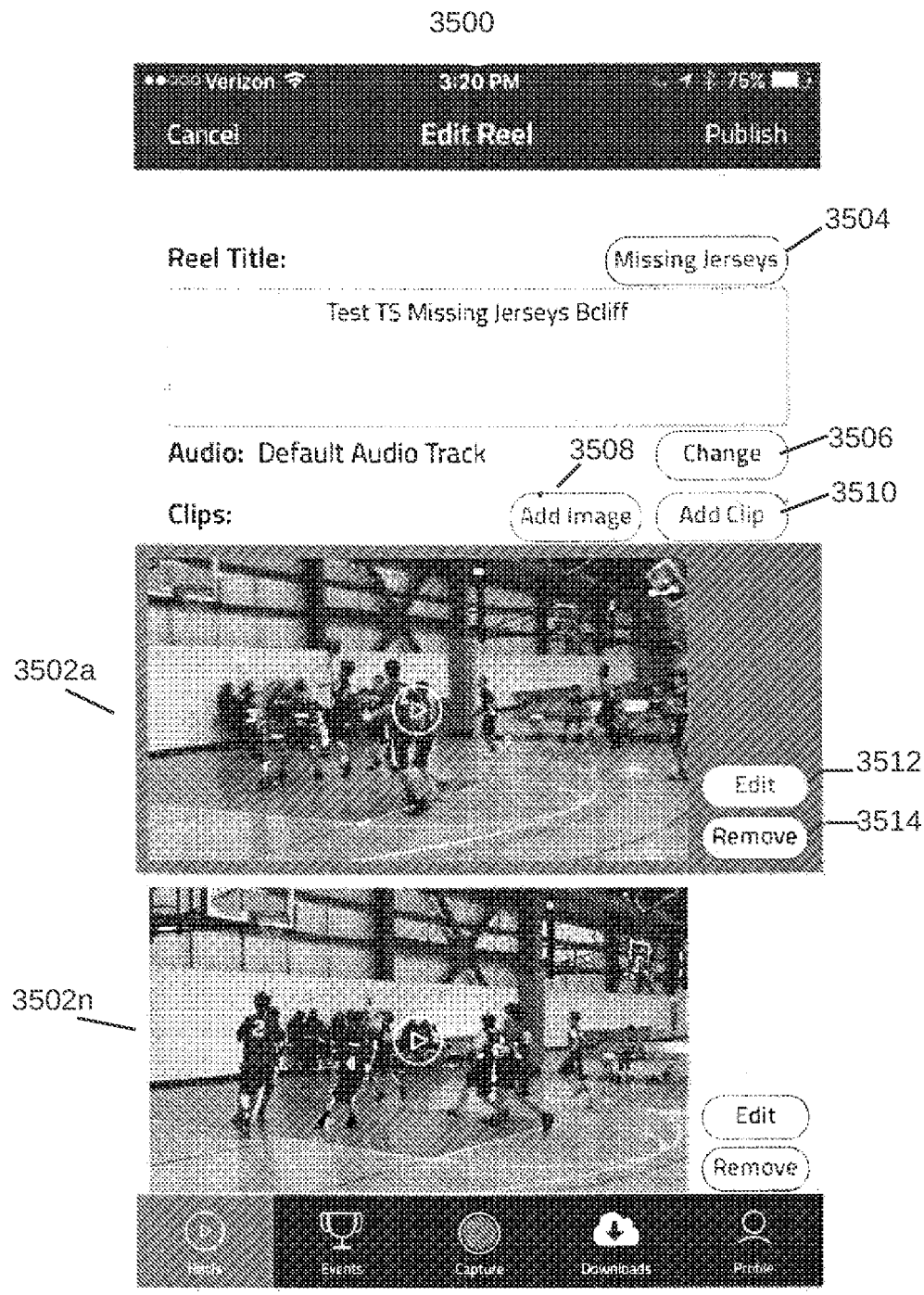
Figure 36:
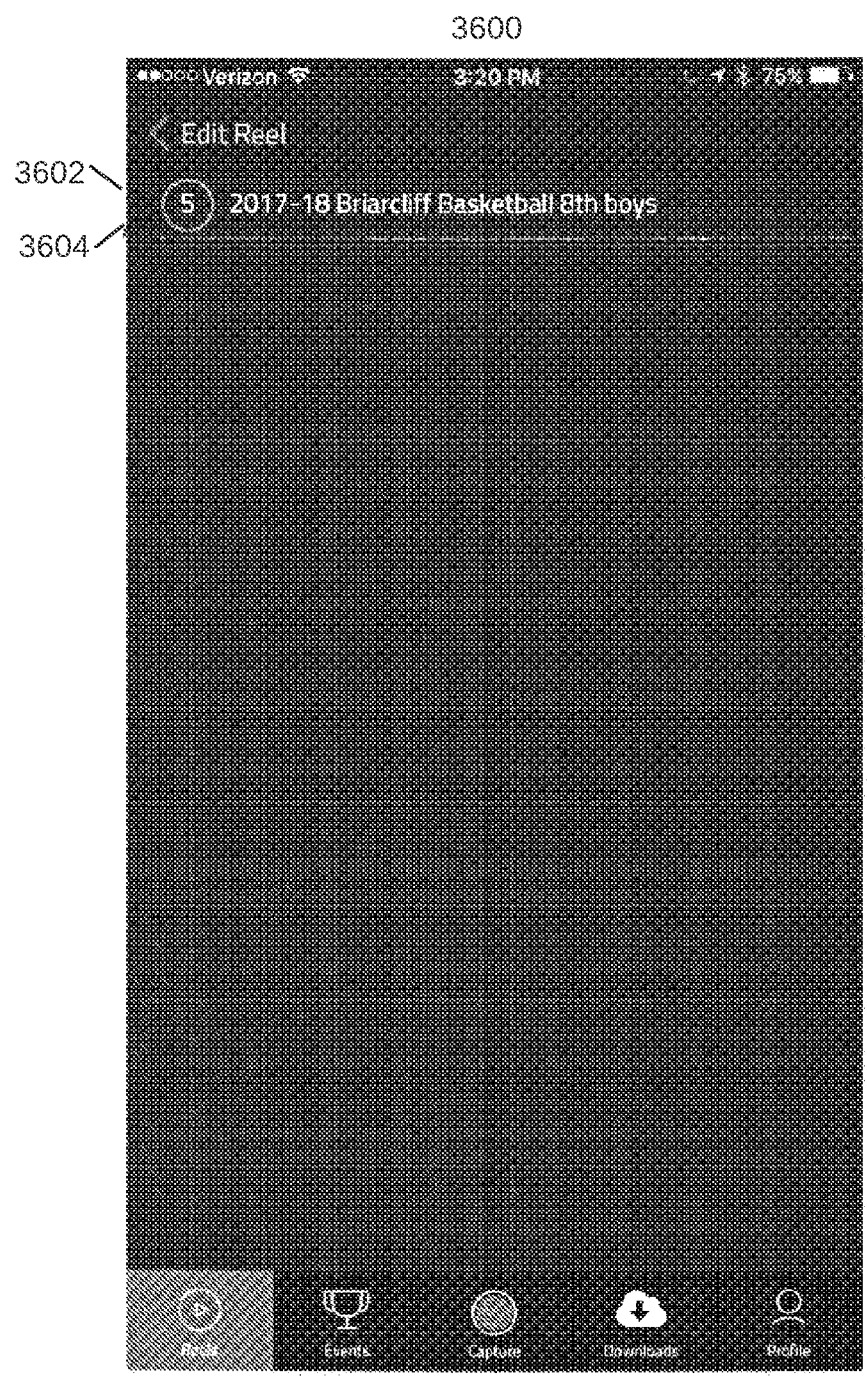
Figure 37:
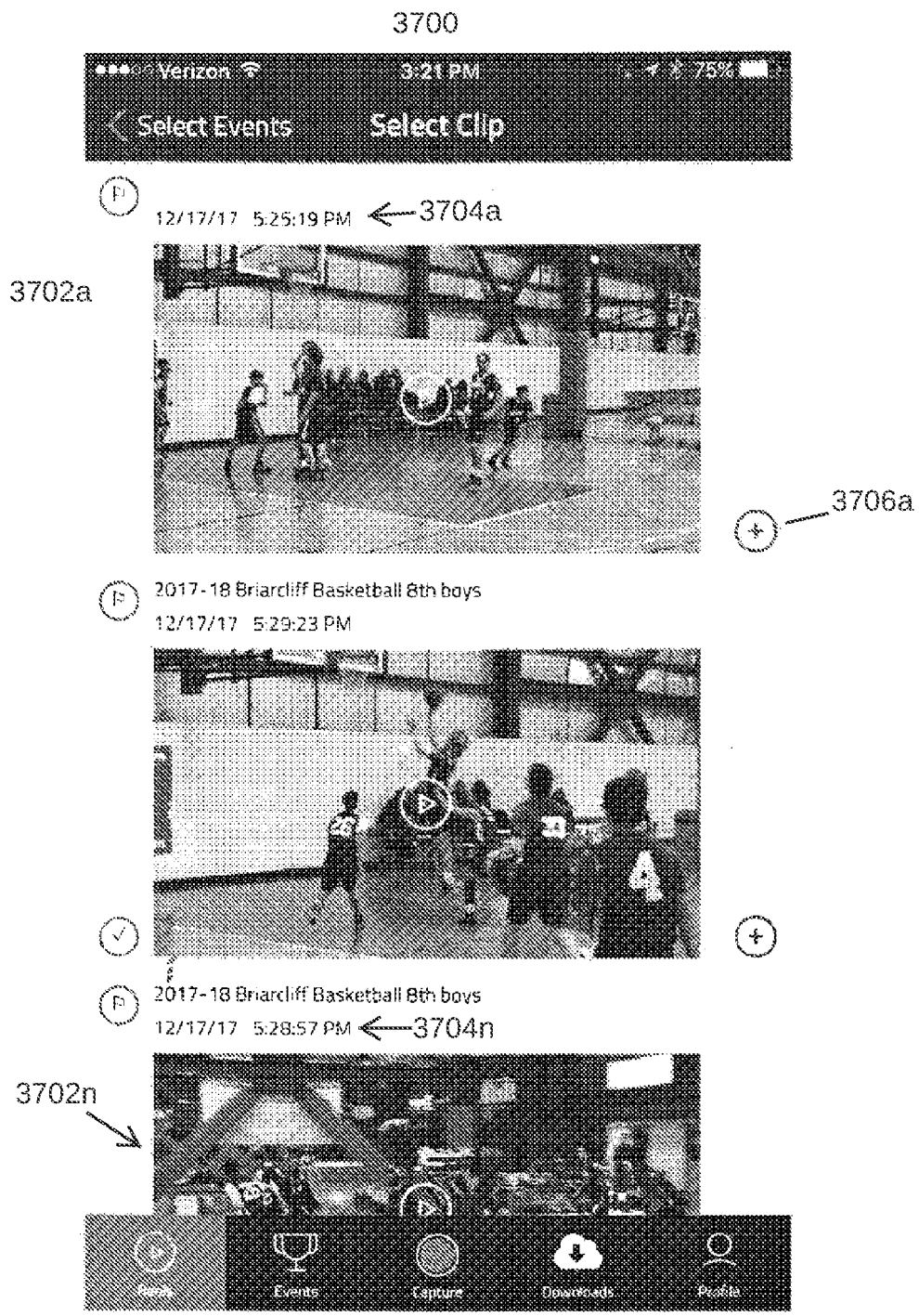
Figure 38:
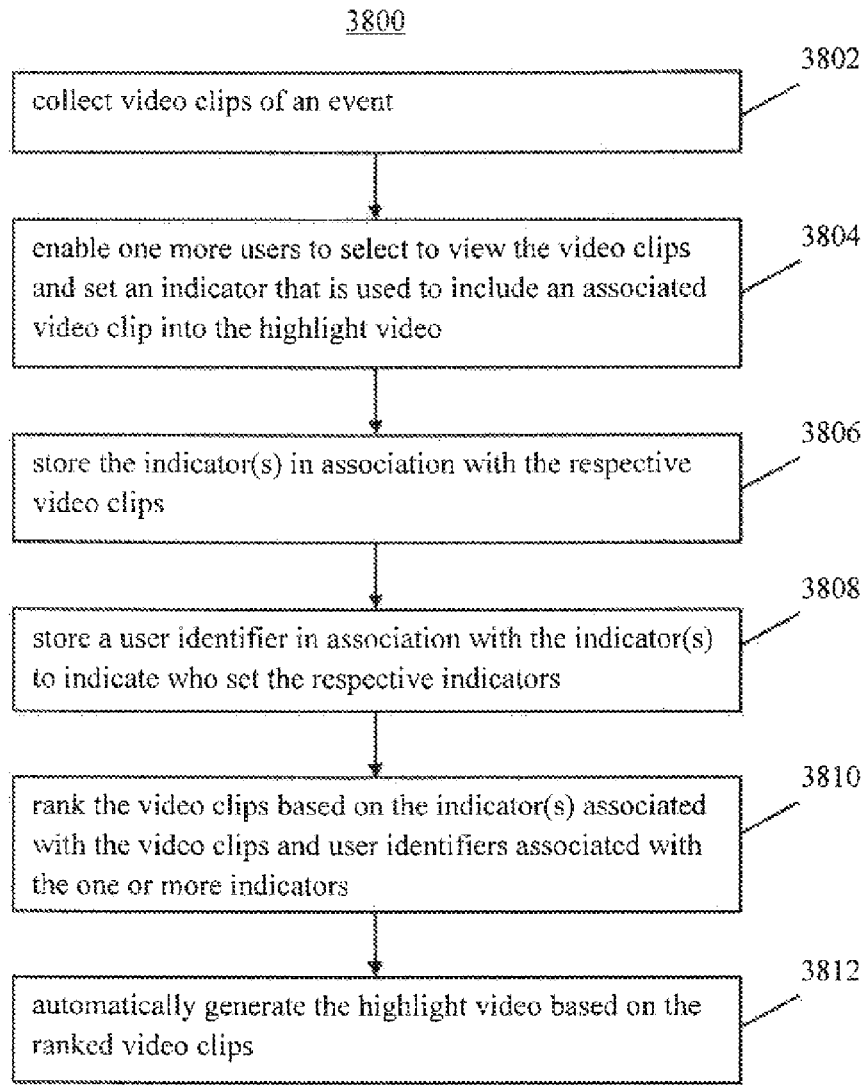
Figure 39:
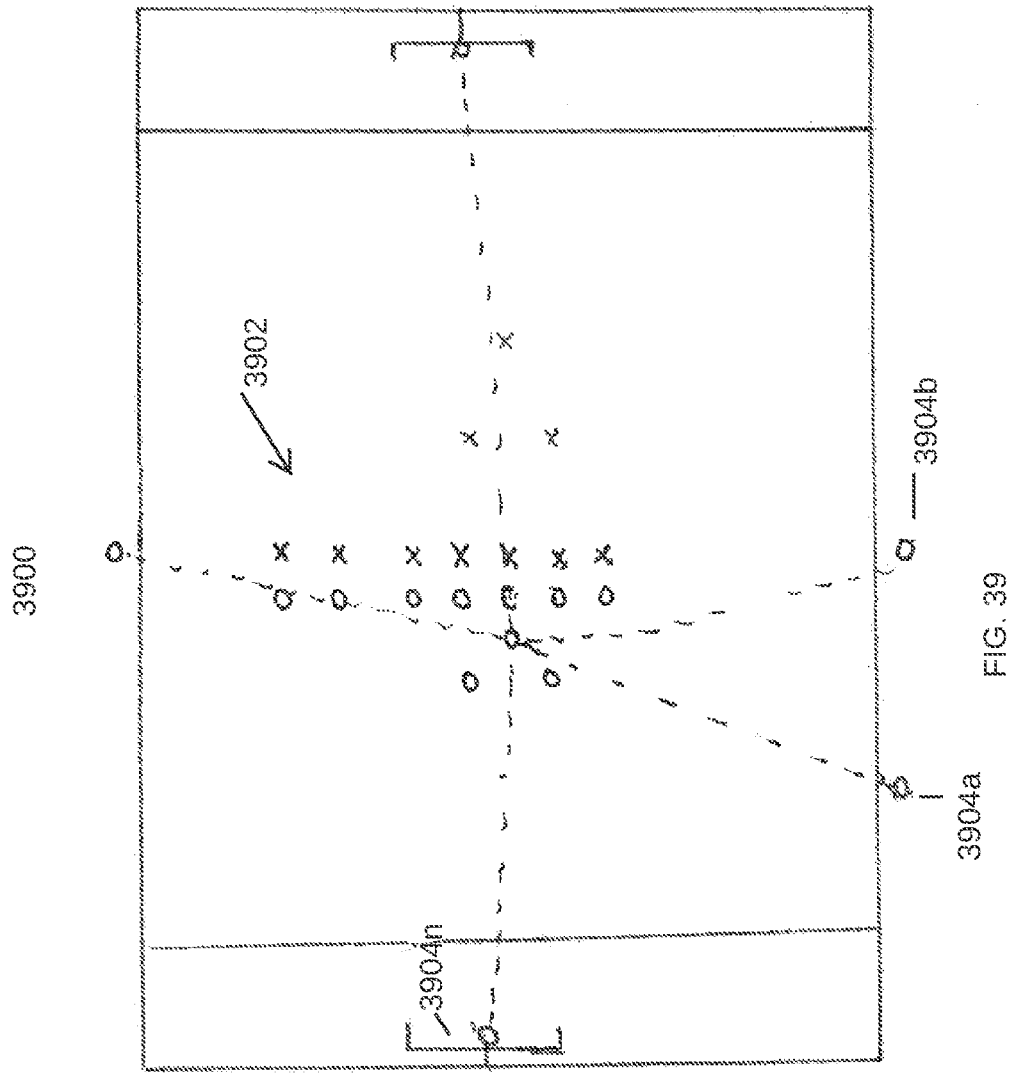
Figure 40:
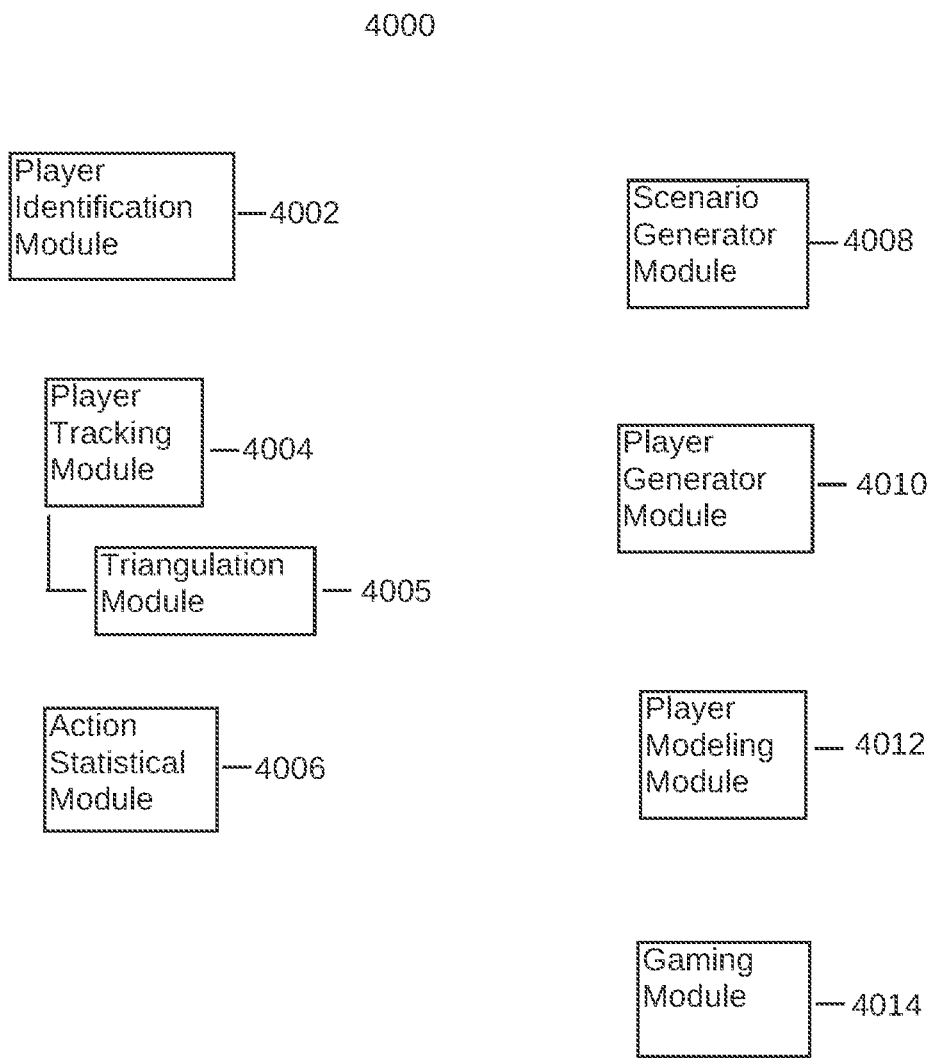

FIG. 33 is a screenshot of an illustrative user interface that lists selectable teams, in this case sports teams, on which a user or an associate of a user may participate;

FIG. 34 is a screenshot of an illustrative user interface showing a listing of games from which the user may select using selection soft-buttons;

FIG. 35 is a screenshot of an illustrative user interface inclusive of video clips from the selected game(s) from FIG. 34;

FIG. 36 is a screenshot of an illustrative user interface that lists a set of highlight videos;

FIG. 37 is a screenshot of an illustrative user interface inclusive of video clips;

FIG. 38 is a flow diagram of an illustrative process for generating a highlight video of an event from video clips;

FIG. 39 is an illustration of an illustrative scene inclusive of a sports playing field in which multiple video recording devices; and FIG. 40 is a block diagram of a set of software modules that may be utilized in tracking and analyzing players captured by video recording devices.

3. DETAILED DESCRIPTION

Figure 1:
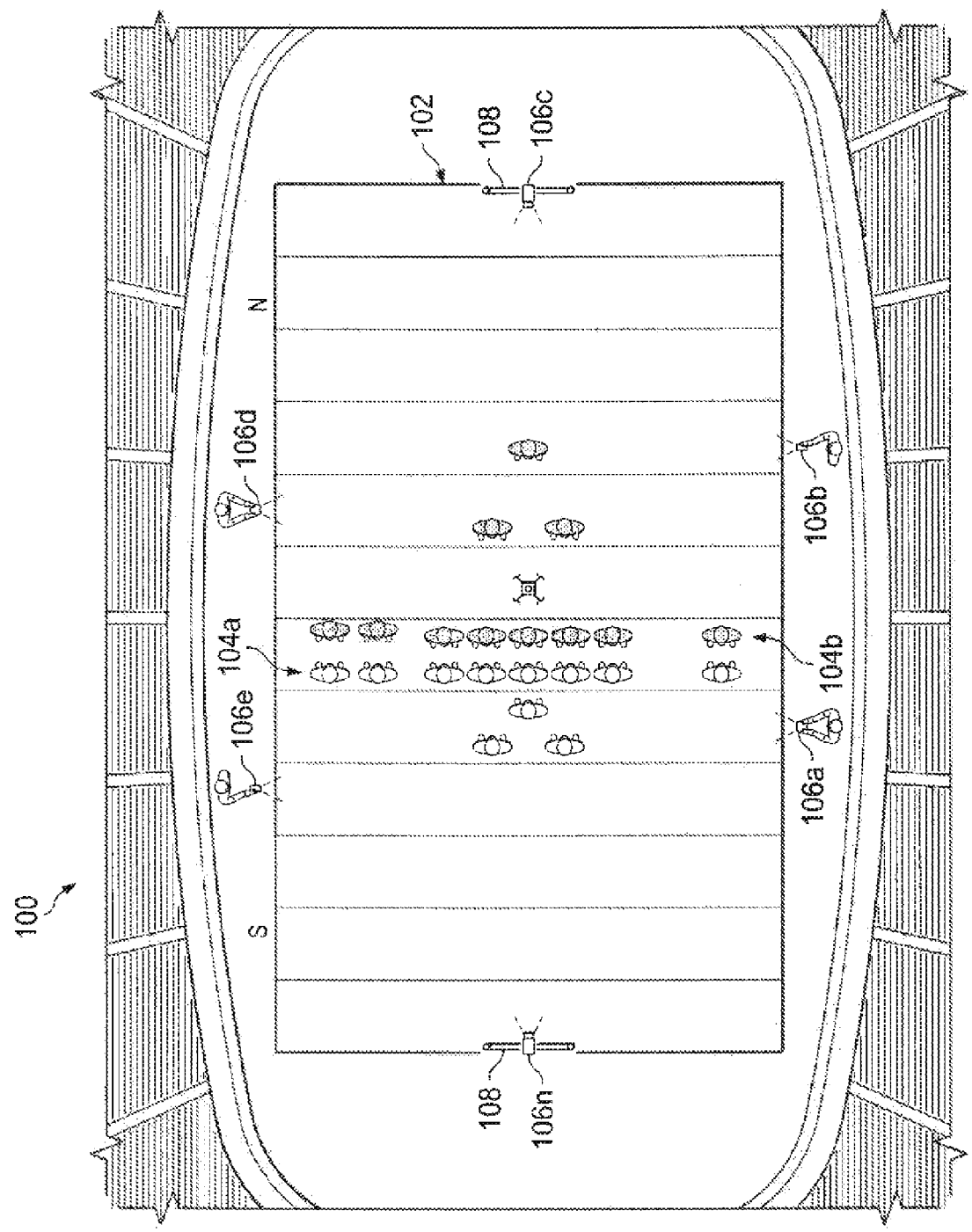
FIG. 1 is an illustration of an illustrative scene inclusive of a sports playing field.

With regard to FIG. 1, an illustration of an illustrative scene 100 inclusive of a sports playing field 102 is shown. The sports playing field 102 includes two teams of players 104a and 104b (collectively 104) playing thereon. As understood in the art, players of sports teams typically wear jerseys or uniforms inclusive of numbers and/or other identifiers. As shown, the players of the two teams 104 are matched up against one another. It should be understood that other aspects include video recording a team practice, where players from only a single team are recorded while playing on the sports playing field 102. As is typically the case, fans, supporters, spectators, team management, or otherwise record video of the teams who are playing. As shown, video recording devices 106a-106n (collectively 106) that are positioned at different angles around the field 102 may be used to capture or record video of the teams 104 during a game. The video capture devices 106 may be the same or disparate mobile devices, such a smart phones, tablets, video cameras (e.g., GoPros®), or any other video capture device that may be networked or non-networked, but be capable of uploading video content in any manner, as understood in the art. Video recording devices 106c and 106n may be respectively mounted to goalposts 108 at a north (N) end and south (S) end of the sports playing field 102.

Figure 2:
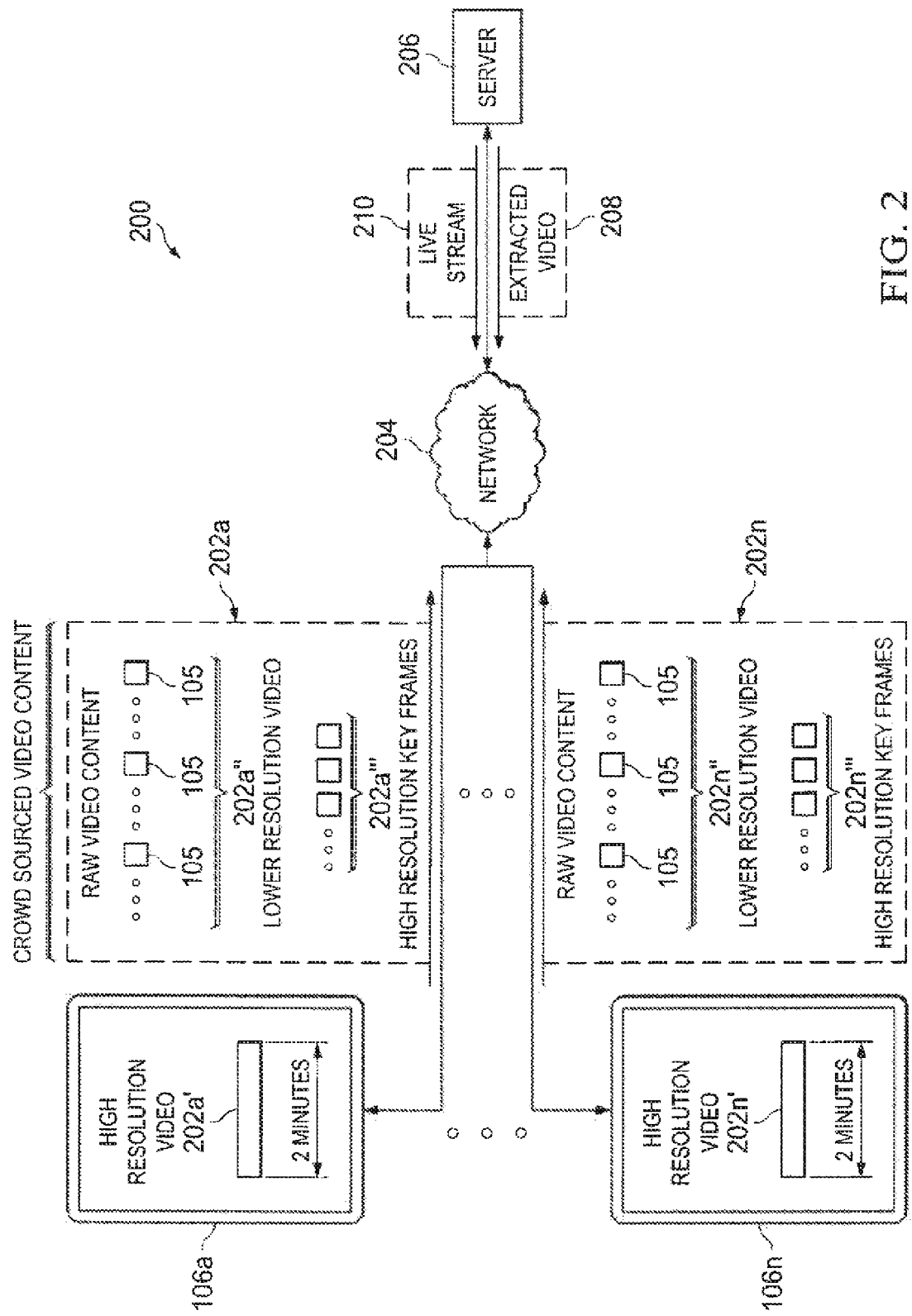
FIG. 2 is an illustration of a network environment in which crowd sourced video of a sporting event is captured and processed.

With regard to FIG. 2, an illustration of a network environment 200 in which crowd sourced video or user generated content of a sporting event is captured and processed is shown. The network environment 200 includes the video capture devices 106 that may capture raw video content or video 202a-202n (collectively 202), and communicate the raw video content 202 via a communications network 204 (e.g., Wi-Fi, cellular, and/or Internet) to a server 206. Because mobile devices are able to capture data in high-resolution, the size of video or video data files these days can be quite large (e.g., several megabytes). As a result, the amount of time and bandwidth needed to upload the video data files can be considerable. Rather than waiting for a user to complete a video, which is unknown in size before completed, so as to operate in a more real-time basis, one embodiment of an app being executed by the video capture devices 106 may include communicating the captured video 202 on a periodic (e.g., every 5 or 10 seconds) or aperiodic basis (e.g., responsive to an event occurring), but prior to completion of recording of an entire video.

As an example, a 2-minute video 202n' is shown to be captured and stored in video capture device 106n. In one embodiment, while capturing the video 202n', short (e.g., 10-second) video segments 202n" (i.e., portions of a complete video of unknown length while being captured) may be communicated via the network 204 to the server 206. The server 206 may, in one embodiment, process the video segments 202n" as received. In an alternative embodiment, rather than uploading the video 202n' in a real-time manner, app on the video capture device 106n may be configured to capture the entire video 202n' and send multiple, short video segments 202n", such as 10-seconds (10s), via the communications network 204 to server 206. The server 206 may be configured to receive the video segments 202n" and to "stitch" the video segments 202n" into the full-length video 202n'. In one embodiment, an end video code or identifier may be communicated with the last video segment that completes a full video so that the server 206 may determine that the video is complete and store the completed video. In addition to providing a more real-time process, but sending the video segments 202n" while recording, other processing and communications may be performed during the recording and communication processes.

Moreover, because the video content that is captured may be high-resolution (e.g., 1080p), the amount of extra data that is to be sent as compared to a lower resolution, such as 640p or 720p, is significant, especially for longer videos. In the event that the application is capturing humans, which do not move relatively fast over a 1-second timeframe, one aspect may capture the video content at a higher resolution, but communicate the content at a lower resolution, thereby provide video quality that is acceptable to view, but utilizes lower bandwidth, takes less time to communicate, and consumes less memory at the server and when viewed on other devices after editing. However, because an image processing algorithm(s) performed by the server may have improved performance with higher resolution, especially for number and color identification, reducing the resolution may also reduce performance of the image process. To provide for improved performance of the image processing algorithm(s) while simultaneously accommodating the communication and memory capacity performance, one embodiment provides for communicating one or more frames per second at the high-resolution or key frames 202n"', and video 202n" at a lower resolution. In one aspect, the video capture devices 106 may be configured to communicate every 12th frame (e.g., one per ½ second if frame capture rate is 24 frames per second) as high-resolution (e.g., 1080p) images 202n"', and the video 202n" at lower resolution. In the event that the sport being imaged is a sport that players move faster than running, such as skiing, skating (e.g., hockey), car racing, etc., higher frame rates (e.g., 4 high-resolution frames per second or every 6 frames if the video capture rate is 24 or 25 frames per second) of the high-resolution frames 202n"' may be communicated along with the lower resolution video 202n". If every 12th frame 202n"' is a high-resolution frame and the frame capture rate is 24 frames per second, then a 10-second video includes 20 high-resolution frames 202n"'. The 20 high-resolution frames 202n"' may be included in the video segments 202n" being communicated or separate from the video segments 202n". It should be understood that other video capture rates and individual high-resolution image rates may be utilized based on a variety of factors, including type of sport, amount of communication bandwidth, storage capacity, or otherwise.

The server 206 may be configured to identify video segments that comply with search parameters to form an extracted video 208 as desired by users of the video capture devices 106 or other users, such as family members of players of sports teams. The extracted video 208 may include video content that complies with input search parameter(s) by a user that includes a player identifier of a sports team. In one embodiment, the server 206 may be configured to identify a player wearing a particular number on his or her jersey, and extract video content or video segments inclusive of the jersey with the particular number. In one aspect, the server 206 may be configured to extract video with a player having certain jersey colors, such as blue with white writing, such as numbers. The server 206 may also be configured to extract video that matches a particular action identifiable by a user generated and/or automatically generated tag associated with video content. As shown, a live stream 210 may be communicated from the server to one or more of the video capture devices 106 that request to receive video from others of the video capture devices 106, as further described with regard to FIGS. 14A-14C.

Figure 3:
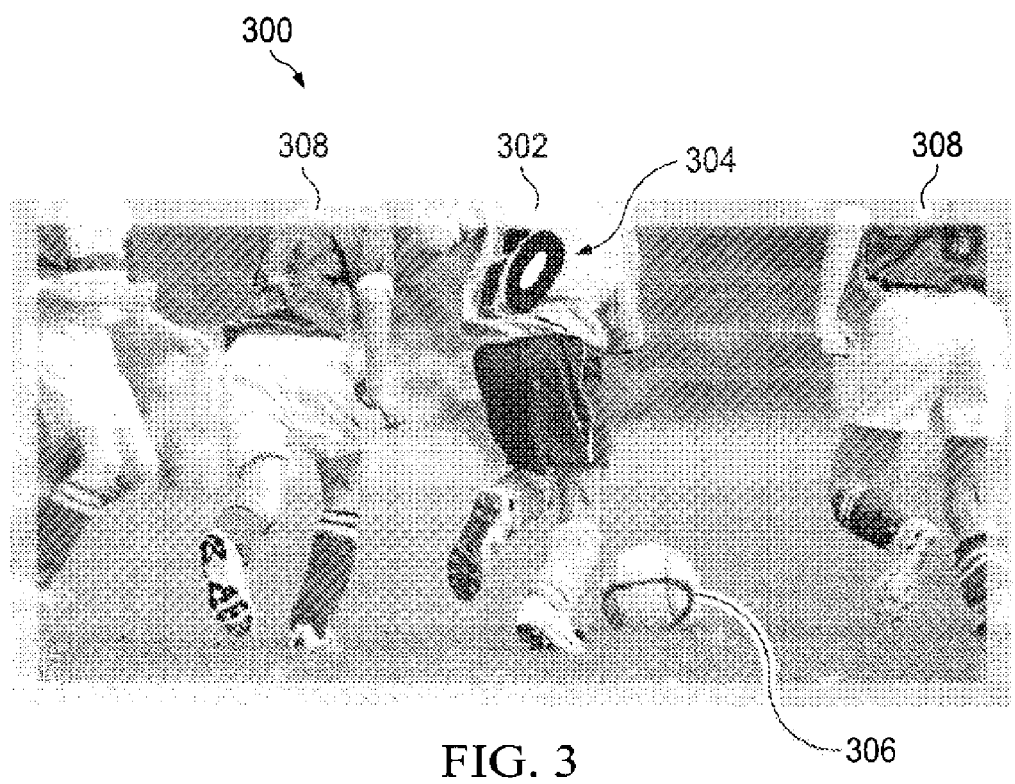
FIG. 3 is an image of an illustrative scene in which a player, in this case a soccer player, is shown to be running on a playing field.

With regard to FIG. 3, an image of an illustrative scene 300 in which a player 302, in this case a soccer player, is shown to be running on a playing field. The player 302 has an identifier 304, in this case number "10," on his uniform that has dark writing on a light uniform. The player 302 is shown to be dribbling a soccer ball 306, and being chased by players 308 on another team, generally wearing different color uniforms, trying to take the soccer ball 306 from the player 302. As will be described further herein, a system may be configured to (1) identify a player wearing a particular identifier, such as number "10," and (2) being in "the action," such as being near a ball (e.g., football, soccer ball, basketball), or other sports item. Rather than being automatically identified, a crowd edited process for identifying action(s) by players may be performed in a semi-automated or manual manner, as further described herein.

Figure 4:
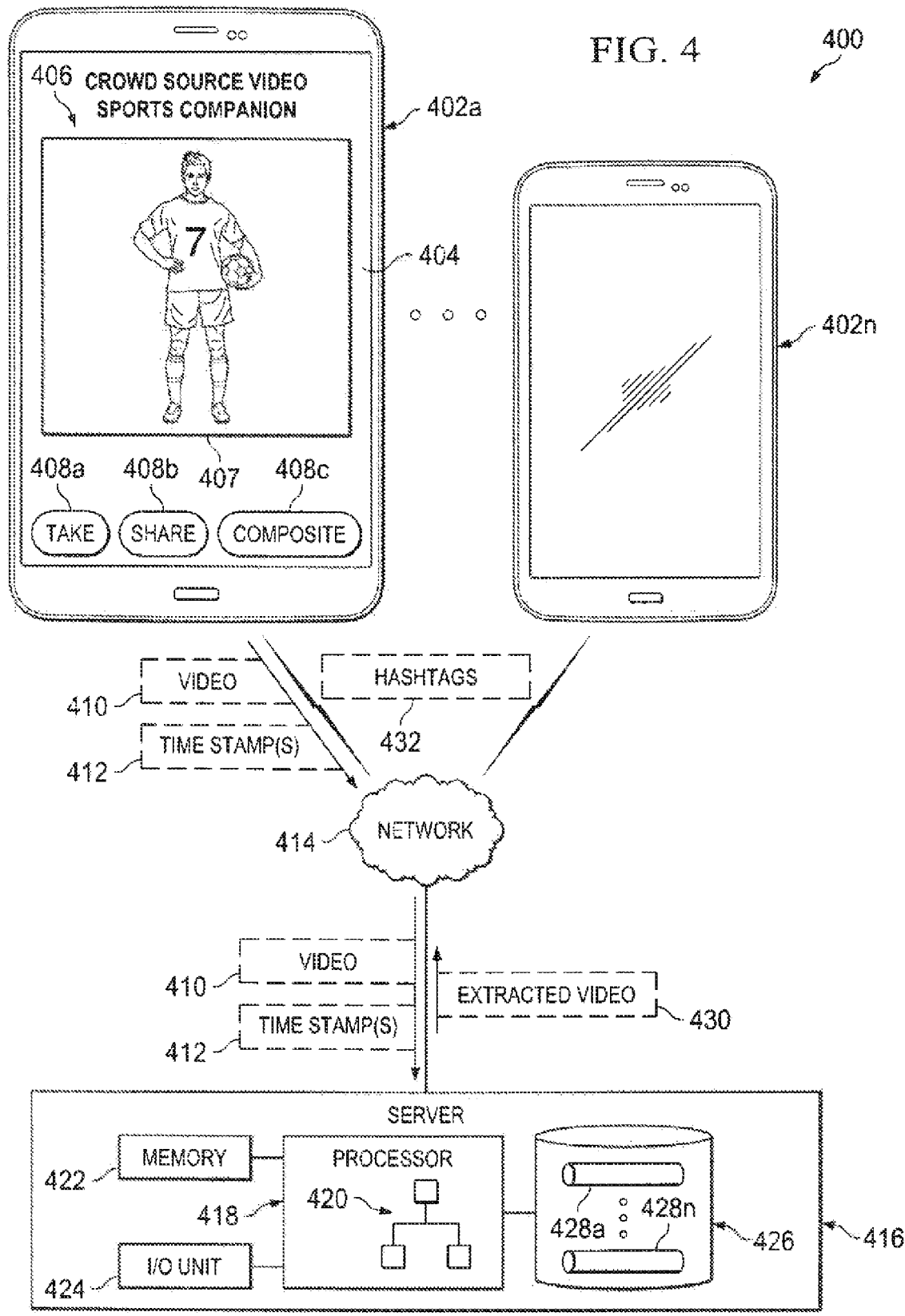
FIG. 4 is an illustration of an illustrative network environment shown to include a video capture device, such as a smartphone, being configured with a mobile app that enables a user of the video capture device to capture video content, and provide for extracting particular video content desired by the user.

With regard to FIG. 4, an illustration of an illustrative network environment 400 is shown to include a video capture device 402a, such as a smartphone, being configured with a mobile app that enables a user of the video capture device 402a to capture video content, and have the ability to extract or cause to extract particular video content desired by the user. The video capture device 402 may include an electronic display 404 on which user interface 406 may be displayed. The user interface 406 is shown to include an image 407 of a player on a playing field, for example. Control buttons 408a, 408b, and 408c (collectively 408) are shown to enable the user to take a video, share a video, and create or request a composite or extracted video, respectively. A composite video is video formed of one or more video clips or segments (or references to timestamps within one or more video clips or segments) that combined form a video that may be viewed by a user. The input video that the device 402a extracts content from may be in various forms, including real-time video of the event, as well as slow motion or fast motion video of the event. The composite video may be created such that one or more of the video clips or segments are arranged to replay in real time, slow motion, and/or fast motion, regardless of the input form. This functionality may be fixed in the composite video and/or enabled via pointers that are referenced during replay to replay the video at the desired speed. It should be understood that additional and/or alternative control elements 408 may be available via the mobile app being executed by the video capture device 402a, as well. As understood in the art, the app may be downloaded from an app store or other network location.

The video capture device 402a may be configured to communicate video 410 (i.e., video content in a digital data format) and timestamps 412 representative of times that the video 410 is captured. The video 410 may be in the form of video clips (e.g., less than 2 minutes in length or be a full, continuous video of an entire sporting event). In one embodiment, an app on the video capture device 402a may be configured to record actual times or relative times at which video is captured, and those times may be associated with the video 410. The video 410 and timestamps 412 may be communicated via a communications network 414 to a server 416. The server 416 may include a processing unit 418, which may include one or more computer processors, including general processor(s), image processor(s), signal processor(s), etc., that execute software 420. The processing unit 418 may be in communication with a memory unit 422, input/output (I/O) unit 424, and storage unit 426 on which one or more data repositories 428a-428n (collectively 428) may be stored. The video 410 and timestamps 412 may be received by the processing unit 418, and processed thereby to generate an extracted video 430 based on parameters, such as player identifier, action type, or any other parameter, as desired by a user of the video capture device 402a or otherwise. The video 410 and timestamps 412 may be stored in the data repositories 428 by the processing unit 418, and the extracted video 430 may be communicated via the I/O unit 424 to the video capture device 402a for display thereon.

In one embodiment, the software 420 may be configured to store video 410 in the data repositories 428 in a manner that the video operates as reference video for the extracted video 430. That is, rather than making copies of the video 410 stored in the data repositories 428 for individual users, the video 410 may be referenced using computer pointers or indices, as understood in the art, to refer to a memory location or timestamp in the source video so that duplicate copies of the video 410 are not needed. The extracted video 430 may be copies of subsections of the video 410 or entire video that is accompanied with pointers or timestamps (not shown) to point to sections of the video that meet criteria of the user who receives the extracted video 430. Rather than communicating copies of video in file form, the video may be streamed to the video capture 402a.

In one embodiment, additional video capture devices 402 may be configured to capture video in the same or similar manner as the video capture device 402a, and the server 416 may be configured to receive and process video captured by multiple video capture devices to generate a crowd sourced video, where the crowd sourced video may include video clips or content segments from different angles at a sporting event. The crowd sourced video may be a single video file inclusive of video clips available from the crowd sourced video clips or video clips that match search parameter(s), as further described herein. In one embodiment, in addition to communicating video 410 and timestamps 412, additional information, such as geographic location or identifier of a field or sporting event may be generated and communicated by the video capture device 402a to the server 416, so that multiple video capture devices 402 that are recording video at the same event may be associated and stored with one another for processing by the server 416. For example, the app may be configured to enable the user to create or select a name of a sporting event at a particular geographic location that is occurring, such as Norwood Mustangs versus Needham Rockets at Norwood High School Field, and that information may be uploaded, with or without video and timestamp information, to a server so that other users who are also at the same game, such as a high school football game, may be able to select the name of the event from a selectable list of games being played at a geographic location given that multiple games are often played at a single park or field, for example.

As is further described herein, video or video clips 410 may be collected by multiple users and video capture devices 402. The video clips 410 may be stored by the server 416 that enables the users to access the video clips 410 for producing crowd edited video. In crowd editing, the video clips 430 may be communicated to or otherwise accessed by the users to view and associate hashtags 432 or other identifiers that enable users to perform more accurate searching and more easily produce composite videos. In an alternative embodiment, the server 416 may be configured to semi-automatically or automatically tag video clips with hashtags.

With regard to FIG. 5, an illustration of an illustrative video 500 is shown. The video 500 is captured from camera A, and includes a number of video segments, A1, A2, and A3, in which a player wearing the number "7" on his or her jersey, which has a color scheme that may optionally be used for identification purposes, is captured. Video segment A1 is 8 seconds long and extends between timestamps T1 and T2. Video segment A2 is 12 seconds long and extends between timestamps T3 and T4. Video segment A3 is 4 seconds long and extends between timestamps T5 and T6. The video segments between timestamps T2 and T3, and T4 and T5 may be determined to not include video footage of the player wearing number "7" on his or her uniform. As will be described further herein, the user may desire to have a video created that includes only video segments A1, A2, and A3, thereby shortening his or her review time of, or focusing on, all the plays in which player wearing number "7" was captured. An extracted video (not shown) that includes only the video segments A1, A2, and A3 may be created. In one embodiment, short fade-to-black or other transition video segments may be displayed between video segments A1, A2, and A3. Alternatively, pauses between video segments A1, A2, and A3 may be set to enable a user to selectively continue watching or not.

Figure 6A:
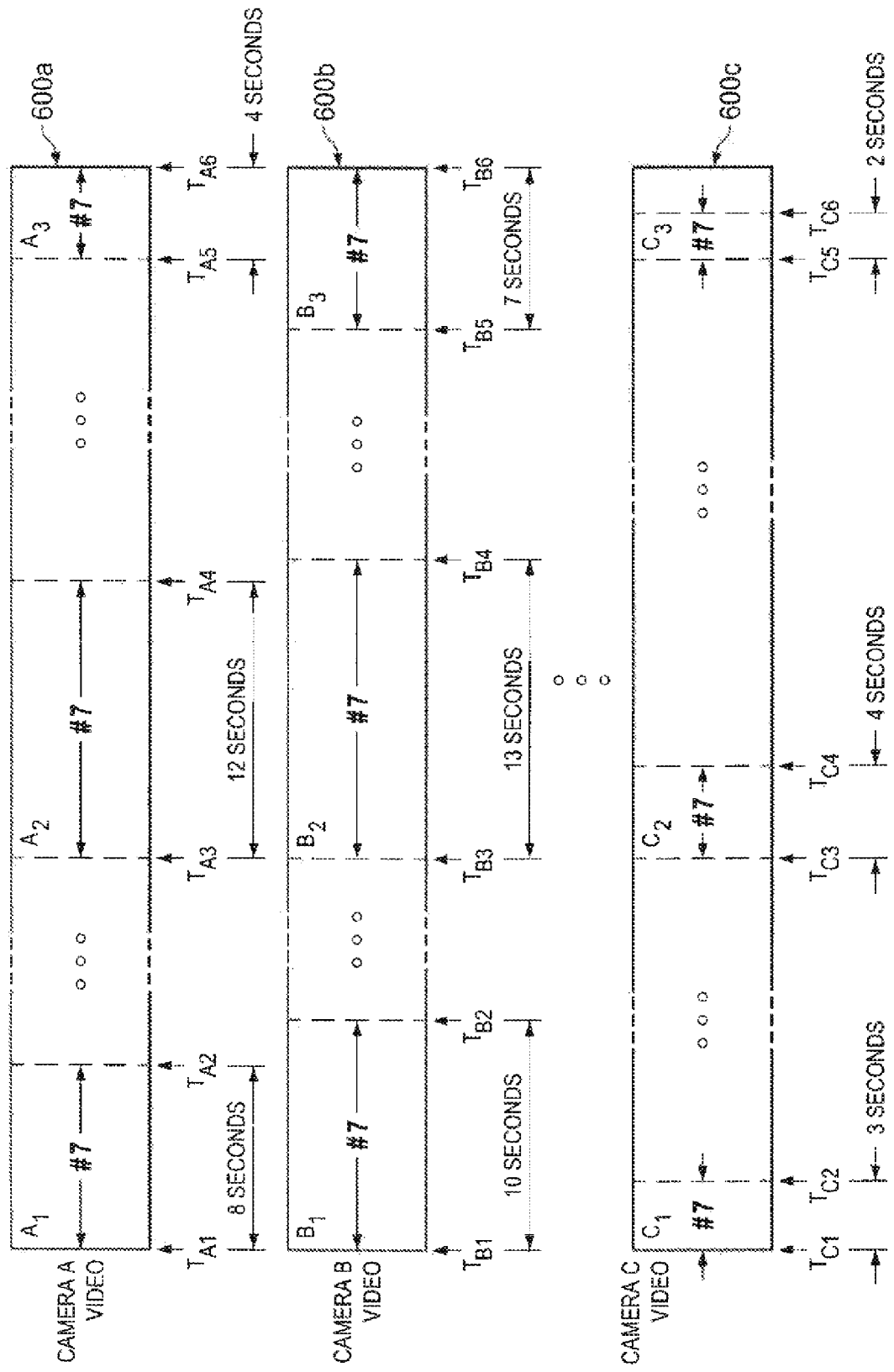
FIG. 6A is an illustration of three videos A, B, and C that were captured from three different video cameras, camera A, camera B, and camera C.

With regard to FIG. 6A, an illustration of three videos A, B, and C that were captured from three different video cameras, camera A, camera B, and camera C, are shown. In each of the videos, video segments including a player wearing jersey number "7" were captured. In video A, video segments A1, A2, and A3 include a player wearing jersey number "7." In video B, video segments B1, B2, and B3 include content with the player wearing jersey number "7," and in video C, video segments C1, C2, and C3 include video content with player number "7." In one embodiment, the videos 600 may be communicated to a central location, such as a server, so that a crowd sourced video can be produced. In another embodiment, the crowd sourced video may include the longest, best, most action filled, or simply include the player wearing jersey number "7." Tags applied to the videos 600 may be used in identifying video clips and assembling an aggregated or extracted video or presenting the identified video clips.

With regard to FIG. 6B, an extracted video 602 is shown to include video segments B1, A2, and B3, which were originally in videos A and B of FIG. 6A. Each of the video segments B1, A2, and B3 were determined to be the longest video segments and/or least shaking, most in focus, etc. in which the player with identifier number "7" on his or her uniform was captured in the three videos of FIG. 6A. Between video segments B1, A2, and B3, transition video segments TR1, TR2, and TR3, are shown. These transition video segments may be utilized to make the video more aesthetically pleasing to a viewer. The transition segments TR1, TR2, and TR3 may be fade-to-black or any other video transition segment, as understood in the art. In one embodiment, the video segments B1, A2, and B3 or video segments in which the player is carrying or near the ball, basket, goal, or any other location on a sports field, as further described herein.

Figure 7:
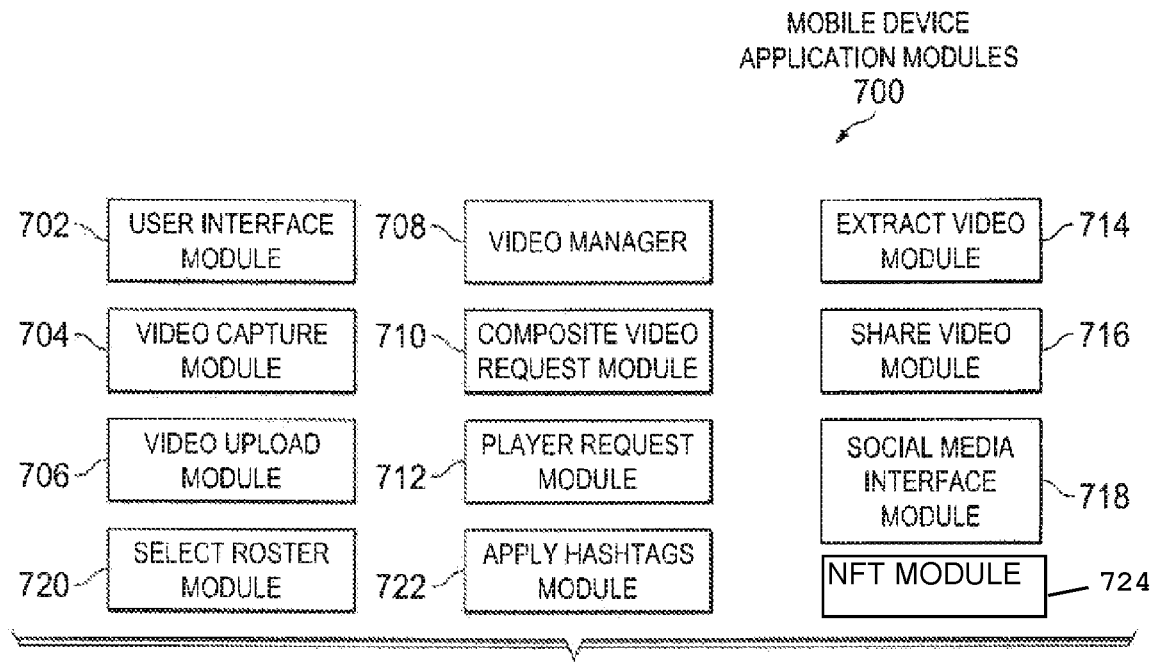
FIG. 7 is a block diagram of illustrative app modules that may be executed on a mobile device.

With regard to FIG. 7, a block diagram of modules 700 of a mobile device app is shown. The modules may be executed by a processor of the mobile device, such as a smartphone, and may be utilized to capture video, communicate video, process video, and perform a variety of other functions for a user of the mobile device. In this instance, the mobile device operates as a video capture device utilizing the mobile app. In an alternative embodiment, the mobile device simply uses a conventional video capture application, and the video captured may be communicated to a server for processing thereat. It should be understood that the mobile app may be resident or not resident (e.g., cloud based) on the mobile device.

The module 700 may include a user interface module 702 that provides the user with interactive functionality via a touchscreen or other user interface on a mobile device, as understood in the art. The user interface module 702 may operate as a conventional application that, in this case, enables video capturing, video management, and video processing or establishing search parameters or criteria for video processing to be performed. For example, the user interface module 702 may provide a user interface element that enables the user to select a number of a player on a particular team along with a minimum amount of time for the player to be in a scene or performing a particular type of play (e.g., batting). The module 702 may also provide for a user to review video clips and assign one or more tags to the video clips.

A video capture module 704 may be configured to enable the user to capture video utilizing the app. In one embodiment, rather than the app providing the video capture capability, the app may utilize a standard video capture application on a mobile device, and allow the user to access or import the video that was captured on the mobile device.

A video upload module 706 may be configured to enable a user to upload video that was captured on the mobile device. The video upload module 706 may enable the user to select some or all of the video that the user captured during a game. In operation, the video upload module 706 may be configured to upload in small (e.g., 5 or 10 second increments) as the video is being captured, as previously described with regard to FIG. 2, so that the video upload process can be performed in a substantially real-time basis. As previously described, by uploading the video as it is being captured, the mobile device can perform other communication tasks between the uploads of the video and a server may process the video segments as received. In an alternative embodiment, the video (e.g., 2-minutes) may be fully captured and sent in smaller segments (e.g., 10 second segments). A selectable setting may be set by a user of the mobile device for how the video is to be uploaded. By uploading video content in short segments or segment fragments (e.g., 5 or 10 second segments), the mobile device may be able to perform additional communications operations between uploads. Moreover, because some communications networks limit the length of video uploads, sending portions of the video may allow for a video that exceeds network length or size limits to be uploaded. The module 706 may apply tags or other identifiers to the video segments to indicate whether a video segment being uploaded is the start of a new video, continuation of previous video segment(s), or last video segment. Moreover, the video segments may be encrypted or otherwise encoded to limit the ability for video to be intercepted and accessed by someone not authorized to view the video.

As previously described, the video may be high-resolution video (e.g., 1080p), which takes a lot of bandwidth, power, time, and resources to upload from a mobile device and process using image processing. As a result, the module 706 may be configured to upload the video in a lower resolution, such as 640p or 720p. Since image processing by a server to identify certain features in a video may be improved by using higher resolution, the module 706 may be configured to have one frame periodically or periodically be high-resolution or extract key frames or sequence of images and communicated separate from a lower resolution video derived from the high-resolution video. In one embodiment, a blur rating of a high-resolution image frame may be determined by measuring straightness of a straight line or other measurement technique and, if the blur rating is below a threshold, send the high-resolution image frame, otherwise, not send the high-resolution image frame and continue testing successive image frames until one passes before sending. The module 706 may determine or be set to keep a frame high-resolution or send separate still images with high-resolution based on a sport or action being recorded. As an example, every 12th frame (if frame rate is 25 frames per second) may be communicated along with or within a video being sent at a lower resolution (e.g., 720p), thereby enabling image processing to be performed on the high-resolution frames. In sending the high-resolution frames, an indicator, such as a timestamp, that corresponds to a frame in the lower resolution video, may be provided to enable processing or tagging of the lower resolution video based on identification of content in the high-resolution images.

In one embodiment, the video upload module 706 may enable to user to apply a name, geographic location, and/or other indicia to be in association with the video, thereby enabling the user and/or server to identify the location, game, or any other information at a later point in time. The information may be established prior to the uploading process, as further described herein. In one embodiment, the identification information may be utilized to crowdsource the video with another video that was captured at the same sporting event. If the user elects to participate in a temporary (e.g., for the game) or longer term (e.g., for the season of a team) social media environment, the video upload module may operate to stream data being recorded to a server for real-time processing and/or distribution to other users in the social media environment (e.g., other users at the game).

A video manager 708 may enable the user to review one more video, store the videos in a particular fashion, identify the videos through timestamps, categories, locations, or any other organizational technique, as understood in the art. The video manager 708 may also be configured to identify and store information identified in the video in a real-time or post processing manner so that the parameters may be communicated to the server for processing. In an alternative manner, the processing may be performed by the server.

A composite video request module 710 may be configured to enable a user to request a composite or extracted video. The module 710 may provide a user with parameter settings that the user may select and/or set to cause a composite video to be created inclusive of matching or conforming content using those parameters. For example, the module 710 may enable the user to select a particular identifier of a player, a particular action by the player, a particular distance from a ball, a minimum amount of time in a video clip, and so forth. Measurements of distance may be made by using a standard sized object, such as a ball, to determine scale and distance of a player to an object.

A player request module 712 may enable the user to request a player by an identifier on the player's jersey. The module 712 may be incorporated into or be separate from the module 710.

An extract video module 714 may be configured to utilize the input search parameters selected by the user, and utilize image processing to (i) identify video segments within which content that satisfies the parameters or criteria are met, and (ii) set timestamps, pointers, or other indices at the start and end of video segments identified as meeting the parameters. In an alternative embodiment, rather than setting timestamps, pointers, or other indices, video segments may be copied and stored separate from the raw video, and used in creating and extracted video inclusive of one or more video segments in which content satisfies parameters set by the user.

A share video module 716 may be configured to enable a user to share video, raw video and/or extracted video, that he or she captured with other users. In one embodiment, the video may be shared with a limited group, such as friends, family, or other users at a particular sporting event. Alternatively, the share video module 716 may enable the user to share video in a public forum. In sharing the video, the module 716 may communicate the video to a server for further distribution. If the user has agreed to share video in a manner that enables the video to be processed and used as a crowd sourced video for editing purposes, then share video module 716 may communicate a portion or all of the video to a server. If the mobile device app is configured to perform certain types of processing, then the video that is shared by module 716 may be in video segments that meet particular criteria being requested by other users or an administrator. Still yet, the share video module 716 may be configured to work with the video upload module 706 in sharing video in real-time or other sharing arrangement(s).

A social media interface module 718 may enable the user to upload some or all of the video that the user has captured to social media (e.g., user account on FaceBook®). The module 718 may be configured to simply enable the user to select a social media account, and the module 718 may upload desired video or any other information to the social media account for posting thereon. The social media interface module 718 may be configured to manage social media accounts. In one embodiment, the social media interface module 718 may be configured to manage temporary social media network events, where a temporary social media network event may be a social media network setup on a per game or per season basis.

A select roster module 720 may enable a user, such as a coach, to select a roster of players on a team to define player positions on the team. The players on the roster may be assigned player numbers that are to be on their respective uniforms. The roster may enable users to more easily select players by users who are following a team.

An apply hashtags module 722 may be configured to automatically, semi-automatically, or manually enable a user to apply one or more hashtags to a video content segment or clip. In applying the hashtags, video content segments may be provided to the user after capturing the video clips and prior to communicating the video clips to a networked server or provided by the networked server for tagging by user(s), as further described herein. The module 722 may provide the user with soft-buttons, for example, for the user to select to identify action(s) and/or object(s) within the video content segment(s).

It can be appreciated that the novel concepts disclosed herein provide a seemingly infinite source of video segments from an event, for the creation of custom and/or unique composite videos or other media of the event. In this regard, the mobile device may include a module for creating a non-fungible token (NFT Module 724) with respect to the media of the event. The mobile or any client device generally presents interfaces for user interaction with the application/service, as discussed herein. In one embodiment, the interface(s) presented include one or more form elements for the user to initiate tokenization of media captured at the event using the methods and systems disclosed herein, such as the video segments and/or composite videos thereof. The form element(s) may be, for example, a drop down menu, button, etc. that when selected executes the NFT Module 724. The media may be tokenized using a distributed ledger, such as Ethereum. In this regard, the NFT Module 724 may interface (directly or indirectly) with the distributed ledger system and/or a service provider/marketplace for the creation of an NFT of the media. This may be accomplished in a variety of ways. For example, the mobile application and more specifically the NFT module 724 may be linked (directly or indirectly via one or more servers) to the user's block chain/marketplace wallet. Alternatively, the user may be required to provide credentials for access to the wallet at the time of NFT creation. Once the accounts are linked and the NFT module 724 executed, the device preferably displays an interface that allows users to select media to be uploaded to the NFT creation service. The media, such as the video segment and/or composite video thereof, may be given unique traits by the creator of the NFT. In this regard, the system may provide an interface for the user to specify the unique trait or traits or provide other instructions for the creation of the NFT, such as a limited number of copies, unique messages or other content, photos, player information, event information, hashtag information, meta data, etc., as discussed herein. Once uploaded, the device presents an interface screen with a button or other form element for the user to confirm creation of the NFT of the selected content. Thereafter, the NFT of the selected content is stored in the user's blockchain/marketplace wallet.

Figure 8:
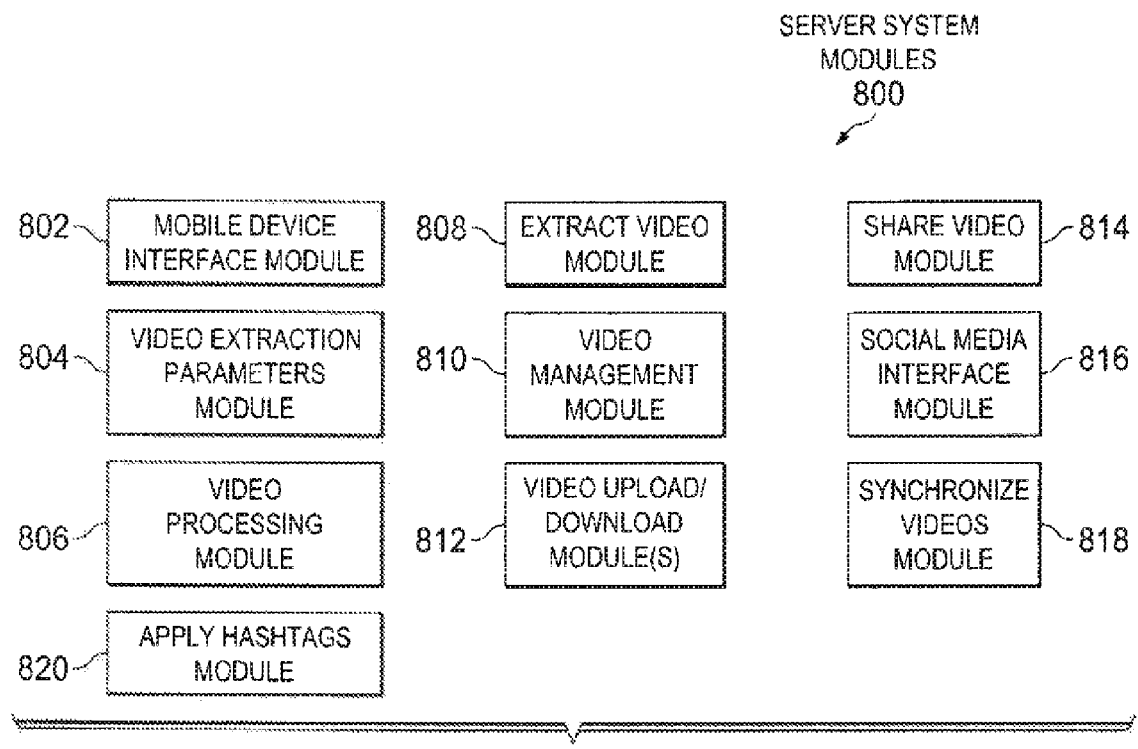
FIG. 8 is a block diagram of illustrative application modules that may be executed on a server.

With regard to FIG. 8, a block diagram of illustrative modules 800 that may be executed on a server is shown. The modules 800 may be utilized to receive, process, and extract video so as to create an extracted video as desired by a user.

The modules 800 made include a mobile device interface module 802 that enables the server to communicate with one or more mobile devices to support a user interface, upload or download video, or perform other functions with mobile devices or other electronic devices, such as computers configured to process video content. The module 802 may be configured to receive video segments in a real-time or semi-real-time basis while a user is capturing a video and store the video segments in a manner that additional video segments of the same video can be appended or "stitched" to the previous video segment(s). Alternative configurations may be utilized depending on how the mobile device that is sending the video to the server is configured. As an example, the video segment may be received after the video is completely recorded and then sent in 10 second video segments, but not necessarily within 10 seconds between each of the segments, as is performed when communicating the video segments during capture of the video. Yet another video transfer mode may allow for the video to be communicated and received as a whole.

In one embodiment, the module 802 may be configured to receive video content that is lower resolution than the resolution of the raw video content captured by the mobile device to reduce upload time, data storage consumption, and processing. As understood in the art, resolution at 640p or 720p on small screens is suitable for most applications. However, image processing to identify certain features within image frames or key frames is improved when performed on image frames with higher resolution (e.g., 1080p). Hence, high-resolution images that are separate from the video or embedded within the video may be received and processed for identifying specific content, such as player numbers on jerseys. Depending on the speed of content being imaged, the frequency of the high-resolution images may vary. In one embodiment, the high-resolution images may be tagged with a timestamp or other identifier that corresponds to a location in a video segment, thereby allowing for marking or otherwise processing the video based on image processing of the high-resolution images.

A video extraction parameters module 804 may be configured to identify parameters that may be used to define specific video content being sought by a user. For example, the extraction or search parameters may include player number, amount of time the player is in a segment, proximity of the player to a ball or other region on a playing field, or otherwise. The parameters may be communicated from a mobile device or otherwise to the server, and the module 804 may utilize that information in processing the video to produce an extracted or composite video. In one embodiment, the video extraction parameters module 804 may be configured to process the key frames (e.g., high-resolution images periodically derived from high-resolution video), as opposed to the video that may be in lower resolution than the key frames, to determine content in the key frames. As an example, if player numbers are being searched, the key frames may be used to determine whether a player is in a particular portion of the video by determining that the player number associated with the player is in the key frames. If, however, a determination is made that a player number is in one frame and then a successive frame one-half second later does not show the player number in the image, then a determination may be made as to whether the player simply turned, left the frame, or multiple video segments exist. Other reasons for a player number not being in successive key frames may be possible. Tracking the player numbers within successive key frames may also provide for stitching or not stitching video clips together.

A video processing module 806 may be used to process video captured by one or more users using video capture devices. The module 806 may be configured to format each video from different users and video capture devices into a common format prior to, during, or after processing the video. For example, the video processing module 806 may include a function that measures a standard sized object, such as a soccer ball, football, base, net, etc., in a video and uses that measurement to determine scale of the captured content so as to determine other measurements, such as distance of a player from a ball, distance of a person from a goal, or otherwise, so that a user may submit a search parameter of a player being a certain maximum distance from a ball, goal, basket, etc. That is, if a standard sized object, such as a soccer ball, is measured at a 1/10th scale, then other objects and distances from the video can be measured using that scaling.

As the standard sized object moves through multiple frames, where the standard sized object moves from being close to being farther from a camera, measurements can be made as the object moves to dynamically determine scale and that scale can be dynamically applied to the other objects at the different frames. In an alternative embodiment, if the standard sized object, such as a goal, basket, field markings (e.g., yard lines), does not move, then dynamic adjustment of the scale is unnecessary within a single video segment. As an example, as a player being tracked moves in a frame, a distance of the player to the soccer ball may be dynamically measured and a predetermined distance, such as 8 feet, from the soccer ball may define when the player is "in the action" or not. As the player comes within the predetermined distance, then a tag may be automatically applied to a video frame and as the player exits from the predetermined distance, that video frame may be tagged so that the video segment between the first and second tags may be identified as the player being "in the action." In an alternative embodiment, an indicator may be associated with a frame or set of frames where a player meets a criteria, and a user may manually set a tag based on the criteria having been met or not, the action happening at that time, or otherwise.

An extract video module 808 may be configured to extract video that has been identified to meet criteria or search parameters set by a user. The extract video module 808 may be configured to index the video or copy and paste video content that has been identified into a different region of memory or on a storage unit.

A video management module 810 may be configured to enable a user and/or administrator to manage video that has been uploaded. The module 810 may be configured to store video in association with respective user accounts, tag the video in a manner that allows for correlating video content captured from the same sports event, or copy the video that is determined to be captured at the same sports event into another region of memory that includes all video captured from the same respective sporting events. The video tagging may be automatic, semi-automatic, or manually tagged, as described with regard to module 820.

A video upload/download module 812 may enable the user to upload and download videos from the server. The module 812 may operate in conjunction or be integrated with the module 802. The module 812 may be configured to automatically, semi-automatically, or manually enable the user to upload and download video to and from the server. In one embodiment, the module 812 may be configured to allow for real-time or semi-real-time streaming of video to users who request real-time streaming.

A share video module 814 may enable a user to share a video with other users. In one embodiment, sharing the video with other users may provide for sharing the video with friends, family, other users (e.g., spectators) at a particular game, users within a particular group (e.g., high school football group), or otherwise. The module 814 may be configured to use search parameters from users that are used by the video processing module 806 to identify video segments or streams that include video content that match the search parameters, and cause the video segments and/or streaming video to be communicated to users searching for video segments and/or real-time streaming video content. In one embodiment, because the video content is to be processed to determine if the video content includes one or more search parameters, real-time streaming may include video content that is delayed due to processing limitations.

A social media interface module 816 enables a user to load video captured and/or processed by a server onto social media. That is, the module 816 may enable the user to post video content from the server is his or her account or processed by the server and available to the user to one or more social networking sites of the user or group (e.g., high school football fan club). In one embodiment, the module 816 may be configured to establish temporary (e.g., game), extended (e.g., season), or permanent social media networks for users to participate in recording, sourcing, requesting, and receiving video content on a real-time or non-real-time basis, as further described herein.

A synchronized videos 818 module may be utilized to enable the system to synchronize videos from multiple users. In synchronizing the videos for multiple users, if the users are all using an app that is common, then that app may utilize a real time clock to synchronize videos being captured by different users by timestamping video segments, relative clock that is set by a start of the game, or any other technique for synchronizing videos, including identifying an action (e.g., ball snap, pitch, hit, etc.) within a video and matching the same action in multiple videos. The synchronized video module 818 may be utilized by the video processing module 806.

An apply hashtags module 820 may be configured to automatically, semi-automatically, or manually apply one or more hashtags to a video content segment or clip. In applying the hashtags, a server may apply tags assigned to the video content segments by users via the apply hashtags module 722, for example, for storage in a data repository.

With regard to FIG. 9, a flow diagram of an illustrative process 900 for processing and creating an extracted video with particular parameters is shown. The process 900 may start at step at 902, where a player identifier in a sporting event is received. The player identifier may be a number on a uniform or jersey of a player that is playing in the sporting event. At step 904, the player identifier may be identified in the video of the sporting event. The number and jersey may be in color to provide for additional identification capabilities. In identifying the player identifier in the video, image processing may be utilized to inspect numbers on jerseys of the players throughout a video. In one embodiment, the image processing may identify specific colors of jerseys, thereby enabling filtering of players in a manner that avoids identifying a player with the same number on the other team. The player identifier may also have another parameter that defines the player as being in a particular position, such as offense or defense, so that when an offense of a team is on the field, and the player is on the defense, the video processing may simply skip that segment. It should be understood that player numbers and colors may be utilized, but other unique identifiers and combinations of unique identifiers may be utilized to determine player and team of the player.

At step 906, one or more video segments may be defined from video inclusive of the player identifier. In identifying the video segments, start and stop times or any other indices that identify video segments in which the player identifier is included may be used. At step 908, extracted video inclusive of the one or more video segments may be generated. The extracted video may be generated by using references to particular video segments in a single video or multiple videos, or may be a new video that includes each of the selected video segments inclusive of the player identifier. The extracted video may also include transition video segments between each of the extracted video segments that form the extracted video. At step 910, the extracted video may be caused to be available for replay. In causing the extracted video to be available for replay, the video may be available on a mobile device of a user, available on a server accessible by the user via a mobile device or other electronic device, written to and stored in a non-transitory storage medium, such as a disk, tape, or otherwise.

With regard to FIG. 10, a flow diagram of an illustrative process 1000 for crowdsourcing video content is shown. The process 1000 may start at step 1002, where multiple video content segments of a sporting event from video capture devices being operated in an uncoordinated manner may be received at a central location. In being uncoordinated, the video capture devices may be operated by users who are not centrally coordinated by a video production manager using the video to broadcast or for use by a team. The users may be fans, supporters, spectators, family, friends of the team (e.g., coaches), or even part of the team, but overall not coordinated.

At step 1004, a player in one more video segment may be identified using image processing. In identifying the player, a player identifier, such as a player number on his or her uniform, may be identified using character recognition or other image processing technique. In one embodiment, if a player is indicated as being on a particular team, a team jersey may be identified by colors (e.g., white jersey with blue writing on the jersey). If the player is identified in a video segment, indices, markers, pointers, timestamps, or any other computer implemented indicator that defines a start and end of the video segment inclusive of the player may be utilized.

At step 1006 at least a portion of video content segments inclusive of the player in the video segments may be extracted. In extracting the video, the indices, markers, pointers, timestamps, or other computer implemented indicator being used to identify a start and end of a video segment may be stored in an array or other memory configuration. In response to a user requesting to play the video segment(s), the identified video segments as identified by the indices may be played, while unmarked video segments may be skipped. The video extraction may also include identifying one or more tags with video content segments in which a player is or is not included, and those tagged video content segments may be extracted for inclusion in a video. Alternatively, copies of the marked segments may be copied into a different storage or memory area so that a new video including the video segments may be assembled into an extracted video.

At step 1008, at least a portion of the video content segments inclusive of the queried player (i.e., the player matching a submitted identifier as a search parameter) may be enabled for the user to view. In one embodiment, enabling the video content to be available for a user to view may include enabling the user to view the video content via a mobile device or may be written on a non-transitory memory device, such as a DVD, or downloadable via a website, online store, or otherwise.

With regard to FIG. 11, a flow diagram of an illustrative process 1100 used to create a video from video segments is shown. The process 1100 may start at step 1102, where video segments or indices that define video segments from videos of sporting events may be received. At step 1104, video inclusive of the video segments is created. Each of the video segments include a player in the video content that meet or are tagged with input search parameters, such as duration of time near a ball, performing a certain play, at a certain location, in the video segment for a certain amount of time, or otherwise. The extracted or composite video may be created by including transition segments between the video segments. It should be understood that the creation of a video may include generating a list of computer pointers, tags, and/or timestamps that enable a computer to access video content without copying or assembling a new composite video.

Figure 12B:
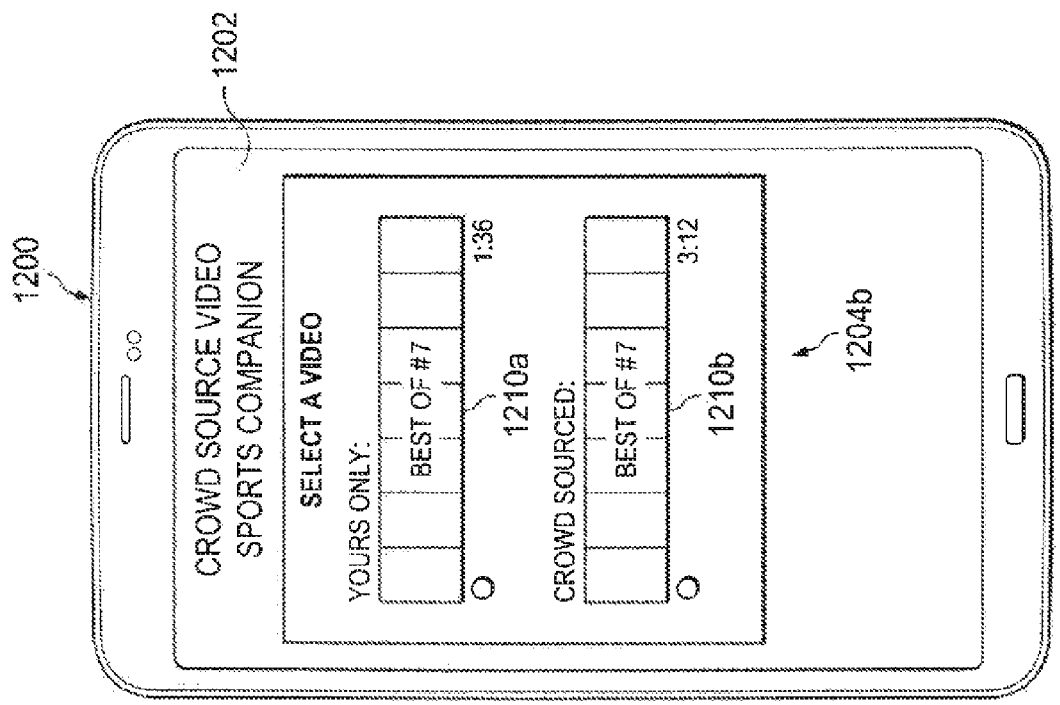
FIGS. 12A and 12B is an illustration of a video capture device, such as a smartphone, that includes an electronic display to be executing an application for capturing and creating extracted video based on one or more search parameters.
Figure 12A:
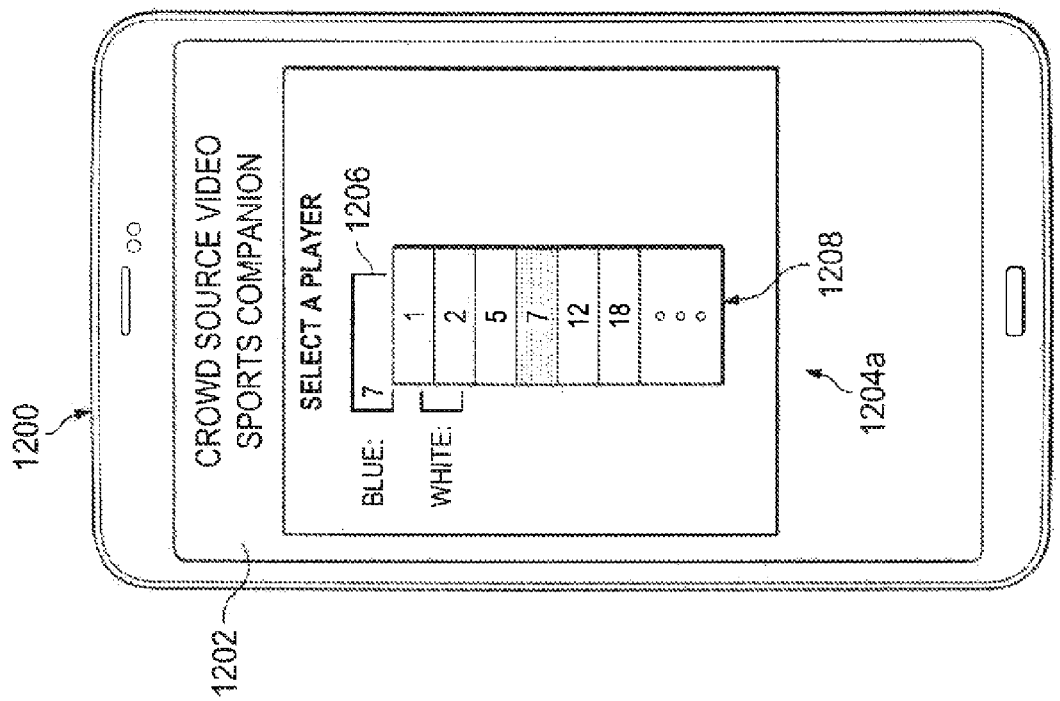

With regard to FIGS. 12A and 12B, an illustration of a video capture device 1200, such as a smartphone, that includes an electronic display 1202 is shown. In FIG. 12A, the video capture device 1200 may utilize a processing unit (not shown) to execute an application or user interface (e.g., website) that supports capturing and creating extracted video based on one or more input search parameters. The video capture device 1200 may identify video content inclusive of content that satisfies the input parameter(s) in generating the extracted video. After capturing video, the video capture device 1200 may provide a user with a user interface 1204*a* that enables the user to select a player based on an identifier, such as a number, on the player's uniform. As shown, a user interface element 1206 may be selected by the user, and a selectable list 1208 may provide the user with player numbers identified within video segments captured by the video capture device 1200. Alternatively, rather than listing numbers limited to players on a team, all numbers 0-99 may be available for selection of a number matching a player. In this instance, the user selected player number 7.

In FIG. 12B, user interface 1204*b* presents two videos that match the user's input criteria to create an extracted video limited to only those video clips with player number "7." As shown, (i) extracted video 1210*a* created from only video that the user recorded is available for playing and (ii) extracted video 1210*b* that includes video of the player number "7" that was crowd sourced (i.e., video submitted by the user and any other user at the same game who submitted video for some or all the users to search with input parameters to create an extracted video).

Figure 13:
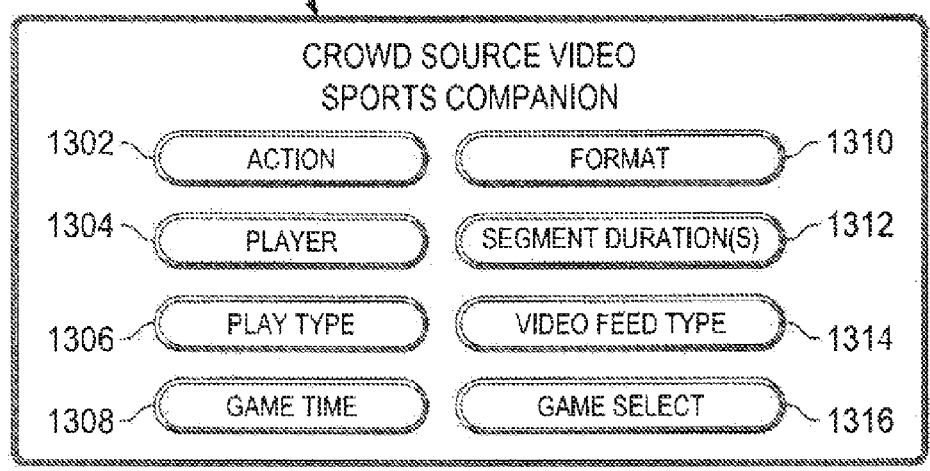
FIG. 13 is a screenshot of an illustrative user interface that provides for selecting a particular action, player, play type, and/or other parameters from a user's or crowd sourced video of a sporting event.

With regard to FIG. 13, a screenshot of an illustrative user interface 1300 is shown. The user interface 1300 provides for a number of different parameter inputs for the system to use in searching video content to identify video segments that satisfy the input parameters. As shown, an "action" soft-button 1302, "player" soft-button 1304, "play type" soft-button 1306, "game time" soft-button 1308, "format" soft-button 1310, "segment duration" soft-button 1312, "video feed type" soft-button 1314, "game select" soft-button 1316 are available for a user to select. It should be understood that additional and/or alternative soft-buttons may be provided on the user interface 1300, as well.

The "action" soft-button 1302 may enable a user to select video segments in which action or particular actions are occurring. For example, the user may be able to select or set a type of action, such as an action in which a player is within a certain distance of a ball, in front of a race, or otherwise. In selecting actions, pre-established tags may be applied by crowd editing as described herein and applied to video content segments.

The "player" soft-button 1304 enables the user to select a particular player on a respective team. For example, the user may select a player number on the uniform of a player, such as shown in FIG. 12A. Other configurations for selecting a player may be utilized, including enabling the user to view a still image from a video and select a player shown in the image using a touchscreen or otherwise.

The "play type" soft-button 1306 may enable a user to request a particular type of play from a particular type of sport. For example, if the sport is baseball, then the user may be able to select which player catches the ball, throws a pitch, is at bat, steals a base, or any other play. Other sports, such as lacrosse, may have different types of plays, such as scoring a goal, preventing a goal from being scored, making a pass, catching or throwing the ball, or otherwise.

The "game time" soft-button 1308 may be used to enable the user to request video content that matches game time (e.g., 43:07 minutes), actual time (e.g., 10:18 am), or segment of a game (e.g., 4th quarter). To enact such a search feature, one embodiment may apply actual time or relative game time to received video content, if known, so that a user may select specific time frames to identify and extract video segments.

The "format" soft-button 1310 may enable the user to select a particular format that he or she wants to receive or view and extract video inclusive of content that satisfies the input parameters. For example, the format selection may enable downloading to a mobile device, posting to the website, writing onto a tangible memory device, or otherwise.

The "segment durations" soft-button 1312 may enable the user to select one or more durations of time for each video segment to extend. For example, the user may select that only video segments having a minimum of about five seconds (e.g., 4.80 seconds or higher) of desired video content be identified and extracted.

The "video feed type" soft-button 1314 may enable a user to select a video feed type, such as "instant replay" or "live feed." If, for example, "instant replay" is selected, then real-time notifications may be sent and/or video delivery may be communicated to the user of the mobile device. An instant replay enables the user to access video, via either a pull or push communication mode, being collected from other users who are participating in a temporary social network established at the game or event. As further described herein, the user may also select to access video content including certain search parameters, for example, from other games. By being able to access video so that a parent with two or more children playing in different games at different locations can see instant replays (or real-time streaming) of their children when identified using search parameters by a search system.

The "game select" soft-button 1316 may enable to search for and/or select games that are being played in a local area or more broadly in other geographic areas. The search may include the system providing a list of selectable games that are geographically sorted, alphabetically sorted, game start sorted, or keyword searchable, as understood in the art.

Figure 14A:
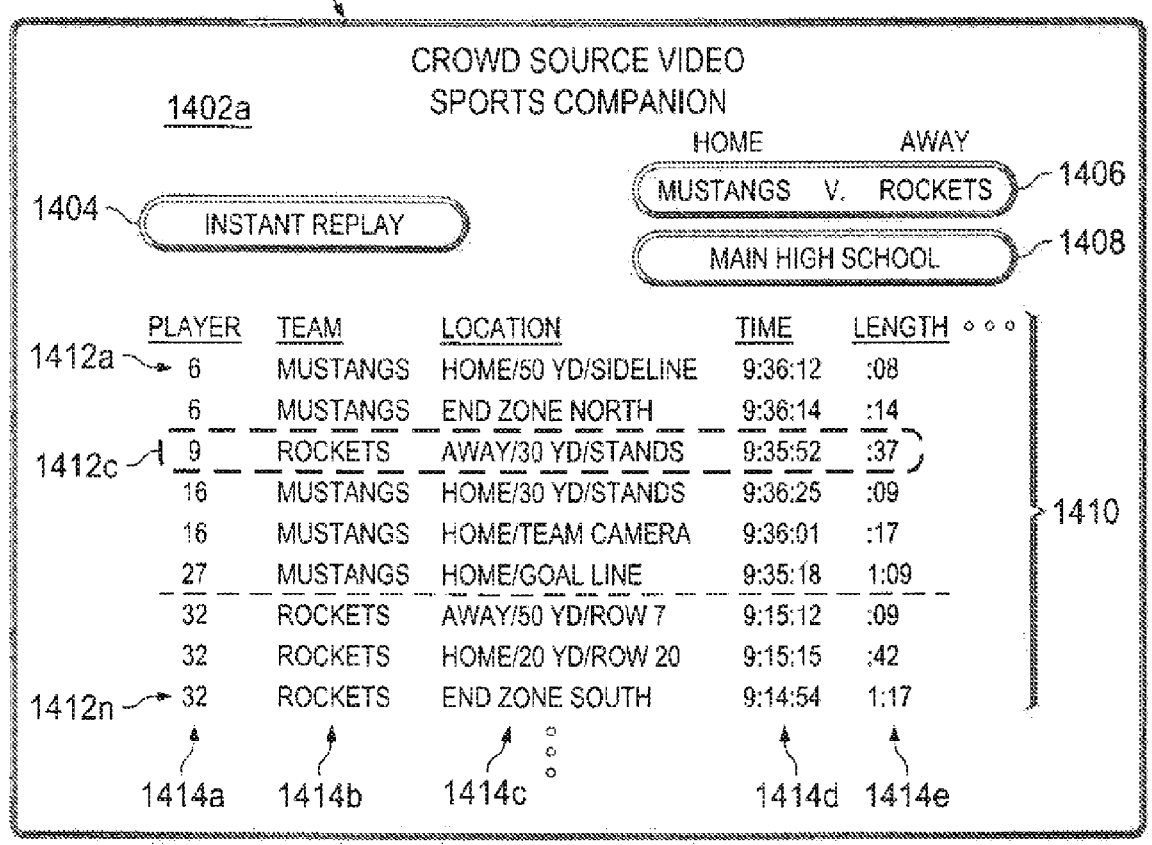
FIG. 14A is an illustration of a video capture device or other electronic device that may be configured to display an illustrative graphical user interface inclusive of videos captured by a spectator and available for instant replay.

With regard to FIG. 14A, an illustration of a video capture device or other electronic device 1400 may be configured to display a graphical user interface 1402. The video capture device 1400 is to be wirelessly networked to a remote server configured to receive, process, and communicate video. The graphical user interface 1402 may be generated by an application or mobile app being executed by the video capture device 1400 or be driven by a remote electronic device, such as a server via a communications network (e.g., mobile network, Internet, and/or local via a wireless communications link that is local to a sports playing field at which the user operating the video capture device 1400 is located). The graphical user interface 1402 includes a selection soft-button 1404 to select a video feed type, such as "instant replay." A user may select the soft-button 1404 to select another type of video feed, such as "live stream."

A "current game" soft-button 1406 may show a current game or event being presented in the user interface 1402, and may be selectable to enable the user to select another game from which to receive instant replay video segments. A "location" soft-button 1408 may show a current location at which the game is being played. The soft-button 1408 may be selectable to enable the user to select other locations of games from which to select.

A table 1410 of available and selectable video segment links 1412a-1412n (collectively 1412) is shown. The video segment links 1412 may be hyperlinks and used to send a request to download respective video content. In one embodiment, the links 1412 may include thumbnail or other images associated therewith. The table 1410 may include a number of different fields, including player 1414a, team 1414b, location 1414c, time 1414d, and video segment length 1414e. It should be understood that alternative and/or additional fields associated with video segments may be available, as well. As shown, the table 1410 is sorted by player number. It should be understood that the table 1410 may be sorted by any of the other fields or combination of fields (e.g., player 1414a first, video segment length 1414e second). As shown, the location provides a specific location of a user at the game. As an example, a user may be located on the home team side, 50 yard line, at the sideline. Alternatively, the user may be located on the away team side, 30 yard line, in the stands. More granular location information may also be available, such as north side of the 50 yard line, south side of the 50 yard line, row number, section number, or any other location identifier or descriptor.

In one embodiment, when a user checks into a game, which may be set up as a temporary social media event, the user may be provided with a number of different input parameters that he or she may enter or select to identify his or her specific location at the game so that other users at the game or remotely located from the game can know where the user is located when recording the video. Alternatively, image processing may be utilized to automatically determine location and/or angle of a user relative to a field or other sports venue (e.g., determine alignment relative to 50-yard line). As shown, each video segment identified includes a player number that is identified within the video segment. If multiple players are identified within a video segment, then multiple listings for the same video segment may be shown, but associated with different players. By presenting the data in this matter, a user may select a single player to view and filter out other players or have the ability to see all players and what video segments are available from different angles including different start times and having different video segment lengths. Rather than all of the available video segments being listed, the user may establish a filter to limit the listing only to those video segments that meet search parameters. In one embodiment, the video content segments may be listed according to angle versus time for a user to select desired video content segments.

Because the table 1410 is meant to provide users or spectators with instant replays, the video segments may be processed in real-time and posted in real-time to be available for selection by the users so that the user may watch the instant replay video segments at an appropriate time (e.g., just after a play occurred or during a referee meeting to determine whether a call was correct). The list 1410 may be ordered in a time sequential order so that past plays may also be available for watching. In response to a user selecting one of the video segment links 1412, such as video segment link 1412c, the user interface 1402 may transition into a video player, such as that shown in FIG. 14C. In one embodiment, a video segment may be recorded or converted to be slow motion or fast motion and an identifier indicative of that video format may be listed in association with the video segments.

With regard to FIG. 14B, an illustration of the video recording device 1400 is shown to be displaying a user interface 1402b, where the user has selectably changed the view from an "instant replay" view to a "live streaming" view by selecting the video feed type soft-button 1404. The user interface 1402b enables the user to select search parameters, such as those shown in table 1416, where the user may select and enter a player, team, play/action, and delivery. As shown, the user has entered two sets of search parameters 1418a and 1418b. In the first set of search parameters 1418a, the user has selected player number "6," team name, action type of where the player is 10 feet or less from the ball, and video delivery, where a notification delivery may include displaying a video segment that matches the search parameters to be posted to a list for the user to view or any other type of message notification that enables the user to select and download video content, as understood in the art. If the user selects an automatic delivery, then in response to a particular set of search parameters occurring and being identified as occurring, then a video segment that matches the search parameter may be automatically in a list, streamed, or otherwise delivered to the video recording device 1400. In one embodiment, the video segments may automatically be displayed on the video recording device, such as in a video viewer as provided in FIG. 14C. Another list 1420 may enable a user to select from a set of live streaming sources 1422a-1422c that lists locations 1424a, users 1424b, and camera types 1424c from which to select by a user.

With regard to FIG. 14C, is an illustration of the video recording device 1400 presenting the user interface 1402c, where the user interface 1402c includes a video display region 1426 for video content to be displayed. The user interface 1402c may include a "live stream" soft-button 1428a and "instant replay" soft-button 1428b that may be selectable by the user to select whether he or she wants to watch live streaming or an instant replay, respectively. A "record" soft-button 1428c may enable a user to start recording new video content without having to leave the user interface 1402c.

In one embodiment, currently set search parameters 1430 may be displayed and selectable for the user to alter the search parameters 1430. For example, the user may be able to select a player search parameter 1432a to change player number, team search parameter 1432b for the user to change teams, and play/action search parameter 1432c to change the play or action search parameter. It should be understood that additional and/or alternative search parameters, such as tags, may be displayed or displayable for the user to view and alter, as desired. A source data field 1434 may display a current source from which video being displayed in the video display region 1426 is being viewed. The user may select the source data field 1434 to select a different source of video content to be displayed in the video display region 1426. For the live streaming 1428a, data that is being collected from any video capturing device at the game using an application that is set up for a temporary social network may communicate data being captured via a communications network to a server that collects, processes, and distributes the video content to the video capturing devices, and are part of the temporary social network in a real-time manner. With further regard to FIG. 2, in the event that the user has set up a live stream delivery, then the server 206 may communicate the live stream 210 for distribution to video capture devices 106 that request the live stream of any other video capture device 106. It should be understood that the live stream may be operative without having a search parameter being met, but rather operate more as a peer-to-peer communication where one fan is able to see a video feed from another fan. In one embodiment, a verification process may be used to confirm that the video feed is being sourced from a playing field, where a playing field may be any area at which a sporting event is played, such as a pool, basketball court, track, football field, etc. The confirmation of the video feed being sourced from a playing field may include identifying at least one feature of a playing field, such as grass, to avoid a fan distributing undesirable video content to another fan. Moreover, one embodiment may include a human curator or editor to review video content prior to distribution of the video content.

In the event that the user has selected the "instant replay" soft-button 1428b, content that is displayed or displayable in the video display region 1426 may not be streamed, but rather downloadable and pushed to the device 1400 for selection, unless requested to be automatically displayed, as described with regard to FIG. 14B, and viewed.

The system may be configured to establish certain relationships between a player and activity. For example, the system may be configured to automatically identify and tag when the player is (i) a certain distance from a ball (e.g., soccer ball), (ii) in a particular stance (e.g., in a batting stance, on the ground (in the case of a slide tackle in soccer)), (iii) traveling at a certain speed (e.g., for race car driving or other sports in which speed is a factor), (iv) in a particular position (e.g., off the ground, near a basket, near a goal, in a crease, near another player, near a sideline, in a batter's box), (v) in a scene for a certain period of time (e.g., 5 seconds), (vi) at a certain distance from a camera, or otherwise so that specific actions by the player or other criteria can be searched. Alternatively, and as described herein, crowd edited tagging of video content segments may be performed in a manual and/or semi-automatic manner (e.g., computer performs a first pass or filtering and user confirms or modifies tags).

In recording the video, standard video cameras, mobile imaging devices (e.g., mobile phones, tablets, GoPro cameras, etc.) may be used and the video footage may be accessed by an editing/playback system capable of being executed on cameras to perform the various identification functions described above. Alternatively, the video footage may be loaded into a separate or remote (e.g., on a server via a communications network) system that executes a software system that processes the image data independent of the video cameras. In the case of the software system being resident on the camera, tagging or identification of the specific players in captured video may be performed in real-time. Alternatively, the tagging or identification of the specific players in the captured video may be performed post-video capture.

For capturing the video, one or more cameras may be used. If multiple cameras are used, the cameras may be synched, or software being executed by both cameras may be remotely synched, such that real-time or relative time between the cameras may be established. In the case of using real-time, real-time clock data may be recorded and associated with one or more video frames so that video from different camera angles may be collected and available to a user who wants to watch a player from different angles. For example, in the case of football, cameras may be placed on opposing goal posts and at an announcers' box. Handheld cameras, including mobile devices, may also be used. Because only one of the goal post cameras will capture the number of the player at each lineup in which the player participates, the other two camera angles may never capture the number of the player, and the software system may not be able to tag or identify the video frames in which the player is participating. However, because video from one of the multiple cameras is able to be used to identify that the player is in the scene and the videos can be synched (at least the times at which the videos are captured can be identified), then the video captured from each of the cameras may be tagged or identified as containing the player. In an alternative embodiment, the cameras may simply be cameras used by fans, and video content may be uploaded to a system that identifies players by numbers on their uniforms and uses tracking software, as understood in the art, to track the players.

If multiple cameras are used to capture video from different video angles, a user may select a video that provides for the best image of the unique identifier (e.g., player number), such as a complete number over a partial number. The selected video can be used in identifying the player. If the videos are synched, then the system may automatically identify the same player in each of the different videos from the different angles. In one embodiment, the system may be automated to identify the video with the best view of the player identifier.

In an embodiment, a system may create a set of video playable segments in which a player's number is identified (e.g., at the start of a play or video segment in which the player appears) using character recognition. The set of video segments may be thumbnails that may be selected using touch or other features to enable the user to view the video segments. In addition, the video segments may be formed into a single video with or without transition segments (e.g., fade-to-black) between the video segments. An editing system may also enable a user to simply drag, select, or otherwise cause the video segment or a selectable portion thereof to be inserted into or at the end of a continuous video using video editing techniques, as understood in the art. In an alternative embodiment, the system may be automated and follow input parameters for content to comply, and, if so, the steadiest, longest, brightest, clearest, sharpest, or other image parameters may establish which video segment from multiple video segments of the same play at different angles should be selected. The video segments may be associated with actual time and/or game time.

In an embodiment, the system may enable a user to select a zoom level for video inclusive of a player wearing a selected unique identifier. The zoom level may be selected from multiple, predetermined selectable zoom levels. Alternatively, a dynamic zoom level may be set by a user, and the system may maintain that zoom level.

In another embodiment, the system may enable a user to select a crop distance surrounding a player wearing a selected unique identifier. The crop distance may be selected from multiple, predetermined selectable crop distances. Alternatively, a dynamic crop distance may be set by a user, and the system may maintain that crop distance surrounding the player.

Access to the video system may be via the camera (if configured with the video processing system), cloud via a website, or local computer. The software may be native or a downloadable app.

With regard to FIG. 15, a screenshot of an illustrative user interface 1500 for a coach to sign-up and select a roster for the team is shown. The user interface 1500 is shown to include a "select roster" window 1502, in which a coach of a team may perform a search to search a data repository for a player name or team name to identify players to include on a team roster. A team roster 1506 may be shown as the coach identifies players on a team. As an example, a player item 1508 includes a player name 1510, player number 1512, player position 1514, and selectable photo element 1516 in which the coach may select and enter a photo of the player. In one embodiment, the coach may select and/or enter the player number and player position using the user interface 1500. As shown, the select roster window 1502 may enable the coach to cancel select in the roster using a cancel soft-button 1518 or select a "done" soft-button 1520 upon completion of selecting the roster.

With regard to FIG. 16, a screenshot of an illustrative user interface 1600 for a player to sign-up and select or submit player information, including jersey number and team name via respective user interface input elements 1602 and 1604 is shown. The player or athlete may elect to skip submitting the information using a "skip" soft-button 1606 or submit the information by selecting a "done" soft-button 1608 within a window or region 1610.

With regard to FIG. 17, a screenshot of an illustrative user interface 1700 for a fan or other user to sign-up and select player(s) to follow is shown. The user interface may include a text entry box 1702 for a user to enter a player name or team to cause a list 1704 of players to be displayed. Rather than using a text entry box 1702, other graphical user interface element(s) may be provided to the fan to locate a player or list of players. Each player record may include a player name 1706, player number 1708 on the player's jersey, position 1710 of the player, team 1712 of the player, photo 1714 of the player, and "follow" soft-button 1716 for the user to selectively follow the respective player. The user interface 1700 may also provide a "skip" soft-button 1718 to enable the user not to follow any players and "done" soft-button 1720 to enable the user to initiate following the selected players. In one embodiment, the "follow" soft-button may change colors or names (e.g., "following," "stop following," etc.).

With regard to FIG. 18A, a screenshot of an illustrative user interface 1800a inclusive of illustrative video feeds 1802a and 1802b are shown to enable a user to view one or more videos of a player captured during a sporting event are shown. The video feeds 1802 may be real-time or non-real-time videos that are available for a user to view. The user interface 1800 includes an information section 1804 that shows information 1806, including player number, player name, time of video capture, photo of player, etc. Additional information 1808 may include team names and games (e.g., names of teams playing one another), location of game or event, etc. Control elements 1810 may provide for a play video soft-button, time of video, add video soft-button, and so on.

With regard to FIG. 18B, a screenshot of an illustrative user interface 1800b inclusive of the video feeds 1802a and 1802b of FIG. 18A are shown. An "add to favorites" soft-button 1812 allows for a user to add the video feed 1802a to a favorite video list. An "add hashtags" soft-button 1814 enables a user to add hashtag(s) to the video in the video feed 1802a. A "share with friends" soft-button 1816 enables the user to share the video with friends or family of the user. The video feed may include other conventional controls, including time control element 1818, full screen control element 1820, and zoom control element 1822. Other control elements may be provided to a user, as well.

With regard to FIG. 19, a screenshot of an illustrative user interface 1900 that enables a user to assign one or more hashtags to a video segment or clip is shown. A list of hashtag soft-buttons 1902 is shown to have respective hashtags 1904a-1904m (collectively 1904) that may be assigned to a video segment may be specific actions performed during a soccer game. It should be understood that the list 1902 may alternatively be defined with hashtags for any sport or activity. As shown, the hashtags 1904 may include "goal," "assist," "shot," "save," "tackle," "foul," "free kick," "penalty," "corner," "header," "cross," "volley," and "add other." By assigning one or more of the hashtags 1904 to the video, users may search for one or more hashtags, and one or more players, to identify videos of interest. Each user may assign one or more hashtags to a video segment such that a combination of the unique hashtags define each of the actions or items in the video segment. The hashtags assigned by each of the users may be a subset of a complete set of hashtags formed by a combination of unique hashtags assigned by all of the users.

The user interface 1900 may also include a name of a game 1906 associated with the video segment, cancel soft-button 1908, and "done" soft-button 1910 to accept the assignment(s) of the hashtag(s) 1904 to the video segment. Assigning hashtags by users operates as a crowd editing function in that one or more viewers may assign the hashtags to video segments collected by users, thereby enabling users to collect video of players at a sporting event and each of the users to access video from each of the participating users.

Figure 20A:
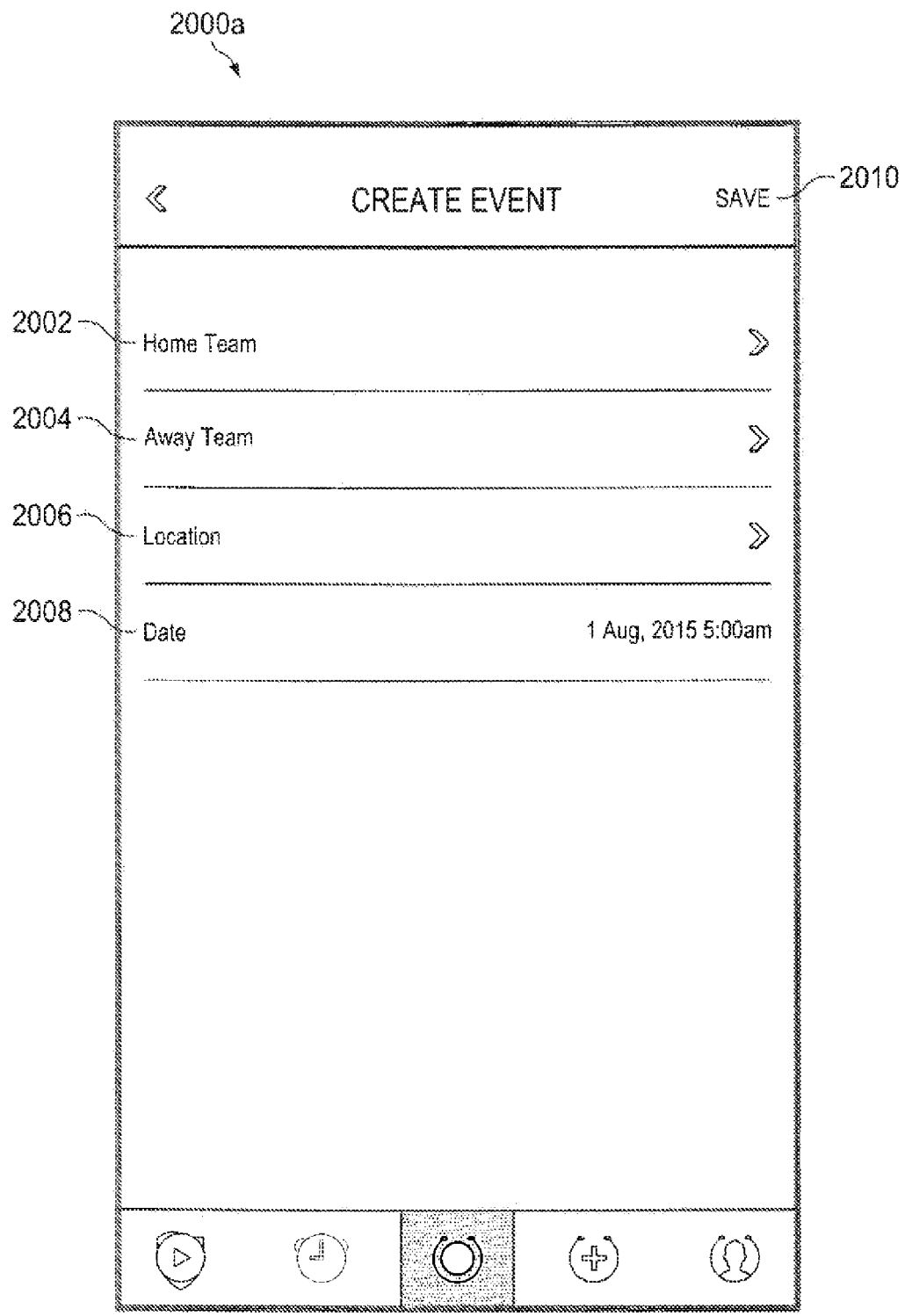
Figure 20B:
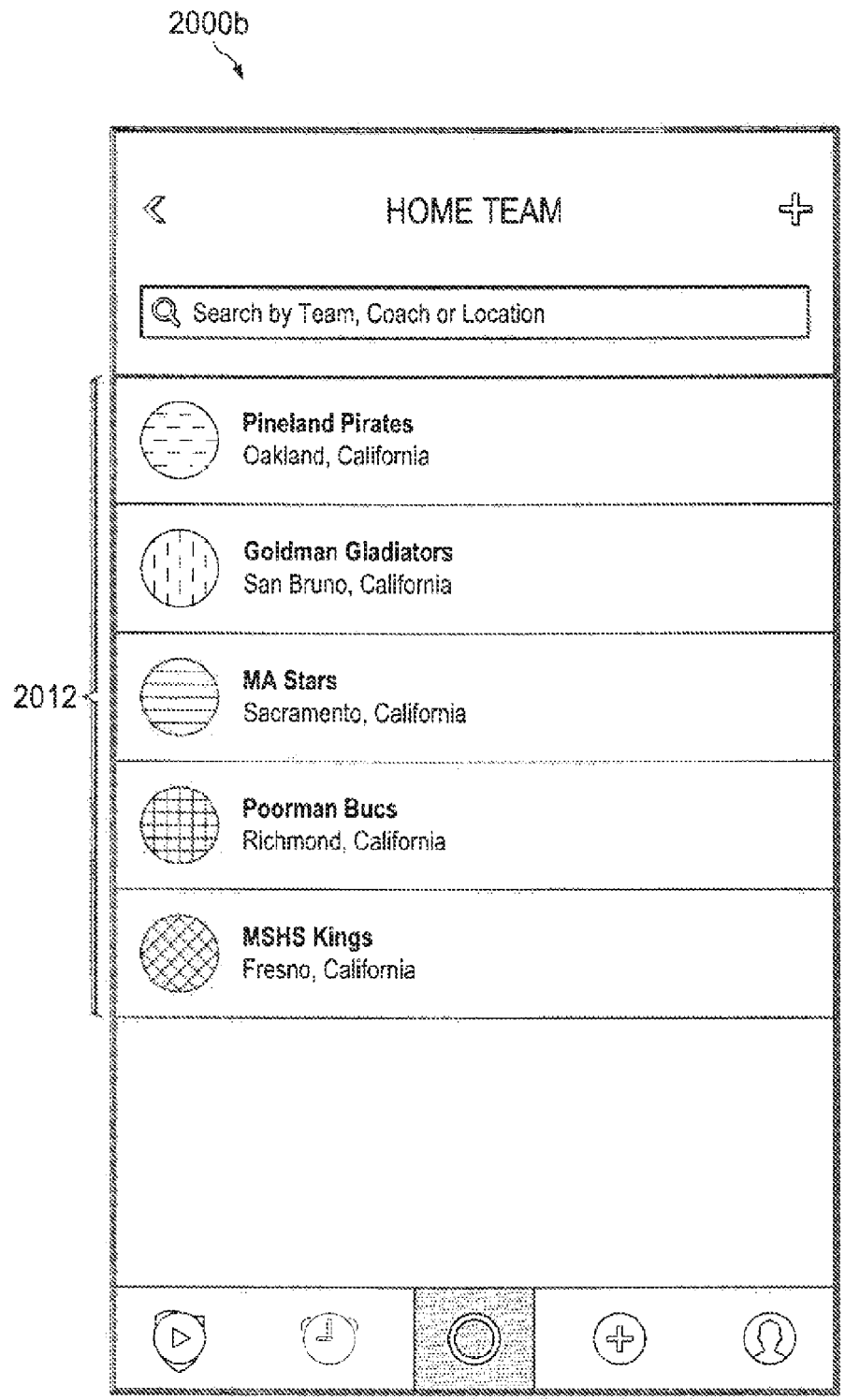
Figure 20C:
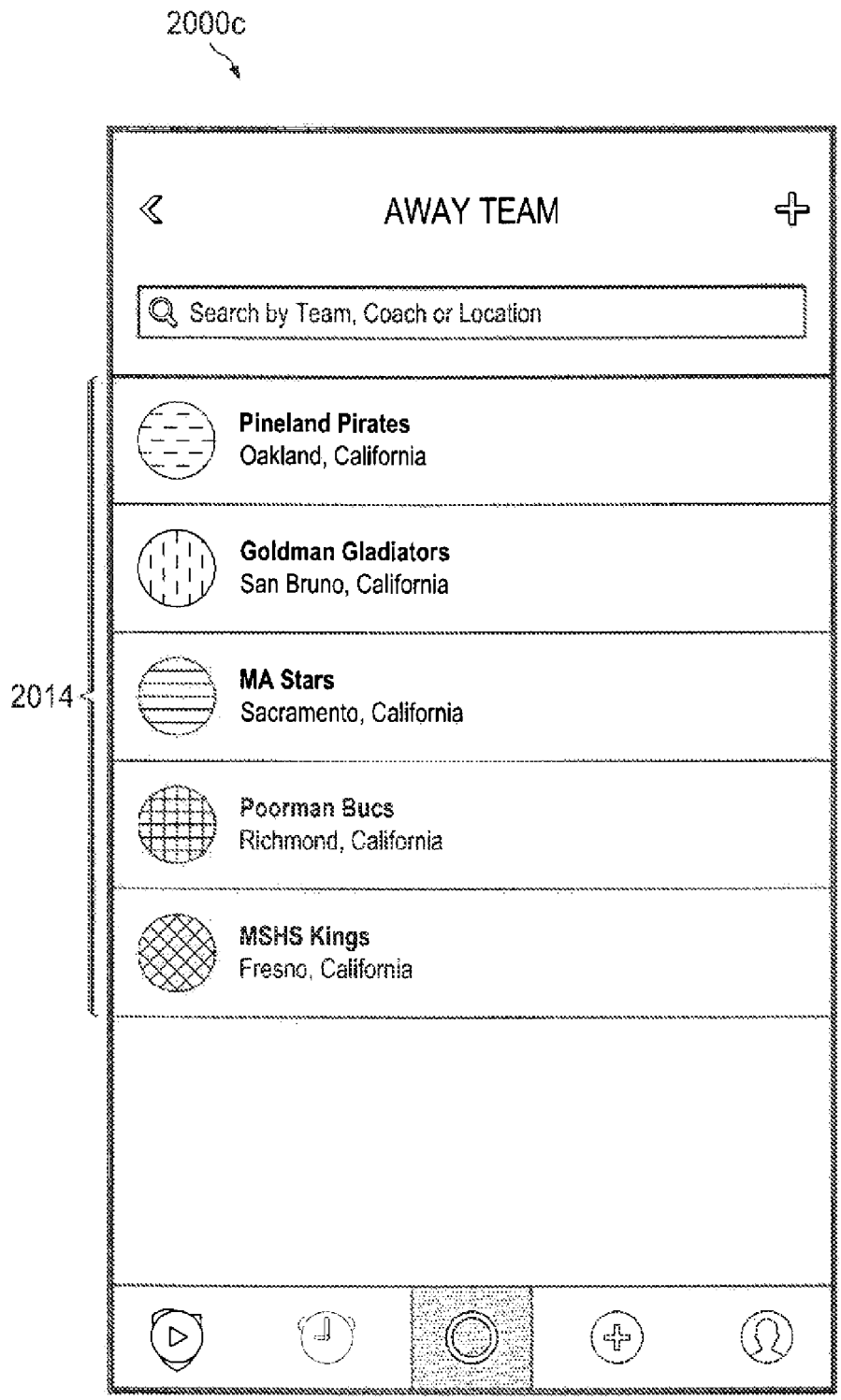
Figure 20D:
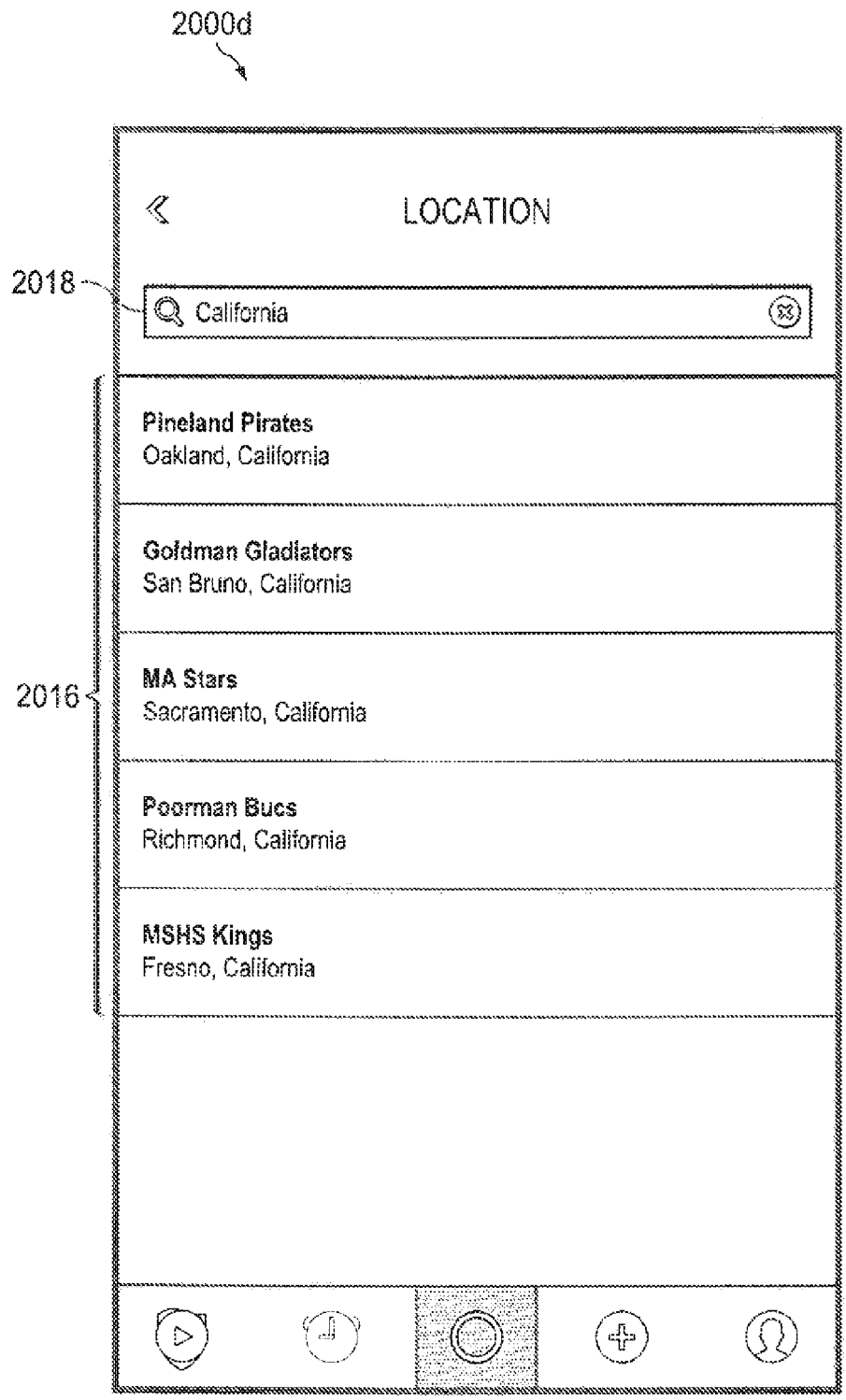
Figure 20E:
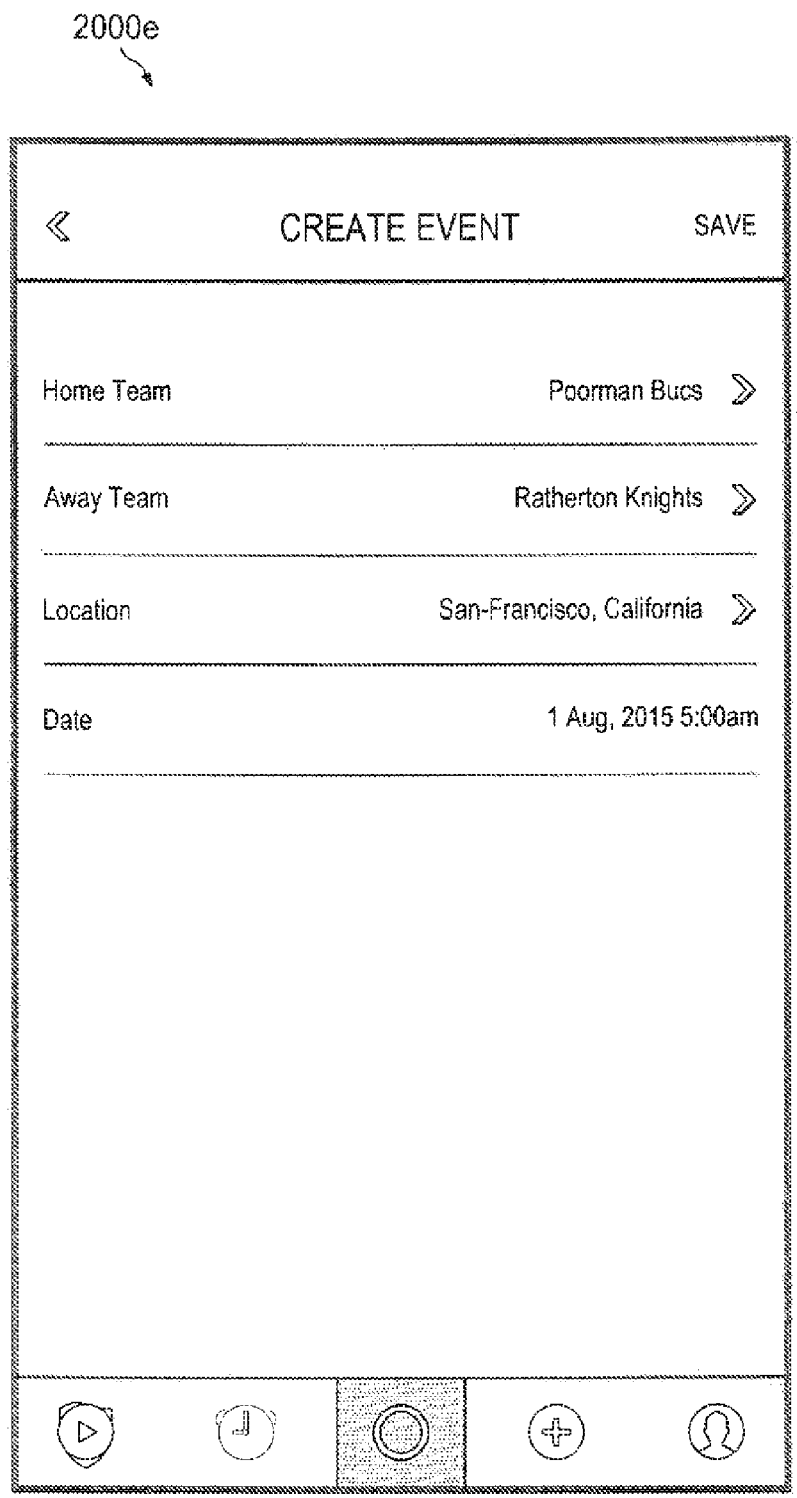
Figure 20F:
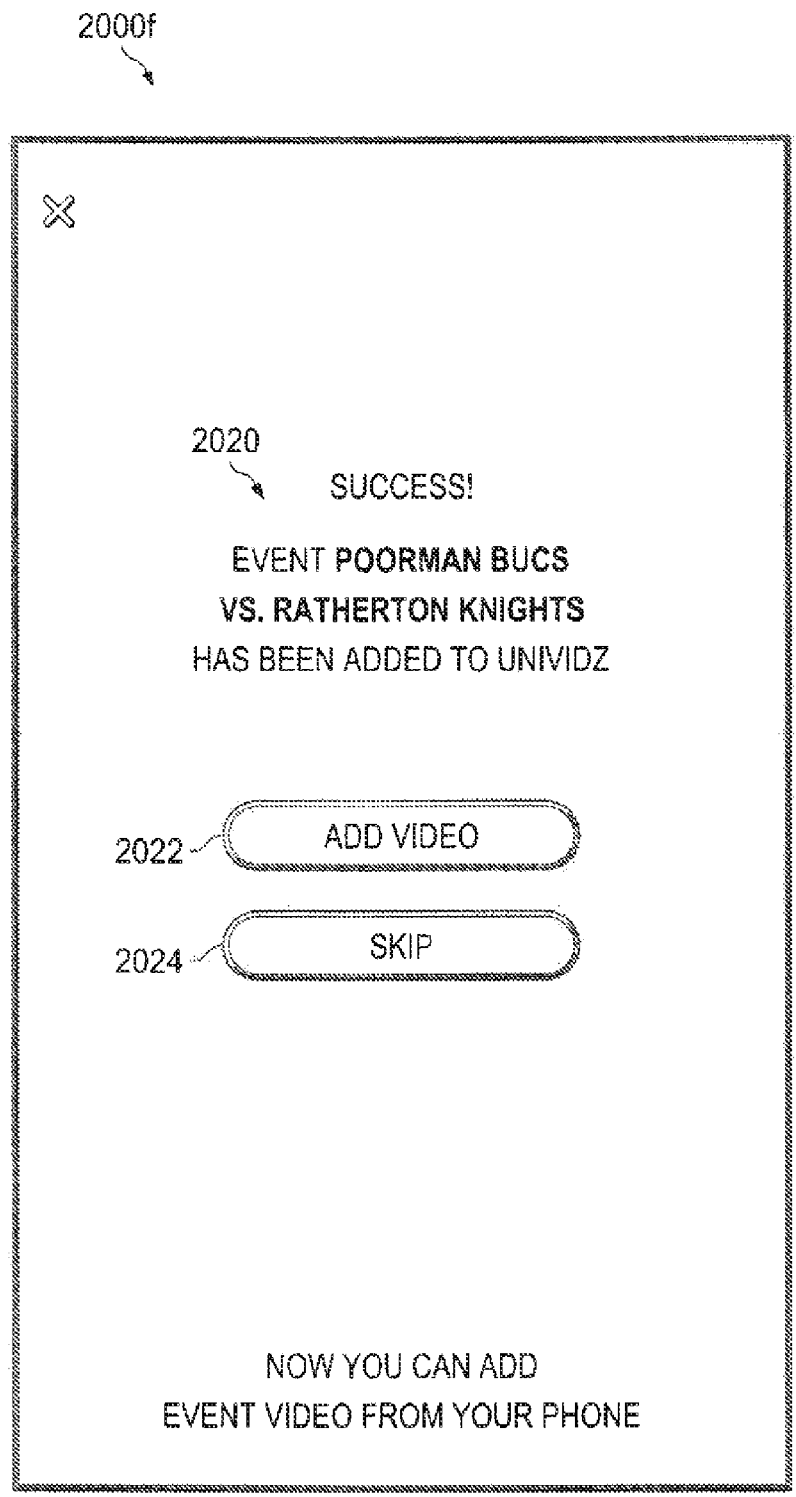

With regard to FIG. 20A, a screenshot of an illustrative user interface 2000a is shown to enable a user to create an event, such as a soccer game. The user may be a coach, parent, fan, spectator, organizer, or otherwise. The event may be any event type established for creation by an operator of the system. As shown, the user interface 2000a may include a "home team" selection element 2002, "away team" selection element 2004, "location" selection element 2006, and "date" selection element 2008. Selection of the selection elements 2002 and 2004 may provide for a user interface 2000b with a list of teams 2012 (FIG. 20B) and user interface 2000c with a list of teams 2014 (FIG. 20C) available for selection of home and away teams, respectively, by the user. Alternative listings, such as locations (e.g., towns, schools, etc.) league(s), from which the user may browse to find the home and away teams may be provided, as well. A selection of the "location" selection element 2006 may enable the user to select from a list of locations. In one embodiment, a GPS location of a mobile device on which the user interface 2000a is being executed may provide a reduced list of locations (e.g., fields) at which games may be available for selection. A user interface 2000d is shown to include a list of locations 2016 at which an event is to be held may be available for selection. The user interface 2000d may also include a text entry field 2018 may enable a user to enter a location to narrow a search for the location of the event. Once the event items are selected, as shown on the user interface 2000e in FIG. 20E, the user may select a "save" soft-button 2010 for entry of the event. The event may be selected by the user and other users for interfacing with the system thereafter. As shown in FIG. 20F, a user interface 2000f may display a message 2020 that notifies the user that the event has been added, and the user may select an "add video" soft-button 2022 to add a video from the event or "skip" soft-button 2024 to skip adding video at the event. It should be understood that a variety of different information may be presented based on the event type or other factor.

With regard to FIG. 21A, a screenshot of an illustrative user interface 2100 may provide for a user to browse content collected at one or more events by selecting an "athletes" soft-button 2102a, "videos" soft-button 2102b, and "hashtags" soft-button 2102c is shown. Selection of the "athletes" soft-button 2102a may cause a list of athletes 2104 from which the user may select to follow one or more athletes 2106 by pressing a "follow" soft-button from a corresponding list of soft-buttons 2108. As shown in FIG. 21B, responsive to a user selecting the "videos" soft-button 2102b, a user interface 2100b may include a list of video segments 2110 may be displayed for a user to review and select individual video segment(s). As shown in FIG. 21C, responsive to a user selecting the "hashtags" soft-button 2102c, a user interface 2100c may include a list of available hashtags 2112 and number of video segments or clips having respective hashtags associated therewith. As an example, a //Touchdown hashtag has 530 videos associated therewith. More detailed search parameters may help to narrow down the videos inclusive of the //Touchdown hashtag.

With regard to FIGS. 22A-22C, user interfaces 2200a-2200c may provide for searching for videos are shown. In FIG. 22A, the user interface 2200a may include a list of videos 2202 associated with a particular player. The list of videos 2202 may include all videos of the player from one or more sporting events. A "follow" soft-button 2204 may enable the user to follow the player. In FIG. 22B, the user interface 2200b may include a list of videos 2206 inclusive of one or more players and having a particular hashtag, in this case //touchdown, associated therewith. In FIG. 22C, the user interface 2200c may provide for a search so that the user may search for videos that are associated with a particular player and hashtag, for example, and a list of videos 2208 may be displayed in response to a search.

With regard to FIG. 23, a user interface 2300 may provide for a video editing environment in which video clips taken by different users at different angles may be listed along a first axis 2302y and time of the video clips may be along a second axis 2302x is shown. The different users that collect the video clips may be located around a sporting event, for example. In one embodiment, the user may enter a location relative to a field (e.g., home team side, 30 yard line), and the location may be used for positioning relative to other video clips collected from a sporting event, in this case the Oakland Riders vs Golden State Warriors game. A first composite video 2304 is shown to be assembled from multiple video clips 2306, in this case three video clips. The composite video 2304 has associated information 2308, including number of players, number of tags, duration, and number of video clips. Available video clips 2310 that meet a search criteria (e.g., player number(s), hashtag(s), or otherwise) may be listed and available for a user to select to include in a composite or extracted video. By providing for each of the video clips with crowd sourced tags, a user may be able to identify and select video content in a fast and easy manner and at angles not possible for a single user to obtain. Various video editing functions, such as clipping, zooming, transitioning, etc., as understood in the art, may be provided, as well. In one embodiment, the editing deck may be automated so that the user is able to receive a composite video without having to perform custom selection or editing.

With regard to FIG. 24, a screenshot of an illustrative user interface 2400 that provides instructions for a user to control functionality of the video editing environment is shown. The user interface 2400 may include an arrow 2402 with an instruction at the arrow that indicates to a user that swiping the screen in the direction of the arrow, in this case to the right, to keep the video segment or clip that has been captured. An arrow 2404, in this case a left pointing arrow, may include an instruction that indicates that if the user swipes the screen to the left, then the video segment will be discarded or deleted. A tap symbol 2406 with an instruction, such as "tap to edit," may indicate to the user to tap the screen to display another user interface to edit the video clip. For example, the editing may include editing or setting a start and stop time of the video so as to shorten a full-length video clip to a shorter video clip. Other video editing functions, such as lighting, zoom, etc., may also be available in an editing mode. Another arrow 2408, in this case an upward pointing arrow, may have a message that indicates to the user that swiping upwards may enable the user to reassign a jersey number with which the video is associated. In an embodiment, rather than reassigning the jersey number, the user may have the ability to add one or more jersey numbers or perform other assignment actions in response to the user swiping the screen upwards. The instruction user interface 2400 may have alternative configurations along with additional functionality.

With regard to FIG. 25, a screenshot of an illustrative user interface 2500 that displays a captured video clip 2502 is shown. The captured video clip 2502 may be swiped in a first direction, such as right, to save or keep the video clip 2502, and may be swiped in a second direction, such as left, to discard the video clip 2502. In addition to being able to swipe the video clip 2502 right and left, "keep" and "discard" soft-buttons 2504a and 2504b may be used by the user to save and discard or delete the captured video clip 2502. It should be understood that additional and/or alternative controls may be provided to a user on the user interface to control keeping and discarding video clips that are captured. An upload or share selectable indicia 2506 may enable the user to upload or share the video clip 2502, where the video clip may be edited or raw. The user interface 2500 may be provided to the user just after capturing a video clip, prior to or during editing one or more video clips, prior to uploading one or more video clips, and/or after uploading one or more video clips to a network server while browsing or otherwise accessing the uploaded video clips.

With regard to FIG. 26, a screenshot of an illustrative user interface 2600 may be displayed in response to the user using the user interface 2500 to keep a video clip is shown. An indicia (e.g., circle) along with a "keep" message 2602 may be displayed to notify the user that the video clip has been kept in response to the user swiping or otherwise selecting to keep a video clip. It should be understood that alternative messages, indicia, and/or keep messages may be displayed to the user.

With regard to FIG. 27, a screenshot of an illustrative user interface 2700 that may be displayed in response to the user using the user interface 2500 to discard a video clip is shown. An indicia along with a "keep" message 2702 may be displayed to notify the user that the video clip has been kept in response to the user swiping or otherwise selecting to keep a video clip. It should be understood that alternative messages, indicia, and/or discard messages may be displayed to the user.

With regard to FIG. 28, a screenshot of an illustrative user interface 2800 that may be displayed after capturing a video clip 2802 is shown. The user interface 2800 shows the captured video clip 2802. Information 2804 beneath the captured video clip 2802 may indicate that the video is raw (i.e., not edited for length or otherwise), and enable the user to keep or discard the video by selecting either the "keep" or "discard" soft-buttons 2806a or 2806b or by swiping right or left. The information 2804 may include an arrow 2805, in this case pointing downwards to indicate to the user that he or she may download the video clip 2802 from a networked server. The arrow 2805 may also point upwards to indicate to the user that the video clip 2802 is local on the mobile device, and that he or she may upload the video 2802 to a networked server. Information 2808 above the video clip 2802 may include one or more player numbers 2810 to which the video clip is assigned or associated, team name, gender, and sport name, for example. It should be understood that additional and/or alternative information (e.g., date of capture, location of capture, current score at time of capture, final score of game, and so on) associated with the captured video 2802 may be displayed.

With regard to FIG. 29, a screenshot of an illustrative user interface 2900 on which a window or page 2902 may be displayed to enable a user to reassign a jersey number to a selected video clip is shown. The page 2902 may be displayed in response to a user performing a gesture, such as swiping a video upwards, or selecting a soft-button to perform a jersey reassignment for a video. In an embodiment, rather than just reassignment, additional jersey numbers may be added to a video clip. As shown, a message 2904 that indicates the current jersey number assigned to the video currently, and a text or selection field 2906 may be presented to enable the user to select or enter a new number of a jersey to be associated with the video. The user may select or enter a new jersey number in the field 2906, and select to either save the new jersey number via a "soft" soft-button 2908a or, alternatively, reset the jersey number assigned to the video by selecting a "reset" salt open button 2908b. The user may select a "cancel" soft-button 2908c to cancel reassigning a jersey number to the video.

With regard to FIG. 30, a screenshot of an illustrative user interface 3000 that enables the user to edit a video clip is shown. The user interface 3000 may include a video clip 3002 along with a full timeline 3004 of the original video clip 3002, in this case a 2:45 second timeline, and a timeline 3006 showing times of an edited video clip with a first time selectable indicia 3008a and second time selectable indicia 3008b that a user may move or otherwise select to change a starting time and ending time, respectively, to produce an edited video clip. The edited video clip may be a portion of the raw video clip. In this case, the starting time of the edited video clip is 2:35 seconds, and the end time of the edited video clip is 2:45 seconds. In an embodiment, the edit times available for the first and second indicia 3008a-3008b may be limited to a particular time, such as 10 seconds. Alternatively, a non-fixed amount of time less than the original length of time of the original video clip may be available to the user to set. Once the user has edited start and stop times of the video clip, the user may select a "save" soft-button 3010a to save the edited video clip or selected a "reset" soft-button 3010b to reset the edited video clip to be the same timeline as the original video clip. Although the user interface 3000 is configured to enable the user to adjust length of the edited video clip, it should be understood that alternative video editing capabilities may also be available, such as lighting, angle, zoom, or any other video editing feature, as understood in the art.

Highlight Reels

Creating a highlight video or reel by users, or even professionals, is a difficult and time-consuming task. To simplify the creation of a highlight video or highlight reel of an event, such as a sporting event, an automated process may be utilized using an algorithm that applies weights and/or priorities to select particular video clips. For participants in an event, such as a team sport (e.g., football, soccer), different types of highlight videos may be created, including a personal highlight video and a team highlight video. For a personal highlight video, a highlight video may be created that features a particular player. For a team highlight video, a highlight video may be created that includes selected or all of the players on the team. Creation of the highlight videos may be performed through use of a computer-implemented algorithm that is automated, at least to a certain extent.

More particularly, the platform may produce two types of automatically generated highlight reels, including an "auto-reel" and "composite-reel" optionally for both individuals and teams. Auto-reels may be generated automatically for each sports event (e.g., game) where video of the event has been uploaded to server from video capture device(s). Composite-reels may be generated on demand. For each type, two subtypes of highlight reels may be generated, a personal reel that highlights game events related to a specific player, and a team reel that features game events potentially related to any player involved in game play.

Both auto-reels and composite-reels are generated by editing together a sequence of video clips to form a highlight video or highlight reel.

The source video clips are created by automatically selecting a short segment of the uploaded raw video. One selection criterion may include a digital signal indicating an automated recognition of a specific player using an artificial-intelligence based player video recognition process that identifies indicia associated with players, as previously described. Another selection criterion may include a user input (e.g., a highlight click) when a user designates a point in time of the game-play that is noteworthy. A highlight click can be collected may be as a button-click (e.g., soft-button on a user interface) in a mobile app of the platform while a user is filming game action in the app. A highlight click can also be collected through the app while a user is not filming game action, but is only submitting highlight click inputs. In addition, a user may supply highlight click inputs there while viewing uploaded game video in a web-based desktop application after the game has occurred. When a highlight click is collected through the mobile application from a user who is not simultaneously recording video, the click may be synchronized to the video recorded and uploaded by others by a timestamp of the click event. When a highlight click is assigned in the web-based desktop app, it may be synchronized to the subject video by reference to the frame ID of the video frame in view when the highlight click is submitted.

In some circumstances, highlight clicks may have other attributes. For example, some highlight clicks might be limited to being associated with the play of a particular squad of a team, such as the offensive team, a penalty-defense squad, or another group of particular interest in the context of a specific sport or program. In the creation of a reel, highlight clicks of a particular type may be given special significance at the election of the user. Highlight clicks may also be associated with a particular team in the game, such as, for example, a home team or an away team.

Highlight reels have a target duration, 1-minute for auto-reels and 3-minutes for composite reels. The actual delivered duration of a highlight video may differ from the target for a number of reasons, for example, clips are added without being truncated, so the sum of the component clip lengths may not equal the target. Other criteria for the distribution of different content types within the video may result in a video that is longer than the target length, such as a video containing a minimum percentage of "highlight" clips versus recognition clips. In an embodiment, the sum of the available uploaded video may fall short of the target reel length.

Highlight reels may be enhanced (i) by the addition of introductory title slides, (ii) by the application of transition effects between video clips, (iii) by the provision of a sound track, (iv) by the addition of still photos of the team, players, or other scenes, and (v) other features.

One feature of an automatically generated highlight reel is through the use of a clip selection algorithm that determines which clips out of all the available clips from the selected games and potentially related to a selected player should be used in the final reel. The clip selection algorithm may optimally select the most relevant clips based on available information. The information may include (i) whether the specified player is recognized by their jersey number in the clip by an AI recognition subsystem, (ii) whether a clip is a highlight clip. If a clip is a highlight clip, whether the highlight designation was supplied by the person who filmed the video, by a person with an expressed interest in an athlete, or other special attributes of the highlight click.

The clip selection algorithm may also fulfill content distribution targets (i.e., time or image content distribution of video captured during an entirety of an event) based on the type of reel the system is generating by applying the following rules, among others:

(1) When the system generates a personal auto-reel (single game source material) for a subject player, the system attempts to include 50% clips that feature the subject player and fills the remaining span of the reel's target length with the highest quality clips available;

(2) When the system generates a team auto-reel or team composite reel, the system attempts to ensure that each player is represented in the reel in the most relevant clip for that player, and that the balance of the target length of the reel is filled with the most relevant clips of general interest to the team;

(3) When the system generates a composite reel (multiple game source material) for a single player, the system attempts to ensure that at least one clip containing the subject player is included from each event the author has selected, and then to include clips containing the subject player regardless of source distribution to reach the target duration of the reel.

(4) When the system selects multiple clips from within a class of a specific imputed quality, the system may attempt to distribute the selections from across the available temporal range of source material by either a detailed method or a shortcut method. The detailed method may use a weighted cumulative density function to distribute the selected clips as evenly as possible across the range of time of the game for which clips are available by spacing the selected clips evenly across the range of the distribution function. The shortcut method may be randomly selected from among available clips. Either of these is referred to as the temporal distribution algorithm.

(5) When the system attempts to fulfill a content distribution target, the system may select clips according to a hierarchy of implied clip relevance, selecting clips from a first priority pool (according to temporal distribution algorithm), then from a second, etc., until either the source material is exhausted or the content distribution target is met.

The pools of clips used for priority pools may be defined as:

"Personal Highlight" (P-HL) meaning a clip was marked with a highlight click, potentially associated with the player's own team, by a user who was not filming and who has a declared interest in the subject player;

"Opposing Highlight" (O-HL) meaning the clip was marked as a highlight associated with the team opposing the subject player's team;

"General Highlight" (G-HL) meaning a clip was marked as a highlight by a user who was either filming uploaded video at the time they recorded the click or who applied a highlight click via the web-based desktop app after the game;

"Personal Highlight with Recognition" (P-HL w/ R) meaning that the clip is a personal highlight and that the clip was identified by the recognition process as including the subject player;

"Personal Highlight without Recognition" (P-HL w/o R) meaning that the clip is a personal highlight but that the clip was not identified by the recognition process as including the subject player;

"Opposing Highlight with Recognition" (O-HL w/ R) meaning that the clip is an opposing highlight and also that the clip was identified by the recognition process as including the subject player;

"General Highlight with Recognition" (G-HL w/ R) meaning that the clip is a general highlight and also that the clip was identified by the recognition process as including the subject player;

"Recognition without Highlight" (R w/o HL) meaning that the clip was identified by the Recognition Process as including the subject player, but that the clip was not marked with a highlight click;

When selecting content for a specific athlete and game relevance, the priority pools may include, in order from highest to lowest:

(i) Personal highlight with recognition;
(ii) Personal highlight without recognition;
(iii) General highlight with recognition;
(iv) Opposing highlight with recognition; and
(v) Recognition without highlight.

As further described herein, the system and process may use the following for creating the above-described highlight reels. In an embodiment, a set of priorities or weights for video clips may be established as:

1. Personal Highlight: If a video clip is selected or flagged by a user associated with a player (e.g., player him or herself, parent, relative, friend, etc.) to be a highlight and a jersey number (i.e., indicia associated with the player) is identified in the video clip, the highest weight or priority may be assigned to the video clip.
2. Highlight including Player: If a video clip is selected by a user not associated with the player to be a highlight and a jersey number of the player is in the video clip, then a second highest weight or priority may be assigned to the video clip.
3. General Highlight: If a video clip is selected by a user and a jersey number is not identified in the video, then a third highest weight or priority may be assigned to the video clip.
4. General Recognition: If a video clip is not selected to be a highlight by any user, then if a jersey number of a user or player of whom the highlight video is featuring is identified, then a fourth highest weight or priority may be assigned to the video clip.
5. No Highlight: If a video clip is not selected by any users to be a highlight and a jersey number of a player on which the highlight video is featuring is not identified, then the lowest or no priority may be assigned to the video clip.

It should be understood that the above priorities or weights are illustrative and that additional and/or alternative priorities or weights may be assigned to each video clip. It should also be understood that the selection of the video clips to be highlights may be made based on automatic identification of an action occurring in a video clip, as further described herein. For example, if an identification of a player carrying a ball across a goal line or hitting a ball is made, then that video clip including that action may be flagged as being a highlight and assigned a highest priority. TABLE I below provides an illustration of setting priorities for video clips to include in a highlight video or reel according to the five priorities provided above. Ranking the video clips may be performed based on the priorities that are determined. In an embodiment, the rankings may be made by accumulating the priorities and determining an average or most popular video clip deemed to be a highlight. The video clips may thereafter be populated into a highlight video based on the rankings, time-of-video during an event, length of video, and/or otherwise.

TABLE I

Video Clip Priorities for Individual Highlight Video

| Video Clip ID | Player ID | Identified? | Highlight Flag | User ID | Related | Priority |
|---|---|---|---|---|---|---|
| TXG8G7T2.37 | 5 | YES | YES | Bob12 | YES | 1 |
| TXG8G7T4.48 | 5 | YES | YES | Steve2 | NO | 2 |
| TXG8G7T5.24 | 5 | NO | YES | Bob12 | YES | 3 |
| TXG8G7T8.15 | 5 | YES | NO | Bob12 | YES | 4 |
| TXG8G7T10.12 | 5 | NO | NO | Bob12 | YES | — |

For team highlight videos, the goal is to produce a video inclusive of general highlights during the game irrespective of particular players who are in the video and include highlight video clips as established, if possible, by the player or someone associated with the player (i.e., video clips identified as priority 1). TABLE II below provides an example set of video clips and associated priorities as determined in a similar manner as TABLE I. However, to illustrate how a team highlight video is produced, players on a team may have the following example set of indicia or numbers on player jerseys: {5, 18, 27, 32, 38}.

TABLE II

Video Clip Priorities for Team Highlight Video

| Video Clip ID | Player ID | Identified? | Highlight Flag | User ID | Related | Priority |
|---|---|---|---|---|---|---|
| TXG8G7T2.37 | 5 | YES | YES | Bob12 | YES | 1 |
| TXG8G7T4.48 | 27 | YES | YES | Steve2 | YES | 1 |
| TXG8G7T5.24 | 18 | YES | NO | Steve12 | YES | 3 |
| TXG8G7T8.15 | 5 | YES | YES | Bob12 | NO | 2 |
| TXG8G7T10.12 | 27 | NO | NO | Bob12 | YES | — |
| TXG8G7T14.10 | 32 | YES | YES | Tom7 | YES | 1 |
| TXG8G7T14.38 | 38 | YES | YES | Lisa2 | YES | 1 |

To enable an automated or semi-automated process for producing a highlight video, the information in TABLES I and II may be formed through the use of a user interface (e.g., on a mobile device user interface (during or after recording) or desktop user interface) on which users, including players, coaches, parents, fans, or otherwise, may use to flag video content in video clips that are worthy of being in a highlight video. FIGS. 31-37 are illustrative user interfaces that users may use to identify players and highlight the video clips. The user may also edit (e.g., clip) the video clips. In an embodiment, an automated image processing system may be executed to identify highlights when an action is performed by a player, coach, referee, spectator, or otherwise, and may form a video clip that buffers the action (e.g., goal). In an embodiment, the system may be configured to start at a logical beginning of a play, such as prior to a snap if the play is a touchdown during a football game. If a highlight is automatically determined, then the video clip may be set to a priority 3. If someone who is not associated with a player in the video clip automatically determined to be a priority 3 indicates that the video clip should be in the highlight video, then the priority of the video clip may be set to a priority 2. If a user who knows a player in the video clip that is automatically determined to be a priority 3 flags the video clip to be a highlight, then the priority may be set to a priority 1. In the event that highlight clicks are used to identify highlights, then timestamps, either actual or relative to game time, may be included in the tables to further assist the system to automatically generate the highlight video.

After the video clips are prioritized, then the video clips may be ranked using the prioritizations of the video clips. Video clips may be ranked initially by the priority values. If length of the highlight video is limited to a certain length, then a process for maximizing the length of the highlight video based on time of each of the video clips. An optimization process may be used to select videos of the same priority, starting with priority 1, that can best fit within the allotted time. If length of time is not a limitation, then each of the video clips that have been identified as highlight video clips may be included in the highlight video. In an embodiment, the video clips may be ordered in time sequence from beginning to end of an event, as previously described. If highlights with particular events are to be included as optionally designated by a user clicking a highlight point in time while capturing the video or afterwards, as previously described, the tags, such as special team highlights, fumbles, turnovers, scoring plays, or otherwise, may be included in the highlight video.

With regard to FIG. 31, a screenshot of an illustrative user interface 3100 for viewing, editing, and selecting videos is shown. The user interface 3100 may include a "Create AutoReel" soft-button 3102 that allows a user to automatically create a highlight video. In creating the highlight video, as previously described, two different types of highlight videos may be created, a "Player Reel" and a "Team Reel." In response to a user selecting the soft-button 3102, the user interface 3102 may transition to user interface 3200 of FIG. 32.

With regard to FIG. 32, the user interface 3102 may include two soft-buttons, a "Player AutoReel" soft-button 3202 or a "Team AutoReel" soft-button 3204. Selection of the soft-button 3202 may cause or initiate an automatic or semi-automatic creation of a player highlight video to be generated based on an algorithm that prioritizes and/or weights video clips that have been identified by one or more users, automatic identification of an indicia on a player jersey, automatic identification of an action performed by one or more people in the video clips, and so on. Selection of the soft-button 3204 may cause an automatic or semi-automatic creation of a team highlight video to be generated based on an algorithm that prioritizes and/or weights video clips that have been identified by one or more users, automatic identification of indicia on each players' jersey listed to be included in the team highlight video, automatic identification of an action performed by one or more people in the video clips, and so on.

With regard to FIG. 33, a screenshot of an illustrative user interface 3300 that lists selectable teams 3302a-3302n (collectively 3302), in this case sports teams, on which a user or an associate of a user may participate is shown. The user may have no particular affiliation with the sports team, as well, and be a fan or simply someone who enjoys creating highlight videos. The selectable events 3302 may contain video clips that may have been captured by one or more sources, such as different spectators (e.g., parents), who attended the event. Uniform numbers 3304a-3304n (collectively 3304) of the user may be listed with each of the respective teams 3302. In response to a user selecting a team, such as the "2017-18 Briarcliff Basketball 8th boys" team 3302a, the user may be presented with each game that the team played.

With regard to FIG. 34, a screenshot of an illustrative user interface 3400 showing a listing of games 3402a-3402n (collectively 3402) from which the user may select using selection soft-buttons 3404a-3404n is shown. In this case, the user has selected a game "12/17/17 vs. Scarsdale" game 3402T More than one game may also be selected and highlight video clips may be selected from the one or more games 3402. It should be understood that the video clips may be edited such that portions of the video clips may ultimately be included in the highlight video.

With regard to FIG. 35, a screenshot of an illustrative user interface 3500 inclusive of video clips from the selected game(s) from FIG. 34 is shown. In this case, a single game was selected so video clip(s) 3502a-3502n (collectively 3502) associated with the selected game may be displayed. The user may also be able to add images and/or video clips that may be selected and/or edited by using editing tools. As previously described, the editing may be performed in an automated manner by identifying a first time and a last time in a video at which an indicia (e.g., uniform number) associated with a player is captured. Alternatively, a player identifier process may be utilized to identify an indicia associated with a player and then process may go forward and backward in the video to track the user so as to capture times that the user is in the video clip, but the indicia of the player is not visible to the camera.

The user interface 3500 includes a number of different user interface elements, including a title soft-button 3504 that enables a user to change the title of the highlight video. A "change" soft-button 3506 that enables a user to select a different audio track that plays behind the highlight video. An "Add Image" soft-button 3508 may enable a user to upload a still image or photograph, and an "Add Clip" soft-button 3510 may enable a user to select a video clip to upload for use in adding to the highlight video. Once added, each video clip 3502 may be edited by the user selecting an "Edit" button 3512 and removed by the user selecting a "remove" soft-button 3514. The user may edit the video using any conventional video editing tool, as understood in the art. In an embodiment, the editing tools may enable the user to select a tool that causes an identification of one or more indicia on player uniforms (e.g., identify when the user's uniform number is visible at the same time as another uniform number, such as an opponent, identify when the user's uniform number is visible during an event, such as a touchdown, identify when the user's uniform number is within a certain distance of an object, such as a ball, etc.).

With regard to FIG. 36, a screenshot of an illustrative user interface 3600 that lists a set of highlight videos 3602 is shown. The list of highlight videos 3602 may include (i) individual highlight videos that feature an individual player or actor or (ii) team highlight videos that feature each player or actor who participated in one or more events. The list of highlight video 3602 shown includes a single event, in this case a basketball game, in which the user participated. It should be understood that multiple highlight videos may be shown in the list of highlight videos 3602. An indicia 3604, in this case in uniform number "5," may be associated with each the highlight video 3602 to indicate that the highlight video focused on a particular player. It should be understood that additional highlight videos that feature different players may also be provided in the list of highlight videos 3602. If a team highlight video were made, an entire list of players (e.g., multiple uniform numbers) who participated in the game or season may be associated with each video clip or another indicia, such as "T" for team, may be shown in association with a team highlight video. A list of uniform numbers may be stored and used by an algorithm to ensure that each player associated with the uniform numbers is included in the team highlight video. In response to the user selecting a highlight video, video clips that are included as part of the highlight video may be presented to the user, as shown in FIG. 37.

With regard to FIG. 37, a screenshot of an illustrative user interface 3700 inclusive of video clips 3702a-3702n (collectively 3702) is shown. The video clips 3702 that were selected as being highlights using an algorithm that may automatically select from a set of video clips based on priorities, as further described herein. The video clips may be organized in chronological order during the event, in this case a basketball game, as identified in timestamps 3704a-3704n. A user interface element 3706a may be selectable by a user to expand to show information associated with the video clip 3702a. The information may include a name or identifier of a user who selected the video clip to be a highlight video clip, player(s) who were to be featured in the video clip based on uniform number or otherwise, action to be captured in the video (e.g., touchdown), and so on. In an embodiment, a video clip may be deleted from the highlight video. In an embodiment, deletion of a video clip from the highlight video may result in the video clip not being added to future highlight videos or at least those associated with a particular player. Alternatively, a notification or identifier may be presented to a user that indicates that the video clip had been deleted from another highlight video so as to enable the user to assess whether or not to reconsider the video clip for future highlight videos.

One embodiment of identifying video to set as a highlight may include automatically identifying a particular action of a referee, umpire, player, coach, fans, or anyone else. The action may be sport specific, but not be an action that is part of playing the sport itself. For example, in a football game, the action may be made by referee who moves his or her arms into a certain position machine-identifiable position, such as raising his or her arms to signify a touchdown or field goal, pointing an arm in a certain direction to signify a turnover, or rotating an arm to signify that the play, such as a catch, was completed in fair territory. For a car race, image processing may be used to identify that a flagman raised a yellow or checkered flag. In the case of a player, an identification of crossing a goal line and/or "spiking" a football may also be used as an identifying action to signify a touchdown, but such an action is not an action for playing the sport, but rather an action that signifies that an action while playing the sport was successfully completed. Still yet, if fans are captured in a video and they clap, stand in unison with cheering, or perform some other highlight associated action, then a highlight may be identified. As is further described herein, an identification of a highlight point in a video clip or segment may define a point around which a predetermined or requested buffer may be established before and after the point. As an example, in the event that the referee raises his or her hands to signify a touchdown, a buffer may be started a certain amount of time (e.g., 5 seconds) prior to the touchdown and certain amount of time, which may be the same or different than the time prior to the touchdown.

With regard to FIG. 38, a flow diagram of an illustrative process 3800 for generating a highlight video of an event from video clips is shown. The process 3800 may start at step 3802, where multiple video clips of the event may be collected. One or more users may be enabled to select to view the video clips and to set an indicator to use to include an associated video clip into the highlight video at step 3804. At step 3806, the one or more indicators may be stored in association with the respective video clips. A user identifier may be stored in association with the one or more indicators to indicate who set the respective indicators at step 3808. The video clips may be ranked at step 3810 based on the one or more indicators associated with the video clips and user identifiers associated with the one or more indicators. The highlight video may be automatically generated based on the ranked video clips at step 3812.

An automatic determination may be made as to whether a user who set an indicator associated with a video clip is associated with a participant on which the highlight video is featured. A participant featured in a highlight video may be a player on a sports team. A user associated with a participant may be someone who is set up to be related to the player in some acceptable way, such as the player him or herself, parent, relative, friend, or otherwise. The process may further include automatically determining whether an indicia associated with the participant on which the highlight video is being featured is viewable in the video clip.

An automatic determination as to whether an action within a set of actions occurred in content of the video clips. An action identifier may be set in association with a video clip if the action occurred within the video clip. The identifier indicative of the action being identified in association with at least one respective video clip may be set. Ranking the video clips may include ranking the video clips based on determining the action within a set of actions occurred.

An automatic determination as to whether a participant is in the one or more video clips may be made, and an indicator indicative of the participant being in the video clip may be set. Ranking the video clips may further include ranking the video clips based on determining whether the participant is in the video clips. The automatic determination as to whether the users in the one more video clips may include determining whether an identifier or indicia (e.g., jersey number) on a player jersey is identified in the one or more video clips.

A list of each player on a team and an identifier on a player jersey for each of the players may be received (e.g., a coach may submit each player who starts, each player on the team, each player who played in a game, etc.). At least one video clip in which each player is included may be automatically identified. Ranking the video clips may include ranking the video clips such that each player in the list is included in at least one video clip in the highlight video. That is, even if a video clip of a first player is ranked higher than a video clip of a second player, if the second player is only visible in one video clip, then that video clip with the second player may be ranked higher than the video clip that includes the first player. In an embodiment, a length of time for the highlight video to be made may be received. The automatic generation of the highlight video may include automatically selecting video clips that, when combined, fit within the length of time. The ranking may also include using content distribution, as previously described.

In response to determining that an action occurred in at least one video clip, a start time and stop time may be set before and after a time at which the action is identified to have occurred in the video clip, as previously described. Determining that an action occurred may include automatically determining that a participant within the video clip performed an action that is not part of a sport being played. For example, the action may be a touchdown dance to celebrate the occurrence of a touchdown. Alternatively and/ or additionally, a referee raising both arms to signify a touchdown may be used. Still yet, a standing ovation by members of a crowd may be used to indicate that a highlight may have occurred. In the event that a user performs a highlight click, as previously described, the process may use that click time and any associated information to define a highlight clip using a fixed start and stop time buffer or automatically identify a start and end time of a play (e.g., at a lineup and when a goal or touchdown is scored).

More particularly, the creation of (i) a team auto-reel or team composite reel or (ii) personal auto-reel or a personal composite reel may be performed using the following processes.

Team Auto-Reel or Team Composite Reel

A Team Auto-Reel may have a Target Length (TL) of 1.00 minutes. A Team Composite Reel may have a TL of 3.00 minutes. As previously described, team reels may have a content distribution target to ensure each recognized player is included at least once.

Select clips in priority order (P-HL w/ R, P-HL w/o R, G-HL w/ R, O-HL w/ R, R w/o HL) until each jersey that had any recognitions from the team is represented, allowing that some clips may contain representations of multiple players on the team;

If the Reel is <TL, then add highlights in priority order (G-HL, P-HL, O-HL) until the reel is >TL or highlight clips are exhausted;

If the Reel is still <TL, then add R w/o HL until the reel is TL or recognitions are exhausted.

Personal Auto-Reel

A Personal Auto-Reel may have a TL of 1.00 minimum. The Personal Auto-Reel may have a Content Distribution Target to ensure that 50% of the duration is composed of clips that include the subject player.

Add clips in priority order (P-HL w/ R, P-HL w/o R, G-HL w/ R, O-HL w/ R, R w/o HL) until >50% TL or eligible clips are exhausted;

If reel is <TL, add clips in priority order (G-HL, P-HL, O-HL) until reel >TL or highlight clips are exhausted Personal Composite Reel A Personal Composite Reel may have a TL of 3.00 min. The Personal Composite-Reel may have a Content Distribution Target to ensure that at least one clip containing the subject player is included in the reel from each source game specified by the author. The Personal Composite Reel may have a second Content Distribution Target to ensure that at least 50% of the duration is composed of clips containing the subject player with the remaining content reflecting the most relevant clips from the events in the aggregate.

Select one clip from each event, in priority order within that event (P-HL w/ R, P-HL w/o R, G-HL w/ R, O-HL w/ R, R w/o HL);

If reel <50% TL, add clips in priority order without regard to source event (P-HL w/ R, P-HL w/o R, G-HL w/ R, O-HL w/ R, R w/o HL) until >50% TL or eligible clips are exhausted;

If reel <TL, add clips in priority order (G-HL, P-HL, O-HL) until >TL or eligible clips are exhausted;

If reel <TL, add Recognitions of any player until >TL or eligible clips are exhausted.

Duplicate Suppression

In an embodiment, to avoid including duplicate content in any reel, each time a clip is selected to be included in the reel, all other candidate clips whose temporal span overlaps the selected clip may be removed from the candidate pool before the next clip is selected.

Order of Presentation

In an embodiment, after all clips have been selected into a reel to fulfill Content Distribution Targets and duration and quality goals, then clips may be ordered in time according to the timestamp of the actual content of the clip.

Tracking System

In accordance with the principles provided herein, the system may provide for tracking of individual players and use that tracking to enable a user to (i) create plays, (ii) recruit/draft players, and (iii) support gaming. In creating plays, a coach or other user may be provided with tools to be able to run "what-if" scenarios of a player or a set of players against an opposing team.

With reference FIG. 39, an illustration of a field 3900 on which players 3902 are rendered as Xs and Os based on three or more video recording devices or video cameras 3904a-3904n (collectively 3904) may capture video content (e.g., video clips or continuously captured video) of a game being played or other event. In an embodiment, video captured by the video recording devices 3904 may be synchronized to one another using a real-time clock or relative clock (e.g., game-time clock), and players captured within at least three video cameras 3904 may be tracked using triangulation to provide for tracking purposes in two-dimensions (2D) or three-dimensions (3D), as understood in the art. The triangulating may include distance measurements from each of the respective video recording devices 3904 to the player(s), where the measurements may be determined based on relative size, distance measuring device within the video recording devices 3904, focal distance, or otherwise while recording or post-processing of the video content. Although the video recording devices 3904 are shown around the field, it should be understood that the video recording devices 3904 may be above the field or at any other angle relative to the field or event. That is, by using at least three video cameras 3904, the players 3902 and objects within view of the video recording devices 3904 may be tracked.

A tracking system may track the players based on indicia (e.g., jersey numbers), thereby enabling a system to monitor and/or determine motion of one or more players during an event (e.g., soccer game). The tracking of the players may be converted into a coordinate system that may be characterized or identified by a user or automatically, and a tag, such as "penalty shot," "passing play," or otherwise, may be assigned to performance of a player and/or team. Over time, a player may be tracked such that statistical analysis may be performed to determine various motions, successes, failures, strengths, weaknesses, habits, or any other actions that may be identified by a machine in an automatic, semi-automatic, or manual manner. For example, a player who kicked a penalty shot multiple times throughout a season may be analyzed to determine statistics of a location on a goal that the player tends to kick, such that an opposing player may be provided with statistical information (e.g., player kicks to lower left 10% of the time, player kicks to upper left 32% of the time, and so forth). In an embodiment, an opposing player, such as a goalie having his or her statistical parameters (e.g., speed going left, speed going right, reach, percent of time extends left upper, left lower, right upper, right lower, stays stationary, etc.), may be collected for later use in matching up to offensive players on another team (e.g., within a video game).

In an embodiment, the video recording devices 3904 may be mobile devices (e.g., mobile phones), video cameras, or fixed-position cameras, such as cameras that may be mounted to a goalposts, stand, or otherwise, and the video recording devices 3904 may be identified as certain locations surrounding a field, for example, thereby enabling relative position of players 3902 being captured in the video to be tracked relative to the field in performing an analysis. Distance relative to the field may be used for sizing purposes, but the video captured by the video recording devices 3904 may be used to identify an identifier (e.g., jersey number) on a player, and motion relative to the player as determined by identifying the player in at least three videos captured by at least three corresponding video recording devices 3904 may be utilized for analysis purposes, as described herein.

With regard to FIG. 40, a block diagram of a set of software modules 4000 that may be utilized in tracking and analyzing players captured by video recording devices are shown. The modules 4000 may include a player identification module 4002 in which a player may be identified by a number on a jersey, for example. The module 4002 may be configured to identify the player in multiple video clips captured by three more videos, and synchronize those videos. Alternatively, a synchronization module (not shown) may be configured to synchronize videos, as previously described. By synchronizing the modules, triangulation of the player(s) may be used to track movement or actions performed (e.g., scoring basket) by the player.

A player tracking module 4004 may be configured to track movement of a player in multiple videos that have been synchronized. The module 4004 may track the players whether or not a jersey number is identifiable throughout an entire video. As previously described, the module 4004 may be configured to identify that a player enters a video, and optionally provide a buffer prior to the player entering the video, to track the player while in the video, and optionally add a buffer after the player exits the video in case the player returns to be within the video again.

The player tracker module 4004 may be configured to determine the relative position of the player from each of the video recording devices. A triangulation module 4005 may be part of or operation in conjunction with the player tracking module 4004. The triangulation module 4005 may be configured to triangulate the location of a player relative to three or more video recording devices that may capture a player in respective videos. In an embodiment, the triangulation module 4005 may determine relative positions of the videos relative to one another so that distances of a player relative to each of the videos may be determined, thereby providing for triangulation functionality to determine actual or relative position on a field, for example. In addition to tracking players, objects, such as a ball (e.g., soccer ball) may be tracked by the player tracking module 4004 in conjunction with the triangulation module 4005. The module may be configured to generate player motion points and/or vectors and store that data to a data repository for use by other modules, as further described herein. The player motion points and/or vectors may be generated using the triangulation from the videos captured by the video recording devices.

An action statistical module 4006 may be configured to determine actions performed by a player. For example, the action statistical module 4006 may be configured to track sport-specific actions based on detection of movement of the player (e.g., location relative to a foul line or basket/net) or input from a user who tags an action performed by a player in a specific video. In an embodiment, other video that captured the same player at the same time may correspondingly be tagged with the same actions. Statistics may be generated for that action. For example, statistics may include speed, distance, actions (e.g., number of kicks, passes, baskets, etc.), or any other action that may be tracked in a statistical manner. For example, a player may be tracked in kicking penalty shots, and a number of times the player successfully scores a goal when kicking penalty shots may be tracked. In an embodiment, in addition to tracking the number of goals scored by a player kicking a penalty shot, specific locations in which the player kicks the ball when making penalty shots may be track (e.g., upper left, upper center, upper right, lower left, lower center, lower right). The statistics generated by the module 4006 may be stored for later use, as further described herein.

A scenario generator module 4008 may utilize the tracking data produced by the player tracking module 4004 to enable a coach or other user to generate game or other scenarios. For example, the scenarios may include generating plays and determining how well a player or multiple players perform in those plays. In one specific example, a coach may utilize the tracking data to match a player (e.g., penalty shot kicker) against another player (e.g., goalie) in making penalty kicks. Other scenarios may include matching a wide receiver up against a defensive back or safety. In creating the scenarios, avatars (e.g., virtual players), Xs and Os, or any other representation of the players may be utilized. That is, the images produced by the scenario generator module 4008 may not be video, but rather graphical images (e.g., avatars, virtual players, Xs and Os, etc.) that represent movements of players that have historically been captured and generated by one or both of the modules 4004. It should be understood that a wide variety of scenarios may be generated by the module 4008. In an embodiment, the module 4008 may provide a user with the ability to select from available players or and/or scenarios such that a coach made use existing players from the database and insert his or her players selected by the user into various positions in the players that are sport specific. For example, the sport may be lacrosse, soccer, football, basketball, etc., and the user may insert one statistical information and/or specific tracking data of the players produced by the modules 4004 and 4006 to include player data for use in various scenarios to determine how well his or her players perform.

Such a system may help the coach or user define plays and determine which players may best be suited for specific plays. In an embodiment, the system may have a data repository that includes data from opposing teams, such that the system may enable a user to generate a scenario against a specific team, thereby being able to match up players against different players of another team. Again, the statistical information generated by the action statistical module 4006 may be utilized for each of the players.

A player modeling module 4012 may enable the data collected by the player tracking module 4004 and action statistical module 4006 to be modeled. The modeling may be used to define players in different categories (e.g., offense, defense, scorer, goalie, fast, slow, agility, flexibility, reaction speed, bat speed, throwing accuracy, etc.) and associate the player with different types of plays, scenarios, or otherwise. The player modeling module 4012 may further enable a coach, player, or other user to include player specific data, such as height, weight, body mass index (BMI), or otherwise, and use that information for recruiting/drafting. The module 4012 may enable a user to track performance over past games (e.g., over the past two or three seasons), and insert those players' statistics into new situations, such as different plays or matchup against different defenders, for example. The player information may be used for recruiting and/or drafting of players to help rank players against other players who may also be placed into the various situations. The module 4012 may work in conjunction with any of the other modules, including the scenario generator module 4008 and play generator module 4010.

A gaming module 4014 may enable a user to access any of the player tracking data generated by the player tracking module 4004 and/or action statistical module 4006, and use the data in a game, such as video game that includes the sport of which the player statistics have been generated. The video game may use the player's information and allow the player to see how well he or she plays against other players in the video game. It should be understood that the video game may enable statistical information of one or more players to be utilized during the video game. For example, the statistical information of the player(s) may be applied to players of the same positions. The other players in the video game may be professional athletes, kids in the same league (e.g., other kids on the team or on different teams in which statistical information is stored in a data repository accessible by the video game), computer-generated players with similar skill sets based on modeling data produced by the player modeling module 4012, or otherwise. The gaming module 4014 may enable network gaming or non-networked gaming so that the player may play the game by him or herself by controlling the represented player, against the computer, or against other people (e.g., friends), as understood in the art. In controlling the represented player, the user may be limited to the actual statistical information collected and applied to the represented player based on actual performance by the user. Control may be performed using a gaming controller in any form, as understood in the art. In an embodiment, rather than a user controlling the players, the system may be configured to automatically execute plays based on the statistical information generated for each of the players in the game. Because the player may use his or her statistics, interaction with the game may be more interesting to the player, and encourage the player to improve his or her skills in the real world so that his or her player (e.g., avatar) in the game may be improved, as well.

One embodiment of a computer-implemented method may include receiving at least three video clips of a sporting event, where each of the video clips may (i) be simultaneously captured over at least a portion of time, and (ii) include at least one common player wearing an indicia on a jersey that is distinguishing from indicia on other players. Tracking locations of the at least one common player captured in the at least three video clips may be generated by triangulating distances of the common player(s) in the video clips. Statistical information of the common player(s) may be generated from the tracking locations. The common player(s) may be represented on a graphical display. The common player(s) may be controlled by applying at least one of the tracking locations and statistical information of the common player(s).

A user may be enabled to select from multiple plays in which the represented common player(s) may be included to determine how well the represented common player(s) perform. In an embodiment, the represented at least one common player may be an avatar. The videos including at least one common player may be synchronized. A user may be enabled to select at least one opposing player to be represented on the graphical display in which the common player(s) is included. The user may be enabled to control the represented common player(s), where control of the represented common player(s) is limited to the generated statistical information associated with each of the respective common player(s).

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be rearranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within the circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the following claims and the principles and novel features disclosed herein.

What is claimed is:

1. A method for creating a sports video, said method comprising:
   receiving, by a processing unit, video of an event inclusive of players with unique identifiers on their respective uniforms;
   identifying, by the processing unit, at least one unique identifier associated with at least a first player in the video;
   defining, by the processing unit, start times of a plurality of video segments from the video of the event at an initial time that the at least one unique identifier has been identified in each of the plurality of video segments;
   determining until such time has passed that, beginning from the start times of each of the plurality of the video segments, a certain number of frames or seconds have passed without the at least one unique identifier being identified in the video by the processing unit;
   in response to the determination that the certain number of frames or seconds have passed, defining relative to respective start times, by the processing unit, a stop time in each of the plurality of video segments at a previous time that the first player associated with the at least one unique identifier was identified in respective video segments; and
   causing, by the processing unit, video segments inclusive of the at least one unique identifier to be individually available for replay.

2. The method according to claim 1, further comprising enabling, by the processing unit, a user to assemble select video segments into a composite video.

3. The method according to claim 1, wherein receiving video of the event includes receiving video of the event from a plurality of video capture devices at the sporting event.

4. The method according to claim 3, further comprising:
   identifying, by the processing unit, video segments from video from the plurality of video capture devices in which at least the first player associated with the at least one unique identifier is included; and
   distributing the video segments with the at least one unique identifier to a user of one of the video capture devices in response to a request from the user.

5. The method according to claim 1, further comprising:
   enabling, by the processing unit, a user to view the plurality of video segments; and
   in response to receiving one or more hashtags from the user that associate the one or more hashtags with one or more of the plurality of video segments, storing the one or more hashtags in association with respective video segments, the hashtags being indicative of respective events that occur in the associated video segments.

6. The method according to claim 5, further comprising enabling a user to request video segments having one or more hashtags associated therewith.

7. The method according to claim 6, further comprising generating a composite video that includes at least a portion of video segments having the requested one or more hashtags.

8. The method according to claim 1, comprising generating a composite video that includes video segments inclusive of the at least one unique identifier; uploading the composite video to a distributed ledger system or marketplace; and providing instructions for creating a non-fungible token of the composite video.

9. The method according to claim 1, wherein receiving the video includes receiving the video in video segments while the video is being captured until the video being captured is complete, and stitching successive video segments together, and wherein the at least one unique identifier is identified while receiving the video in segments.

10. The method according to claim 1, further comprising:
receiving, by the processing unit, at least one hashtag associated with the plurality of video segments; and
identifying, by the processing unit, one or more video segments associated with the received hashtag; and
communicating, via a communications network, the identified one or more video segments associated with the received hashtag to a user for viewing.

11. The method according to claim 1, further comprising in response to determining a start time of a video segment, tracking a player associated with the unique identifier, thereby identifying entire segments during which a player associated with the unique identifier is in the video segment.

12. The method according to claim 1, wherein defining start times and stop times at respective initial times and final times includes defining start times and stop times inclusive of a buffer time prior to and after the respective start and stop times.

13. A method for generating video content, said method comprising:
receiving, by a processing unit, a plurality of video content segments of an event from a plurality of video capture devices, the plurality of video capture devices operating at the event to crowd source video content;
identifying, by the processing unit, a player in one or more of the video content segments;
defining, by the processing unit, a start time in the one or more video content segments at an initial time that the player is identified in the one or more video content segments;
determining until such time that, beginning from the start time in the one or more video content segments, a certain number of frames or seconds have passed without the player being identified in the one or more content segments;
in response to the determination that a certain number of frames or seconds have passed, defining, by the processing unit, a stop time in the one or more video content segments at a time that the player was last identified in a respective video content segment;
extracting, by the processing unit, at least a portion of video content from the start time to the stop time, the extracted video inclusive of the identified player; and
enabling, by the processing unit, at least a portion of the extracted video content segments with the player to be available for viewing by a user.

14. The method according to claim 13, wherein identifying the player includes identifying an identifier and colors displayed on a uniform of the player.

15. The method according to claim 13, further comprising receiving a query inclusive of a hashtag associated with one or more of the extracted video content segments.

16. The method according to claim 13, further comprising:
identifying a standard object within the video content; and
determining a scaling in the video content based on a size of the standard object; and
determining a position of the player relative to the standard object within the video content.

17. The method according to claim 13, further comprising:
receiving a search request inclusive of a search parameter inclusive of a hashtag;
identifying video content in which the player is captured and the hashtag is associated; and
providing the identified video content in response to the search request.

18. The method according to claim 13, further comprising associating at least one hashtag with the extracted video content segments, the association enabling identification of the extracted video content segments by a search engine.

19. The method according to claim 13, further comprising generating a composite video that includes the extracted video content from the start time to the stop time.

20. The method according to claim 19, comprising uploading the composite video to a distributed ledger system or marketplace and providing instructions for creating a non-fungible token of the composite video.

21. The method of claim 20, wherein providing instructions comprises receiving one or more hashtags from the user that associate the one or more hashtags with the one or more video content segments, storing the one or more hashtags in association with respective video content segments, the hashtags being indicative of respective events that occur in the associated video content segments, and providing the one or more hashtags to the distributed ledger system or marketplace for creating the non-fungible token of the composite video.

* * * * *